United States Patent
Takayama et al.

(10) Patent No.: US 7,325,132 B2
(45) Date of Patent: Jan. 29, 2008

(54) AUTHENTICATION METHOD, SYSTEM AND APPARATUS OF AN ELECTRONIC VALUE

(75) Inventors: Hisashi Takayama, Tokyo (JP); Junko Furuyama, Tokyo (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 778 days.

(21) Appl. No.: 10/647,640

(22) Filed: Aug. 25, 2003

(65) Prior Publication Data

US 2004/0039919 A1   Feb. 26, 2004

(30) Foreign Application Priority Data

Aug. 26, 2002 (JP) ............................. 2002-245997
Mar. 17, 2003 (JP) ............................. 2003-072284
Aug. 7, 2003 (JP) ............................. 2003-289433

(51) Int. Cl.
*H04L 9/00* (2006.01)
*H04K 1/00* (2006.01)

(52) U.S. Cl. ...................... 713/168; 713/170; 713/173; 713/176; 713/178; 713/181; 713/182; 713/183; 713/184; 705/64; 705/65; 705/66

(58) Field of Classification Search ..................... None
See application file for complete search history.

(56) References Cited

U.S. PATENT DOCUMENTS

| | | | |
|---|---|---|---|
| 4,977,595 A | | 12/1990 | Ohta et al. |
| 5,418,854 A | * | 5/1995 | Kaufman et al. ........... 713/156 |
| 5,790,677 A | | 8/1998 | Fox et al. |
| 6,178,508 B1 | * | 1/2001 | Kaufman ..................... 713/183 |
| 6,834,112 B1 | * | 12/2004 | Brickell ........................ 380/279 |
| 6,938,012 B2 | * | 8/2005 | Chida et al. ................... 705/37 |
| 2003/0021419 A1 | * | 1/2003 | Hansen et al. .............. 380/277 |
| 2004/0098627 A1 | * | 5/2004 | Larsen ........................ 713/202 |
| 2005/0204142 A1 | * | 9/2005 | Axelsson ..................... 713/182 |

FOREIGN PATENT DOCUMENTS

| | | |
|---|---|---|
| WO | WO 99/03285 | 1/1999 |
| WO | WO 99/26207 | 5/1999 |
| WO | WO 00/62260 | 10/2000 |
| WO | WO 01/40605 | 6/2001 |

* cited by examiner

*Primary Examiner*—Benjamin E. Lanier
(74) *Attorney, Agent, or Firm*—Day Pitney LLP

(57) ABSTRACT

An authentication system providing a safety authentication process of electronic values with the use of mobile terminals which do not have a tamper-resistant function. The electronic value including encrypted value authentication information (F(VPW)), wherein an authentication information (VPW) corresponding to an electronic value specified by a user is acquired by the hash calculation, is stored in user's mobile terminal. In the user authentication process; authentication apparatus generates a random number R and transmits it to mobile terminal, mobile terminal generates value authentication information (F(VPW')) from authentication information (VPW') corresponding to electronic value input by user, further executes a hash calculation on data wherein value authentication information (F(VPW')) and the random number R are concatenated, generates authentication information (F(VPW')∥R), transmits it to the authentication apparatus with the electronic value, authentication apparatus decrypts the received electronic value, extracts the value authentication information (F(VPW)) from the electronic value, executes the hash calculation on data wherein value authentication information (F(VPW)) and the random number R are concatenated, generates the authentication information (F(VPW)∥R), and collates the received authentication information (F(VPW')∥R) with the authentication information (F(VPW)∥R), so that the user is authenticated.

21 Claims, 44 Drawing Sheets

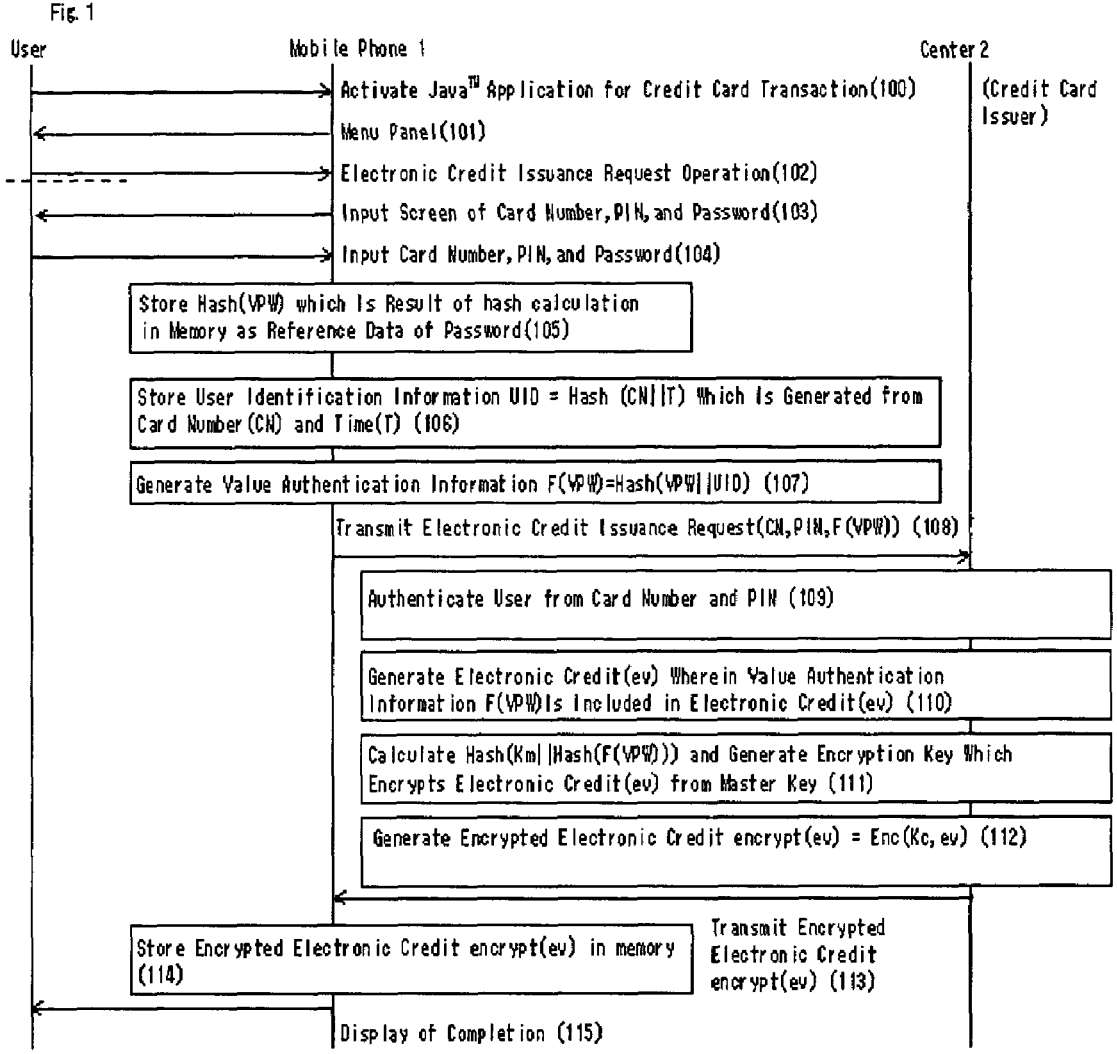

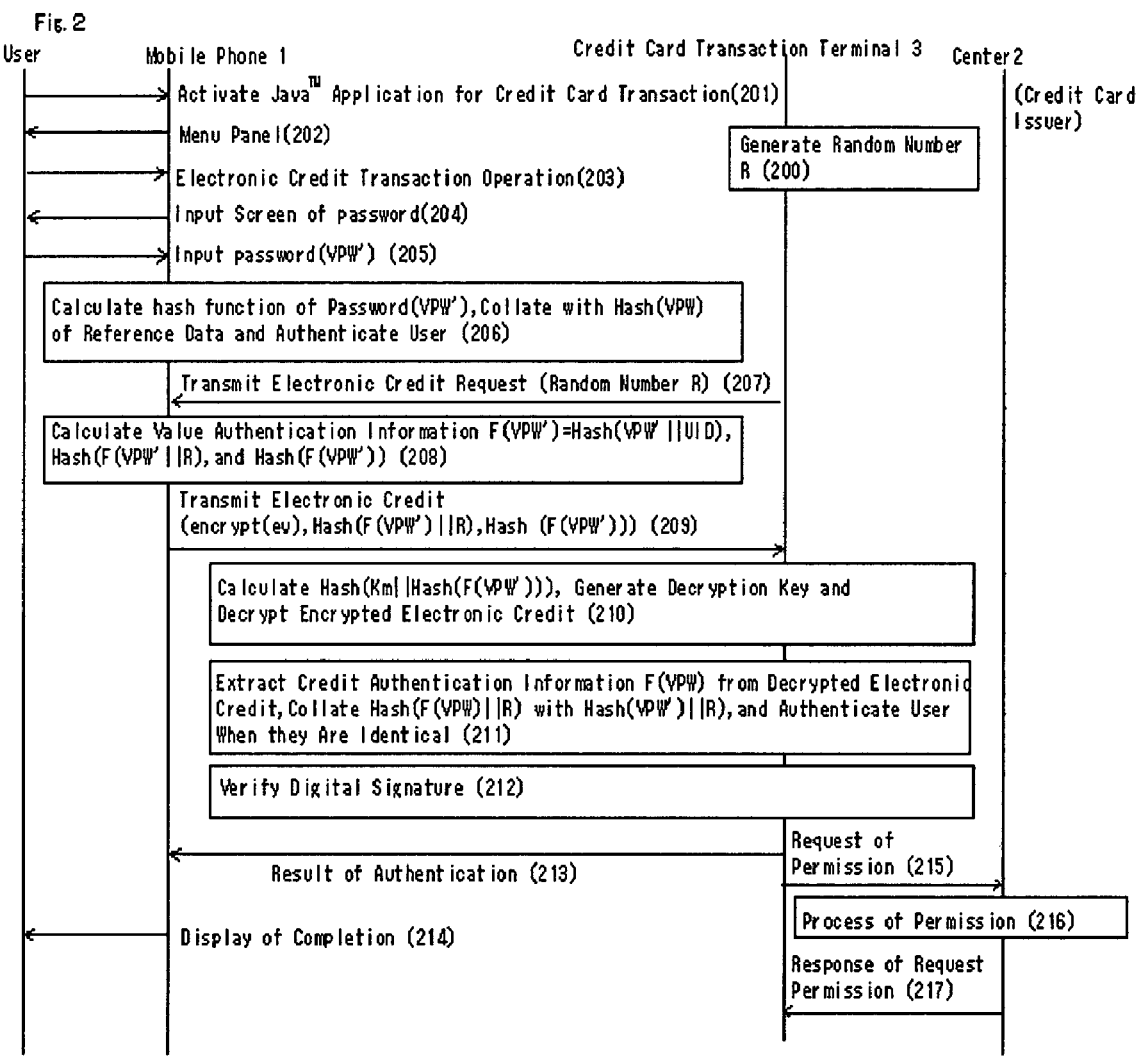

Fig. 6

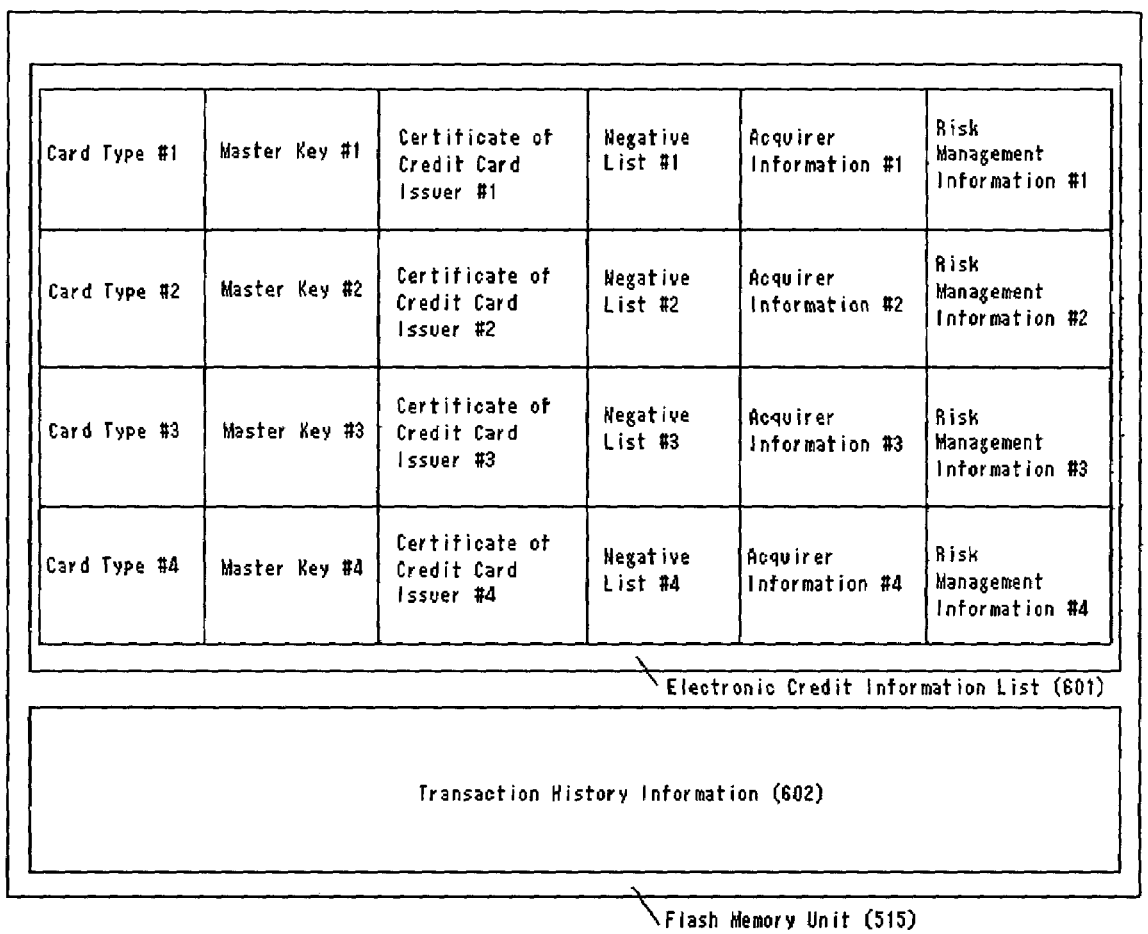

| Card Type #1 | Master Key #1 | Certificate of Credit Card Issuer #1 | Negative List #1 | Acquirer Information #1 | Risk Management Information #1 |
| Card Type #2 | Master Key #2 | Certificate of Credit Card Issuer #2 | Negative List #2 | Acquirer Information #2 | Risk Management Information #2 |
| Card Type #3 | Master Key #3 | Certificate of Credit Card Issuer #3 | Negative List #3 | Acquirer Information #3 | Risk Management Information #3 |
| Card Type #4 | Master Key #4 | Certificate of Credit Card Issuer #4 | Negative List #4 | Acquirer Information #4 | Risk Management Information #4 |

Electronic Credit Information List (601)

Transaction History Information (602)

Flash Memory Unit (515)

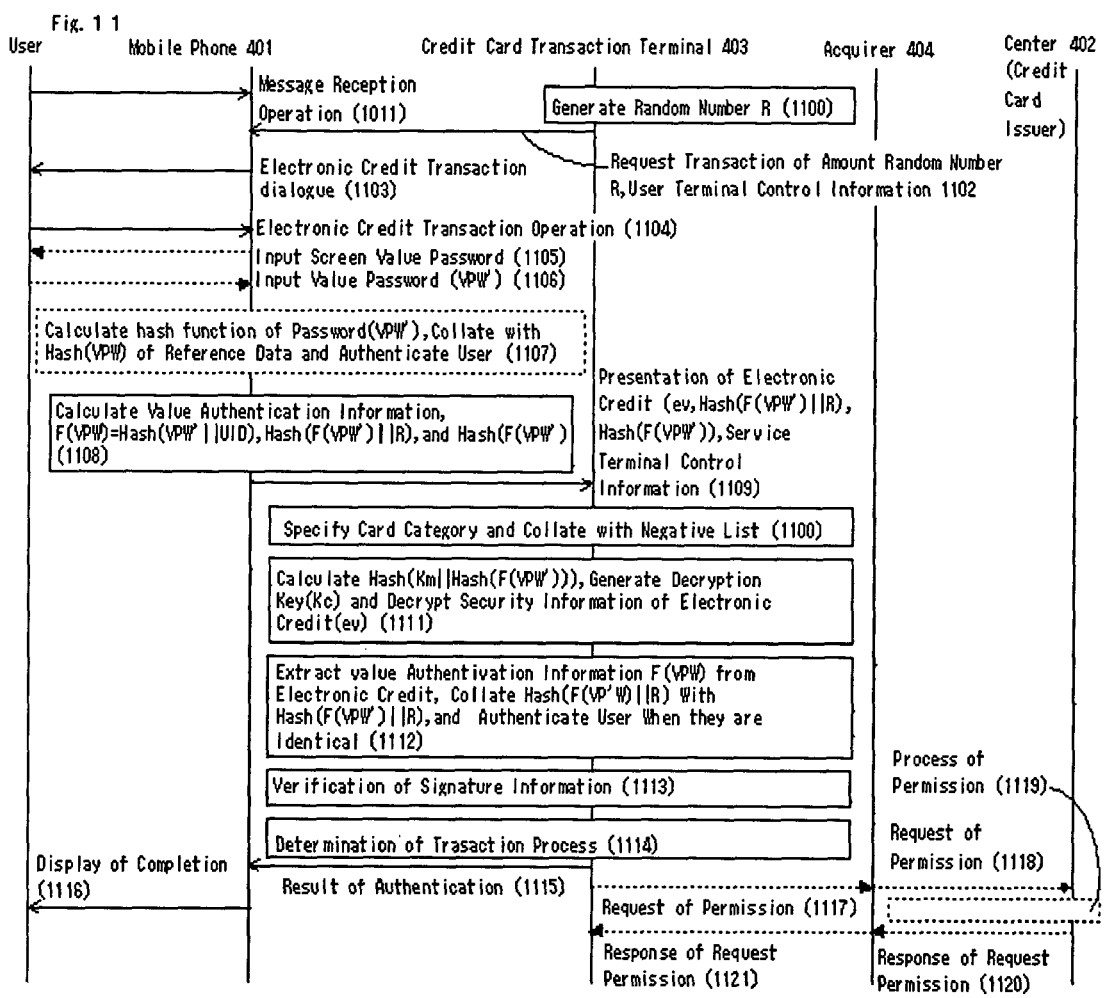

Fig. 2 2

| Wallet Display Information (2201) | Wallet Sound Information (2202) |

Electronic Credit List (2203)

| Reference Data #1 | User Identification Information #1 | Electronic Credit #1 | Property #1 |
| Reference Data #2 | User Identification Information #2 | Electronic Credit #2 | Property #2 |

Electronic Ticket List (2204)

| Reference Data #1 | User Identification Information #1 | Electronic Ticket #1 | Property #1 |
| Reference Data #2 | User Identification Information #2 | Electronic Ticket #2 | Property #2 |

Electronic Lock List (2205)

| Reference Data #1 | User Identification Information #1 | Electronic Key #1 | Property #1 |
| Reference Data #2 | User Identification Information #2 | Electronic Key #2 | Property #2 |
| Reference Data #3 | User Identification Information #3 | Electronic Key #3 | Property #3 |

| Encrypted First Informaiton | Encrypt ( Password ) |
|---|---|
| The Second Information | Password |
| Condition of Determination | Decrypt ( Encrypted First Informaiton ) = The Second Information ? |

(B)

| Encrypted First Informaiton | Encrypt ( Password ) |
|---|---|
| The Second Information | F ( Password ) |
| Condition of Determination | F ( Decrypt ( Encrypted First Informaiton ) ) = The Second Information ? |

Fig. 3 5
(A)
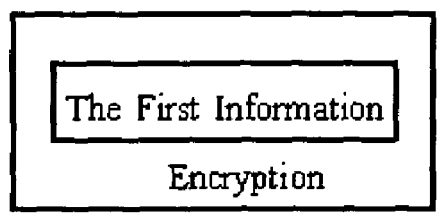
(B)
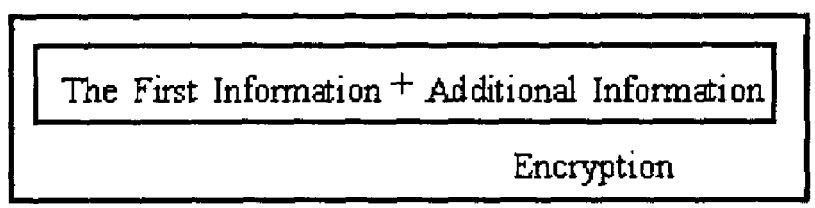

Fig. 37
(A)
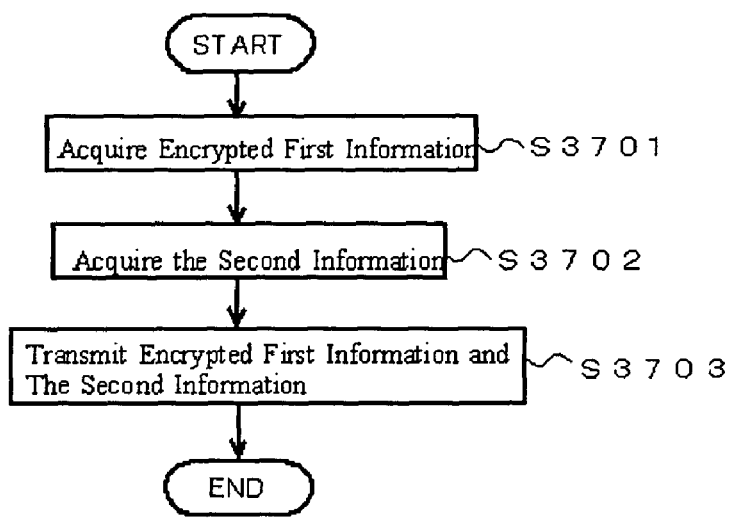
(B)
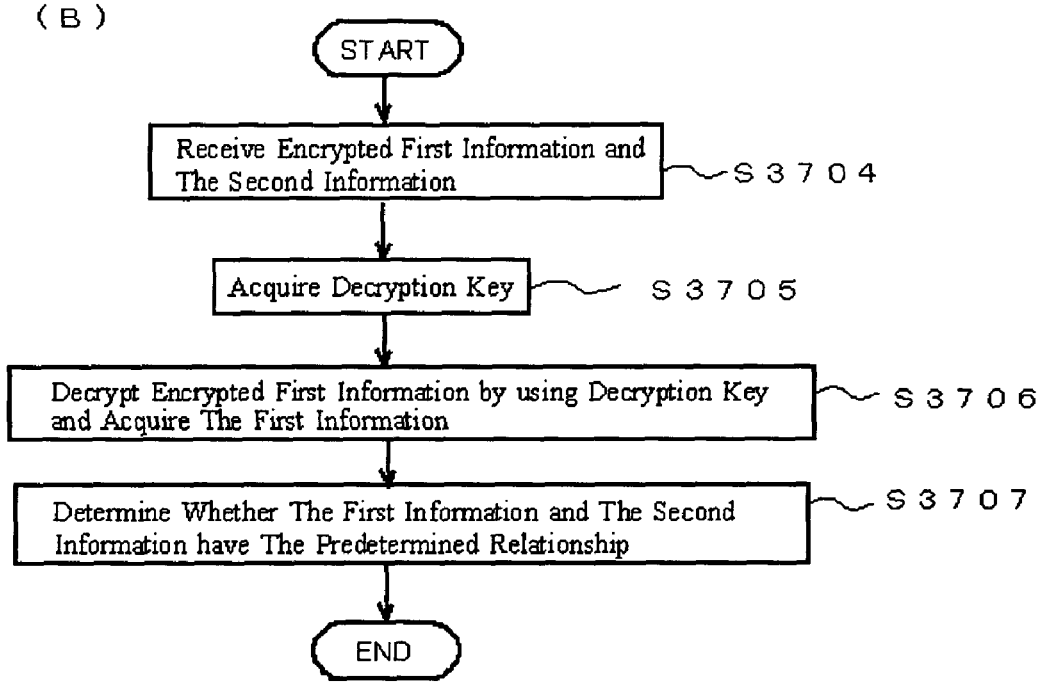

Fig 40
(A)
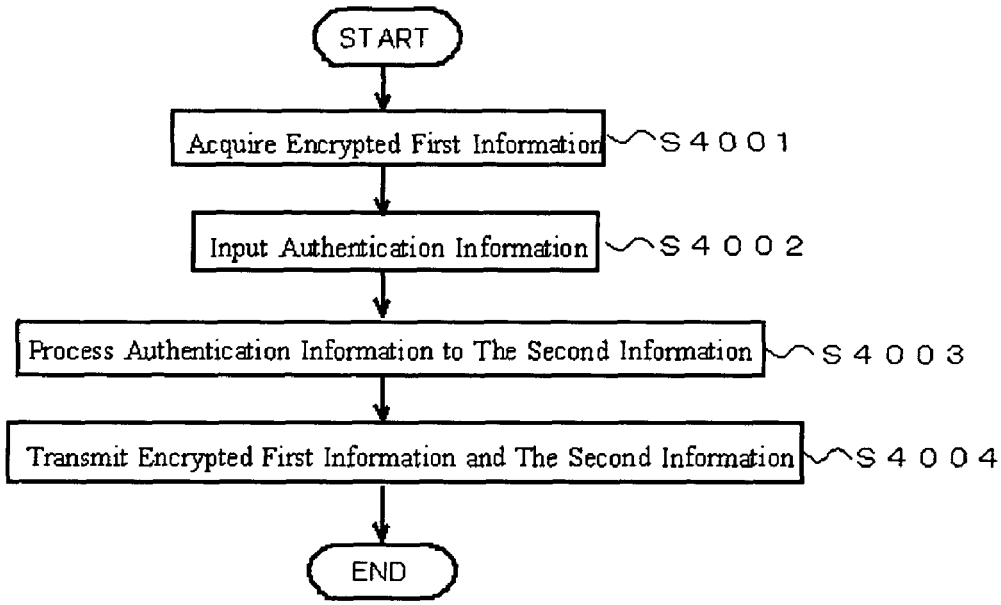
(B)
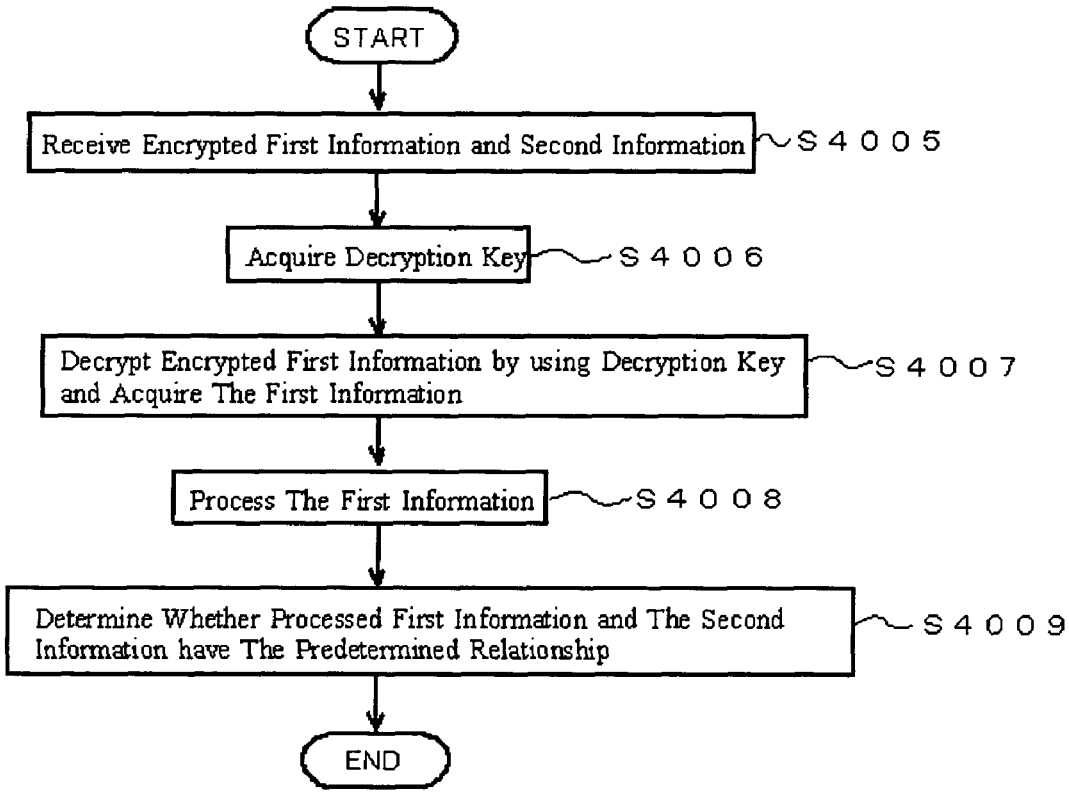

Fig. 4 4

(1) V-Auth = Hash$_1$ ( Password ∥ User ID )

(2) V-Auth' = Hash$_1$ (Authentication Information ∥ User ID )

(3) U-Auth' = Hash$_2$ ( V-Auth ∥ Challenge )

(4) U-Auth = Hash$_2$ ( V-Auth ∥ Challenge )

AUTHENTICATION METHOD, SYSTEM AND APPARATUS OF AN ELECTRONIC VALUE

BACKGROUND OF THE INVENTION

1. Field of the Invention

The present invention provides an authentication process for electronic values wherein credit cards, debit cards, member cards, ID cards, tickets etc. are converted into digitized information and stored in user's mobile terminal and the user is authenticated as the rightful owner of them, so that, even if the mobile terminal does not have a tamper-resistant function, an authentication process is implemented.

2. Description of the Related Art

In the prior art, a method of public key encryption based on a digital signature and a method of authentication of owner by verifying ID and password registered in advance as an authentication process is known. For example, in cases where the method of using a digital signature is adopted to a mobile phone, an IC card module having a tamper-resistant function is equipped with the mobile phone, and the IC card module stores a pair of public keys and private keys of the public key encryption system in advance. In the case of a credit card, the account number of the credit card using the public key is stored in a mobile phone, the IC card module performs the digital signature process by using the private key at the point at which the credit card is used, the authentication side verifies the digital signature using the certificate of the credit card and authenticates the user. Moreover, in cases of the method using an ID and password, although it is not necessary to be equipped with an IC card module having a tamper-resistant function with a mobile phone, it is necessary for verifying the ID and password registered in advance to comprise a database of ID and password on the authentication side. (For example, Japan Patent Laid Open No. 2001-265735)

However, in the case of the method using digital signature, it is necessary to equip an IC card module having a tamper-resistant function with the mobile phone or mobile terminal, thereby increasing production costs of the terminal. Additionally, in the case of the method using ID and password, it is necessary to equip a database for ID and password on the authentication side. For example, in order to apply the method to authentication such as a credit card transaction, it is necessary to use the method wherein the database of the ID and password of credit card holders is set in the credit card transaction terminal placed in each affiliated store, or a method wherein the center having a database of ID and password is located on the network and accessed with respect to each authentication. In the case of the former, it is unrealistic for security and physical reasons to place a database of ID and password for credit card transaction terminals placed in each affiliated store. Besides, in the case of the latter, it is necessary to establish a new network for the authentication of cardholders between center and each credit card transaction terminal and to access the center for every authentication, thereby making it difficult to process promptly.

SUMMARY OF THE INVENTION

The present invention solves the above deficiency, and it is an object of the present invention to provide authentication methods enabling a safe and prompt authentication process for a mobile terminal without a tamper-resistant function, which are applicable to credit card transactions, authentication of members, and ticket readings etc., and various systems to which the authentication methods are applied, furthermore, to provide an apparatus implementing the system.

In the authentication method of the present invention, user owns electronic value including value authentication information (F(VPW)) in the state of being encrypted wherein authentication information (VPW) corresponding to electronic value specified by user is executed irreversible calculation process (F), in process for authenticating user as the right owner of said electronic value, authentication side generates random number (R) and transmits it to user side, user side generates value authentication information (F(VPW')) from authentication information (VPW') corresponding to electronic value input by user, further generates authentication information (G(R,F(VPW'))) wherein said random number (R) and value authentication information (F(VPW')) are concatenated and executed irreversible calculation process (G) and transmits said electronic value and authentication information (G(R,F(VPW'))) to authentication side, authentication side decrypts code of received electronic value, extracts value authentication information (F(VPW)) from electronic value, generates authentication information (G(R,F(VPW))) wherein said random number (R) and value authentication information (F(VPW)) are concatenated and executed irreversible calculation process (G), collates said received authentication information (G(R, F(VPW'))) with said generated authentication information (G(R,F(VPW))), verifies that they are identical, and authenticates user.

According to the present authentication method, the authentication side becomes able to authenticate the user safely without a database for ID and password on the authentication side also without storing secret information such as an encryption key etc, or a tamper-resistant function on the user side.

In an authentication method of the present invention, decryption key of encrypted part of said electronic value is generated from data (H(F(VPW))) wherein value authentication information (F(VPW)) is executed irreversible calculation process (H) and master key, in process for authenticating user as the rightful owner of said electronic value, user side further generates data (H(F(VPW'))) wherein value authentication information (F(VPW')) is executed irreversible calculation process (H), transmits data (H(F(VPW'))) with said electronic value and said authentication information (G(R,F(VPW'))) to authentication side, authentication side generates decryption key from received data (H(F (VPW'))) and master key, and decrypts code of received electronic value.

According to the present authentication method, since the encryption key for encrypting the electronic value is different with respect to each electronic value, if one of the codes of the electronic values is decrypted, it does not influence the other electronic values, thereby increasing security.

BRIEF DESCRIPTION OF THE DRAWINGS

FIG. 2 is a flow chart of an electronic credit card transaction process in the fifth embodiment of the present invention, FIG. 6 is a diagram of the information stored in a flash memory unit of security card in the sixth embodiment of the present invention, FIG. 11 is a flow chart of the electronic ticket transaction process in the sixth embodiment of the present invention, FIG. 12 is a block diagram of the electronic ticket system in the seventh embodiment of the present invention, FIG. 15 is a diagram of information managed by a wallet application stored in the memory (non-volatile memory) of a mobile phone in the seventh embodiment of the present invention, FIG. 22 is a diagram of information managed by wallet application stored in the non-volatile memory of a mobile phone in the eighth and the ninth embodiments of the present invention, FIG. 33 is a diagram illustrating conditions for determining whether encrypted first information and the second information have a predetermined relationship and whether the first information and the second information have predetermined relationship, FIG. 35 is a diagram of an example of the encrypted first information, FIG. 37 is a flow chart of the first embodiment of the present invention, FIG. 40 is a flow chart of the third embodiment of the present invention, FIG. 44 is a diagram of the relationship between each datum in FIG. 43.

DETAILED DESCRIPTION OF THE PREFERRED EMBODIMENTS

Hereinafter, the embodiments of the present invention will be described with the use of drawings.

Figure 31:
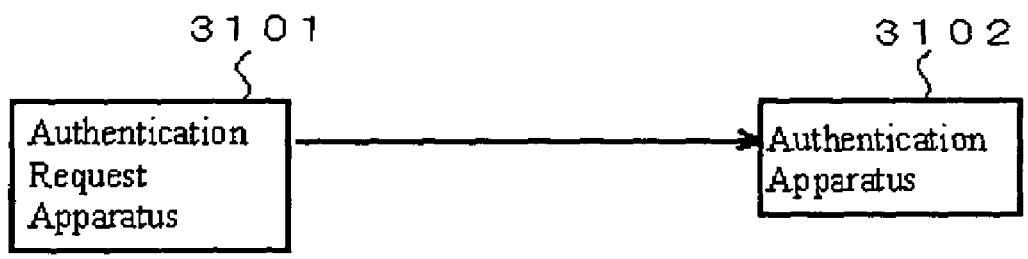
FIG. 31 is a schematic diagram of the present invention.

FIG. 31 is a schematic diagram of the present invention. In the present invention, authentication request apparatus 3101 is authenticated by authentication apparatus 3102.

At that point, information for authentication is transmitted from authentication request apparatus 3101 to authentication apparatus 3102.

According to an authentication method of the present invention, in theory, it is not necessary to transmit information from authentication apparatus 3102 to authentication request apparatus 3101, before transmission of the information from authentication request apparatus 3101 to authentication apparatus 3102. However, information may be transmitted from authentication apparatus 3102 to authentication request apparatus 3101 in order to synchronize between authentication request apparatus 3101 and authentication apparatus 3102 and to prevent use by anyone other that the rightful owner.

Figure 32:
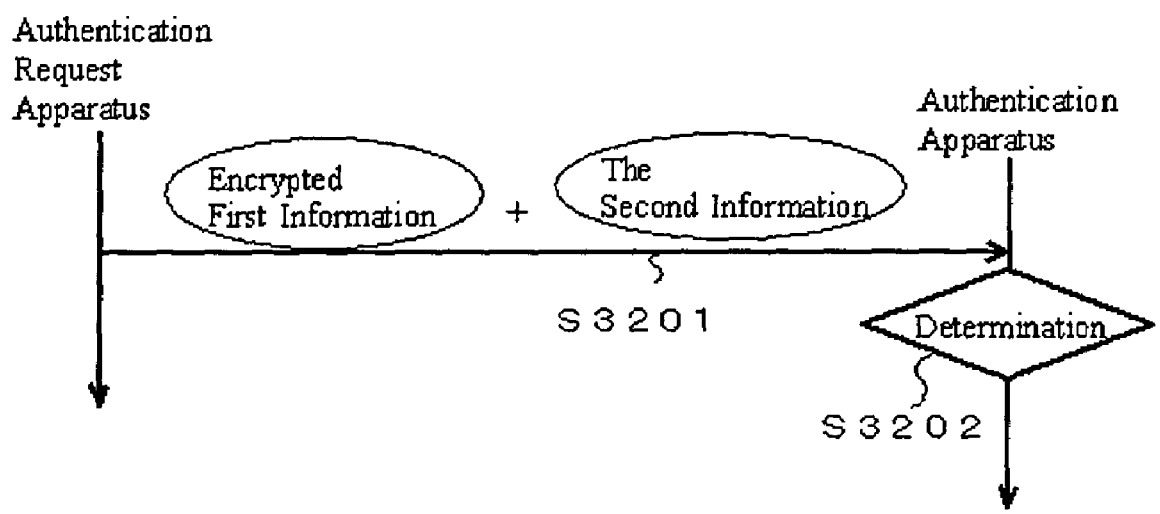
FIG. 32 is a sequential diagram of processes of an authentication request apparatus and authentication apparatus of the present invention.

FIG. 32 is a sequential diagram of the process of authentication request apparatus 3101 and the authentication apparatus 3102. Firstly, in step S3201, authentication request apparatus transmits encrypted first information and the second information to authentication apparatus 3102. In step S3202, authentication apparatus 3102, which received encrypted first information and the second information, determines whether the relationship of encrypted first information and the second information is predetermined. If so, the authentication request apparatus is authenticated by authentication apparatus. As a result, for example, the transaction process for the user is executed, admission to a specific place is granted, and the lock is unlocked etc.

Here, "encrypted first information" corresponds to information wherein first information is encrypted in a form which can be decrypted or information including such information.

The first information may be virtually any information. Examples of the first information include random numbers, credit card numbers, telephone numbers, IP addresses, or even coded biological authentication information such as user's finger prints or user's iris code information etc. "The second information" corresponds to information to determine whether the relationship of itself and the first information is a predetermined relationship. For example, the second information may be information to determine whether it is the same as the first information. Moreover, when the first information and the second information are expressed in a binary form, it may be information to determine whether the difference of the first information and the second information indicates predetermined differences.

Note that, in the present invention, encrypted first information and the second information are assumed to be expressed as a digital signal. Therefore, the authentication request apparatus and the authentication apparatus in the present invention can be implemented by a digital computer. Examples of digital computers include movable devices such as a mobile phone, PDA (Personal Digital Assistant), etc. FIG. 33 shows examples of combinations of (1) encrypted first information, (2) the second information, and (3) conditions for determining whether the first information and the second information have a predetermined relationship.

In FIG. 33(A), encrypted first information corresponds to information (Encrypt(password)) wherein a predetermined password is encrypted in a form which can be decrypted by a decryption key stored in the authentication apparatus. The second information indicates the predetermined password, and the condition of determination indicates whether information (Decrypt (encrypted first information)), to be acquired by decrypting encrypted first information with the use of a decryption key stored in the authentication apparatus, is the same as the second information.

When encrypted first information indicates (Encrypt (password)), (Decrypt(encrypted first information)) indicates password, so that when the second information indicates password, it means that the person who inputs the second information is a person who knows the content of encrypted first information. Therefore, the person who inputs the second information is the rightful person who holds the encrypted first information, so that he is authenticated.

In FIG. 33(B), encrypted first information indicates (Encrypt(password)). The second information is information (F(password)) to be acquired by operating a predetermined process on the password. "Predetermined process" corresponds to a predetermined process between the authentication request apparatus and the authentication apparatus. Preferably, this predetermined process corresponds to a process such as MD5 (Message Digest 5) and SHA1 (Secure Hash Algorithm 1) etc., wherein less calculation is required and it is difficult to intercept its inverse function. Such processes can be called irreversible calculation process or hash calculations. By using such processes, it becomes possible to avoid password theft from the second information.

In FIG. 33(B), a predetermined condition indicates whether (F(Decrypt(encrypted first information))) corresponds to the second information. Because when encrypted first information indicates (Encrypt(password)), (F(Decrypt (encrypted first information))) indicates (F(password)).

Moreover, in FIG. 33(B), a predetermined process (F) may be changeable with respect to each authentication. For example, (F) may be selected by synchronizing between authentication request apparatus and authentication apparatus according to the current time. Moreover, a process, wherein a random number is transmitted from the authentication apparatus to the authentication request apparatus before encrypted first information and the second information are transmitted from the authentication request apparatus to the authentication apparatus and it is determined by the random number, may be permitted. For example, a random number is concatenated with information that is input, and then, the result of which operates the irreversible calculation process such as MD5 and SHA1.

Figure 34:
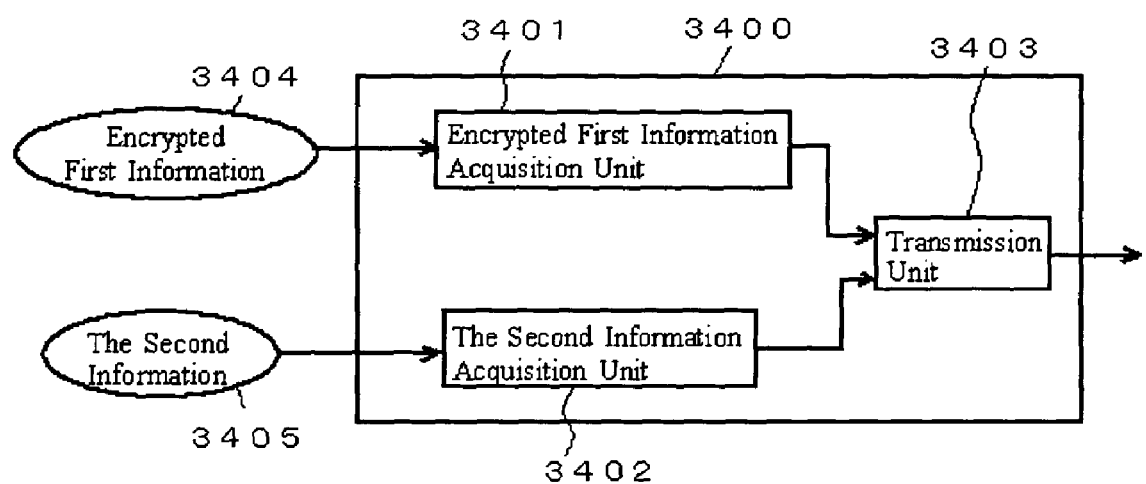
FIG. 34 is a block diagram of the authentication request apparatus in the first embodiment of the present invention.

FIG. 34 is a block diagram of the authentication request apparatus of the first embodiment of the present invention.

Authentication request apparatus 3400 is an apparatus requesting authentication for the authentication apparatus and comprises encrypted first information acquisition unit 3401, the second information acquisition unit 3402, and transmission unit 3403.

Encrypted first information acquisition unit 3401 acquires encrypted first information 3404. For example, encrypted first information 3404 is acquired from an input device such as a keyboard, flexible disk, optical disk, hard disk, or storage medium such as a memory card.

Moreover, encrypted first information 3404, wherein only the first information is encrypted or encrypted information acquired by adding additional information to the first information, may be permitted as shown in FIG. 35(A). Additional information may be determined by purpose of authentication. For example, when encrypted first information indicates an electronic ticket, additional information may indicate date and seat number.

The second information acquisition unit 3402 acquires the second information 3405. For example, the second information 3405 is acquired from an input device such as a keyboard, flexible disk, optical disk, hard disk, or storage medium such as a memory card. Moreover, the second information 3405 may be biological authentication information such as fingerprint or iris code etc. In this case, the second information acquisition unit 3402 corresponds to a sensor or a camera etc. for acquiring the biological authentication information.

Transmission unit 3403 relates encrypted first information acquired in encrypted first information acquisition unit 3401 and the second information acquired in the second information acquisition unit, and transmits them to the above-mentioned authentication apparatus. "Relates" means simultaneity or temporally proximity, therefore encrypted first information and the second information are transmitted in a state in which they are separable. Transmission may be executed through wired or wireless communication.

Figure 36:
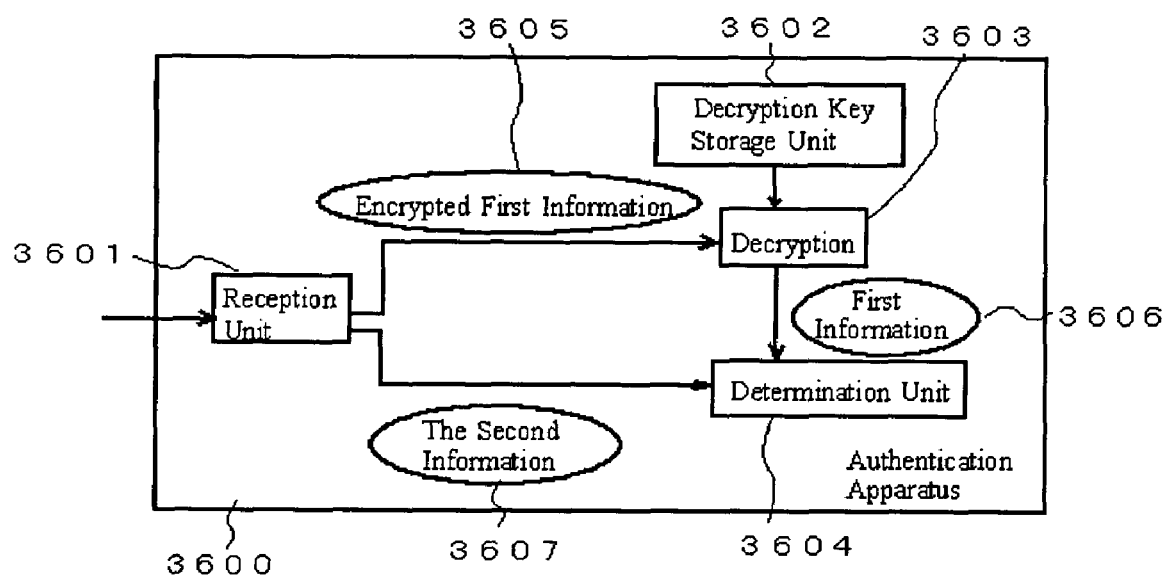
FIG. 36 is a block diagram of the authentication apparatus in the first embodiment of the present invention.

FIG. 36 is a functional block diagram of the authentication apparatus.

Authentication apparatus 3600 comprises reception unit 3601, decryption key storage unit 3602, decryption unit 3603, and determination unit 3604.

Reception unit 3601 receives encrypted first information transmitted from transmission unit of authentication apparatus and the second information transmitted in relation to the encrypted first information. After reception, encrypted first information 3605 and the the second information 3607 are separated.

Decryption key storage unit 3602 stores a decryption key to decrypt encrypted first information. When the first information is encrypted by a common key, decryption key storage unit 3602 stores the common key. Besides, when the first information is encrypted by a public key encryption system, decryption key storage unit 3602 stores a private key corresponding to the public key. Note that "storage" means recording in the readable form which is non-volatile. Therefore, decryption key storage unit 3602 is implemented in, for example, non-volatile memory and hard disk etc. Moreover, decryption key storage unit 3602 may be implemented in an IC card having a tamper-resistant function etc.

Decryption unit 3603 acquires the first information 3606 by decrypting encrypted first information 3605 received by reception unit 3601 with the use of the decryption key stored in decryption key storage unit 3602. Therefore, the decryption key is read from decryption key storage unit 3602, and then, encrypted first information 3605 is decrypted. When encrypted first information 3605 is information wherein the first information and additional information are encrypted, the first information is acquired by decryption.

Determination unit 3604 determines whether the first information 3606 decrypted by decryption unit 3603 and the second information 3607 received in relation to encrypted first information, which is the first information before being decrypted, have a predetermined relationship. For example, it determines whether "condition of determination" shown in FIG. 33 is fulfilled.

In step S3701, authentication request apparatus acquires encrypted first information by encrypted first information acquisition unit 3401.

In step S3702, the second information is acquired by the second information acquisition unit 3402.

In step S3703, encrypted first information and the second information are transmitted by transmission unit 3601.

However, in step S3704, authentication apparatus acquires encrypted first information and the second information by reception unit 3601.

In step S3705, a decryption key is acquired by decryption unit 3603.

In step S3706, the first information is acquired by decrypting encrypted first information with the use of the decryption key.

In step S3707, it is determined whether the first information and the second information have a predetermined relationship by determination unit 3604.

Note that a flow chart in FIG. 37 is an example process. For example, a synchronization process between the authentication request apparatus and the authentication apparatus, and transmission of some kind of information from the authentication apparatus to the authentication request apparatus may be permitted.

According to the present embodiment, providing the apparatus and method of authentication, which does not require the storage of secret information such as an encryption key on the authentication request apparatus side and to operate the encryption process, become possible.

Figure 38:
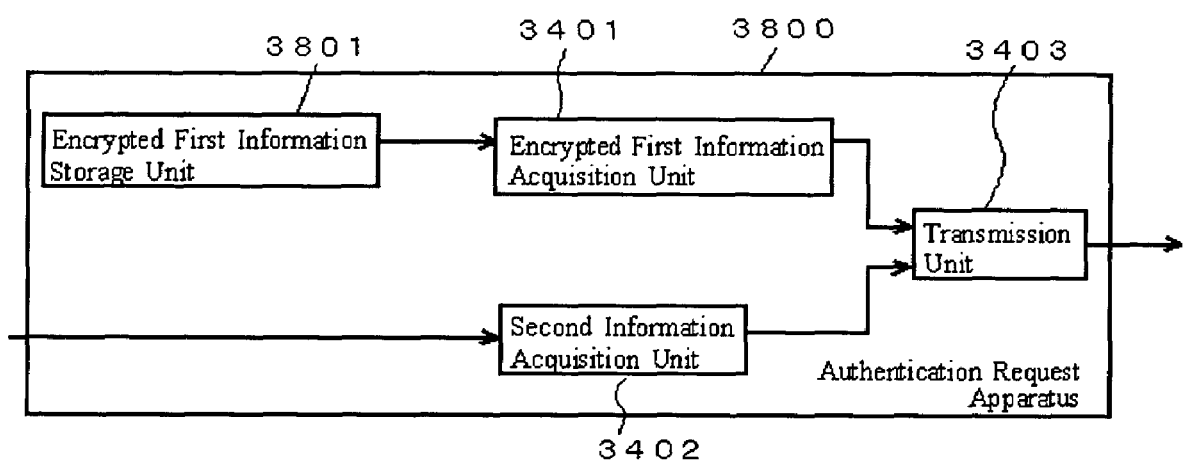
FIG. 38 is a block diagram of the authentication request apparatus in the second embodiment of the present invention.

FIG. 38 is a functional block diagram of the authentication request apparatus of the second embodiment of the present invention.

Authentication request apparatus 3800 has a configuration wherein the authentication request apparatus of the first embodiment comprises encrypted first information storage unit 3801.

"Encrypted first information storage unit" 3801 stores encrypted first information. For example, it stores encrypted first information by memory, magnetic disk or optical disk etc.

In the present embodiment, encrypted first information acquisition unit 3401 acquires encrypted first information stored in encrypted first information storage unit 3801. Therefore, the process of authentication request apparatus 3800 is shown in flow chart of FIG. 37(A). In step S3701, encrypted first information is acquired from encrypted first information storage unit 3801.

According to the present embodiment, it becomes possible to authenticate the person who inputs the second information to the authentication request apparatus 3800 when authentication request apparatus 3800 is authenticated by authentication apparatus because encrypted first information is stored in encrypted first information storage unit 3801.

Figure 39:
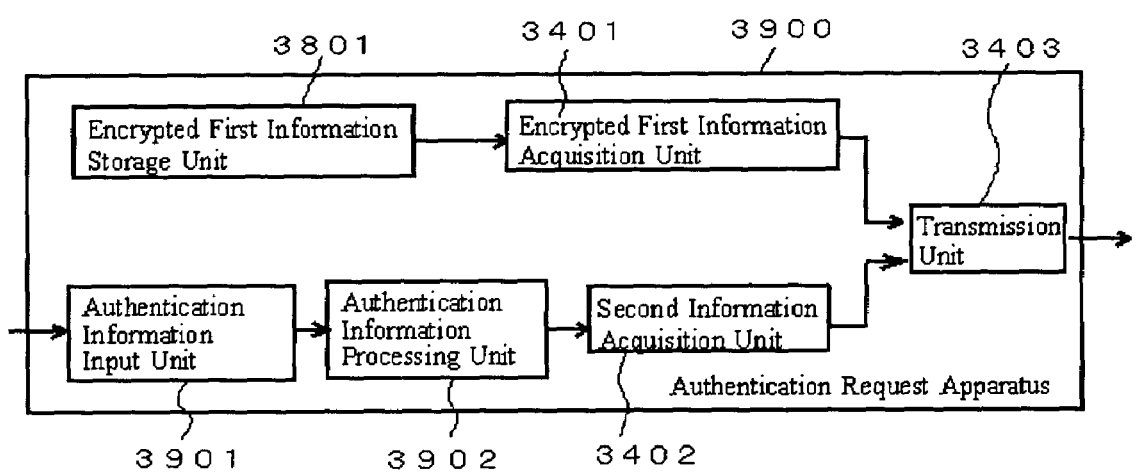
FIG. 39 is a block diagram of the authentication request apparatus in the third embodiment of the present invention.

FIG. 39 is a functional block diagram of the authentication request apparatus of the third embodiment of the present invention.

Authentication request apparatus 3900 has a configuration wherein the authentication request apparatus of the first embodiment or the second embodiment comprises authentication information input unit 3901 and authentication information processing unit 3902.

Authentication information input unit 3901 is a unit for inputting authentication information for the purpose of authenticating information. Examples of authentication information input unit may include: unit for inputting predetermined password and PIN (Personal Identification Number), keyboard, key pad, sensor and camera for acquiring biological authentication information such as a fingerprint or iris code identification information etc.

Authentication information processing unit 3902 processes authentication information which is input by authentication information input unit 3901.

"Process" corresponds to processing one type of operation or another. For example, operations concatenating to other information and operations based on algorithms of hash functions such as MD5 and SHA1 are executed.

According to the present embodiment, second information corresponds to information processed by authentication information processing unit 3902. Therefore, second information acquisition unit 3402 acquires information processed by authentication information processing unit 3902 as the second information.

The process of authenticating information in authentication information processing unit 3902 may be arbitrary. Moreover, it does not require that the same process is executed and the same second information is acquired for the same authentication information, so that the different second information may be acquired every time authentication information is processed. Thus, a different process is executed each time, so that it becomes possible to increase security even if the second information transmitted from transmission unit 3403 is intercepted.

Note that it is necessary for the authentication apparatus side to recognize the process of authentication information processing unit 3902 in order to operate authentications even if different processes are executed each time. For example, the synchronization process between the authentication apparatus and the authentication request apparatus is required. Therefore, a case, wherein some algorithms of processes are prepared in advance and information indicating which algorithm has been used for processing authentication information is transmitted to authentication apparatus, may be permitted.

Moreover, information indicating what number of algorithm is to be used for processing authentication may be transmitted to the authentication apparatus. Furthermore, synchronization of the time-of-day clock between the authentication apparatus and the authentication request apparatus is executed, and an algorithm may be selected according to time-of-day clock.

Moreover, the parameter of algorithm may be changed without changing the algorithm of processing. For example, in cases where the hash function is processed on the authentication information concatenating to another information, another information may be changed each time as a parameter. Therefore, the parameter is shared between the authentication apparatus and the authentication request apparatus. For example, the parameter may be transmitted from the authentication request apparatus to the authentication apparatus, and may be transmitted from the authentication apparatus to the authentication request apparatus. Moreover, synchronization of time between the authentication apparatus and the authentication request apparatus is executed in advance, so that the parameter may be determined according to time.

FIG. 40(A) is a flow chart of the process of the authentication request apparatus of the present embodiment. In step S4001, encrypted first information is acquired by encrypted first information acquisition unit 3401. For example, encrypted first information is acquired from outside the authentication request apparatus, and is acquired from encrypted first information storage unit 3801 when encrypted first information storage unit 3801 is provided.

In step S4002, authentication information is input by authentication information input unit 3901.

In step S4003, authentication information is processed to the second information by authentication information processing unit 3902.

In step S4004, encrypted first information and the second information are transmitted by transmission unit 3403.

FIG. 40(B) is a flow chart of the process of the authentication apparatus of the present embodiment. In step S4005, encrypted first information and the second information are received.

In step S4006, the decryption key is acquired.

In step S4007, encrypted first information is decrypted with the use of the decryption key, so that the first information is acquired.

In step S4008, the first information is processed. In this process, the same algorithm as used for processing authentication information in step S4003 is used. If necessary, the same parameter as used for processing the authentication information in the authentication request apparatus is used.

In step S4009, it is determined whether the first information and the second information have a predetermined relationship. As an example of a "predetermined relationship", identity may be cited.

According to the present invention, since the second information acquired by processing authentication information is transmitted, for example, the algorithm of processing authentication information is concealed, thereby making it difficult to determine the authentication information from the second information. Moreover, by using the hash function, it becomes difficult to know the authentication information from the second information even if the algorithm of processing authentication information is not concealed, thereby increasing security. Moreover, since the process of the hash function requires less amount of calculation than with general encryption processes, it becomes possible to simplify the authentication apparatus, thereby reducing costs, and to speed up the process.

As the fourth embodiment of the present invention, information relating apparatus will be described. Information relating apparatus corresponds to an apparatus generating encrypted first information.

Figure 41:
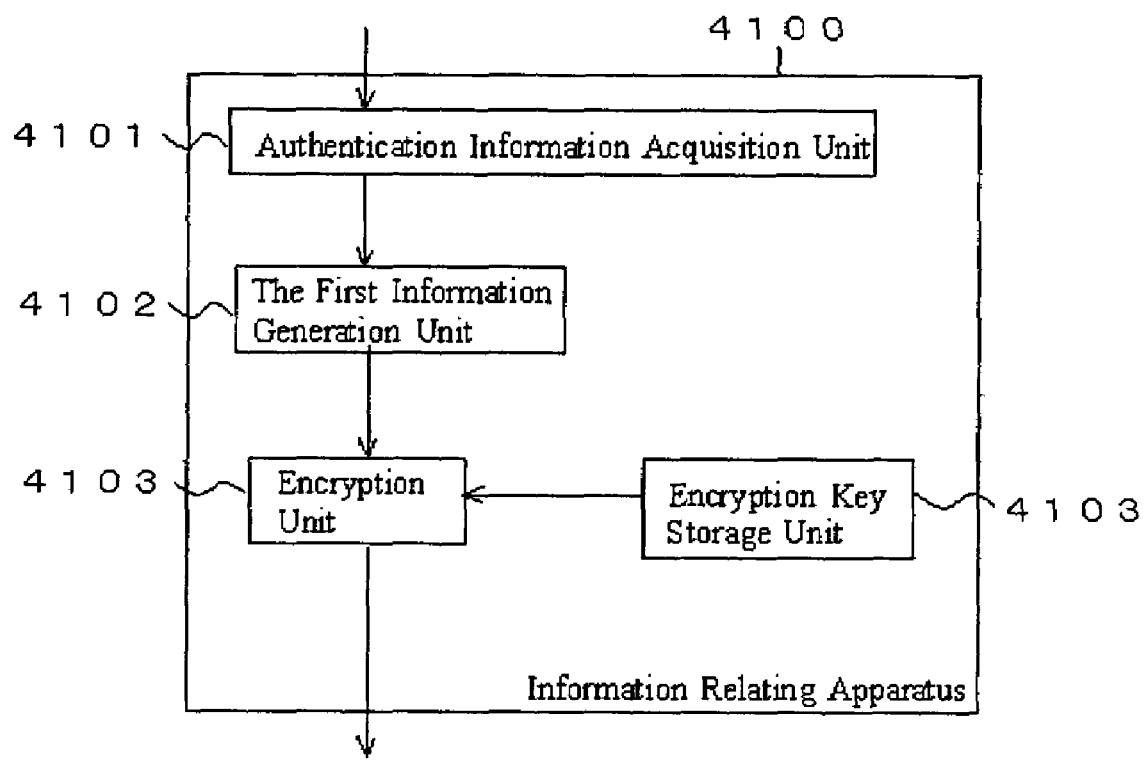
FIG. 41 is a block diagram of the information relating apparatus in the fourth embodiment of the present invention.

FIG. 41 is a functional block diagram of information relating apparatus. Information relating apparatus comprises authentication information acquisition unit 4101, the first information generation unit 4102, encryption key storage unit 4103, and encryption unit 4104.

Authentication information acquisition unit 4101 acquires authentication information. For example, it may be acquired from a keyboard, a key pad, or a medium such as a memory card. Moreover, authentication information may be acquired by a camera or sensor acquiring biological authentication information such as iris code information or a fingerprint etc. Moreover, authentication information transmitted from a distance through the network may be acquired. In this case, communication executed through the network is preferably encrypted by, for example, SSL (Secure Socket Layer) etc.

The first information generation unit 4102 generates the first information which has a predetermined relationship with the authentication information acquired by the authentication information acquisition unit. For example, authentication information may be the first information, however, the first information may be generated by processing a predetermined arithmetic operation of authentication information.

Encryption key storage unit 4103 stores an encryption key. For example, the key is stored in memory or hard disk etc. This encryption key may be a key used for the common key encryption system or a public key used for the public key encryption system (for example, public key corresponding to the private key).

Encryption unit 4104 encrypts the first information generated in the first information generation unit 4104 by encryption the key stored in encryption key storage unit 4103.

Figure 42:
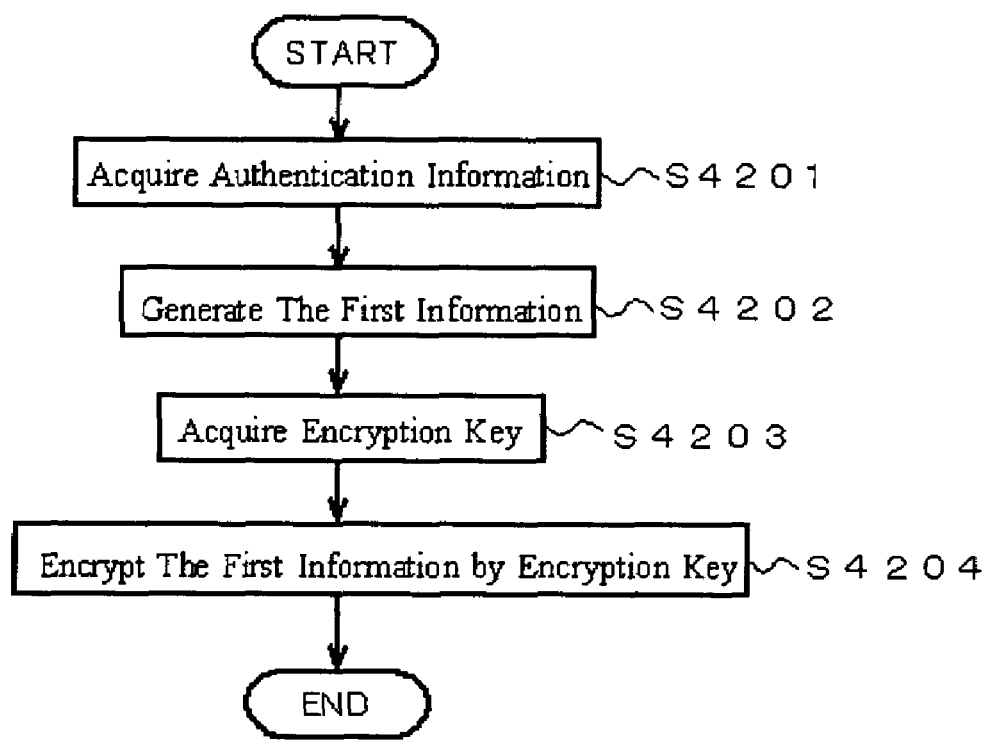
FIG. 42 is a flow chart of the information relating apparatus in the fourth embodiment of the present invention.

FIG. 42 is a flow chart of the process of information relating apparatus. In step S4201, authentication information is acquired by the authentication information acquisition unit 4101.

In step S4202, the first information is generated by the first information generation unit 4102.

In step S4203, the encryption key is acquired by encryption unit 4104.

In step S4204, the first information is encrypted by the encryption key.

After that, encrypted first information is stored in the authentication request apparatus or recorded in a memory card which will be inserted in the authentication request apparatus.

According to the present embodiment, encrypted first information can be generated. Especially, since encrypted first information can be generated in an apparatus other than the authentication apparatus, it is not necessary for the authentication apparatus and the information relating apparatus to communicate through the network etc. Thereby it becomes possible to simplify and downsize the authentication apparatus.

Figure 43:
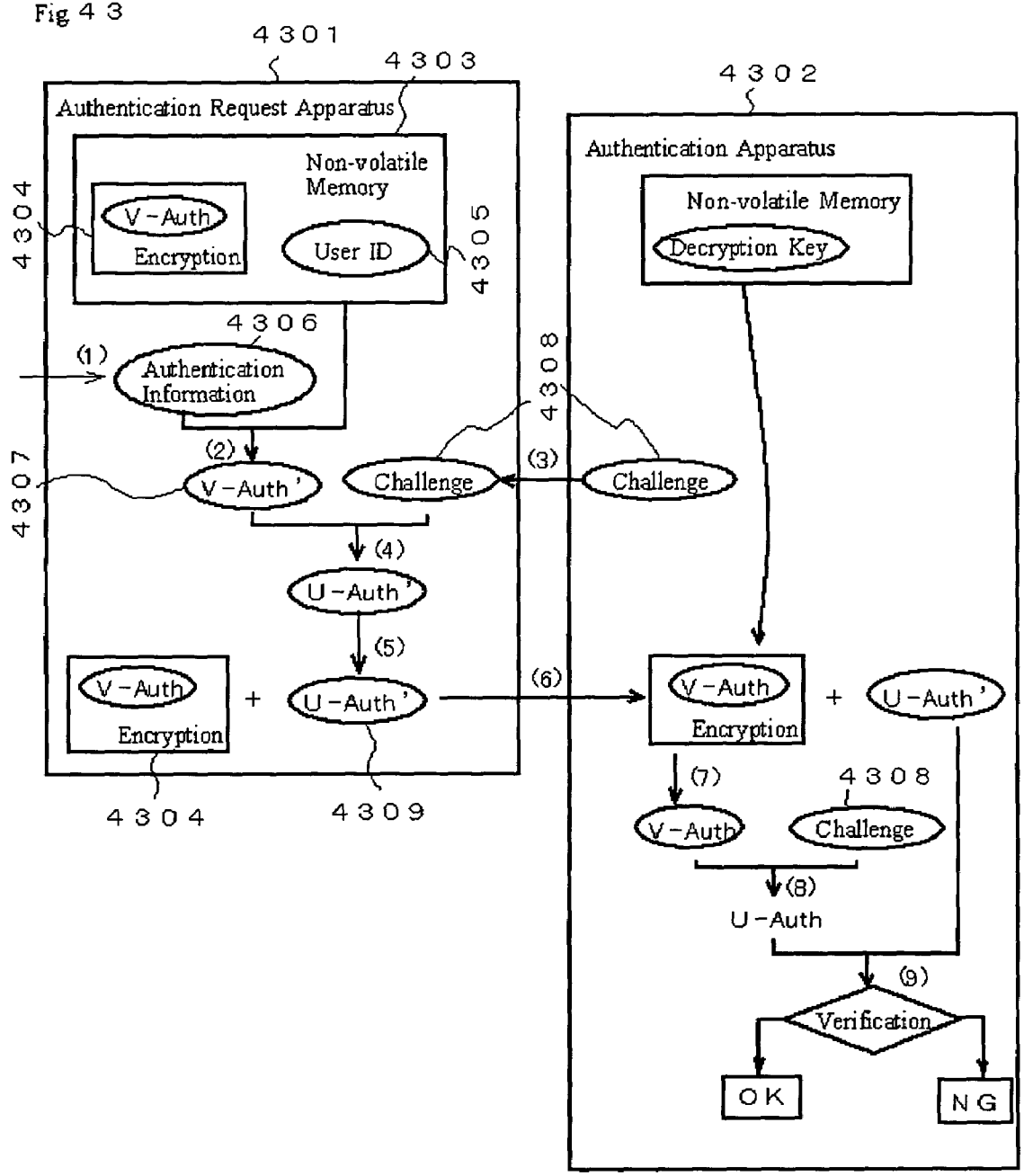
FIG. 43 is a diagram of an example of the embodiment of the present invention.

FIG. 43 illustrates embodiments described hereinabove.

FIG. 43 illustrates authentication request apparatus 4301 and authentication apparatus 4302. Authentication request apparatus 4301 comprises non-volatile memory 4303. Non-volatile memory 4303 may be removable or may be non-removable. Non-volatile memory 4303 stores encrypted V_Auth. V_Auth corresponds to the first information. Encrypted V_Auth corresponds to encrypted first information. Moreover, non-volatile memory 4303 may store user ID. User ID indicates a value that has a low probability of having an identical value to the other such as a time when V_Auth was encrypted and user's credit card number etc. One of the objects of using user ID is to prevent the case where the same password is input by a user as when V_Auth is generated by the information relating apparatus, so that the same V_Auth is generated. Moreover, user ID may indicate what the encrypted first information is for.

V_Auth is generated based on a formula indicated in the first line of FIG. 44. Herein, "password" indicates predetermined authentication information, "∥" indicates concatenation, and "password∥user ID" indicates information wherein a password and user ID are concatenated. $Hash_1$ indicates a hash function.

When authentication request apparatus 4301 requests authentication for authentication apparatus 4302, (1) authentication information is input. This input is executed by the user of authentication request apparatus with the use of the authentication information input unit. For example, a keyboard and a key pad are used for inputting, and the user's biological information such as a fingerprint and iris code information etc. are input.

Processes of the authentication information processing unit will be described hereinafter. (2) V_Auth' is calculated based on a formula of FIG. 44 (2). (3) Challenge 4308 is received from authentication apparatus 4302. "Challenge" corresponds to a value generated according to necessity and to a random string for generating authentication string. Preferably, it is a value that is generated to be different with respect to each transmission from the authentication apparatus, so that it is impossible to calculate a subsequent value to be generated next time. (4) U_Auth' is calculated when V_Auth' is determined and challenge 4308 is received. U_Auth' is determined based on a formula of FIG. 44 (3). $Hash_2$ indicates a hash function, and it may be the same function as $hash_1$ or may be another function.

(5) Encrypted V_Auth stored in non-volatile memory is extracted and related to U_Auth' when U_Auth' is determined. (6) Encrypted V_Auth related to U_Auth' is transmitted to authentication apparatus 4302.

Processes of authentication apparatus 4302 will be described hereinafter.

(7) Encrypted V_Auth, which is received from authentication request apparatus 4301, is decrypted by a decryption key stored in non-volatile memory of authentication apparatus 4302, so that V_Auth is acquired. (8) U_Auth is calculated from V_Auth and challenge 4308 transmitted to authentication request apparatus 4301 based on a formula of FIG. 44 (4). (9) Verification of U_Auth and U_Auth' is executed. In cases where authentication information which is input to the authentication request apparatus and password at the point of generation of V_Auth are identical, U_Auth and U_Auth' become identical to each other. Thereby it becomes able to authenticate that the user who inputs authentication information is the same person who has been granted encrypted V_Auth.

In the authentication request apparatus, since authentication information is processed by concatenation and the hash function, the calculated result does not require a large amount of memory or storage, thereby simplification and downsizing of the authentication apparatus becomes possible. Moreover, since processing of the authentication information is executed with the use of challenge, even if information transmitted from the authentication request apparatus to the authentication apparatus is stolen, security problems will not arise. Furthermore, to be different from the conventional authentication method, it is not necessary for the authentication apparatus to store user ID or password. Therefore, it is not limited to issue encrypted V_Auth.

Figure 30:
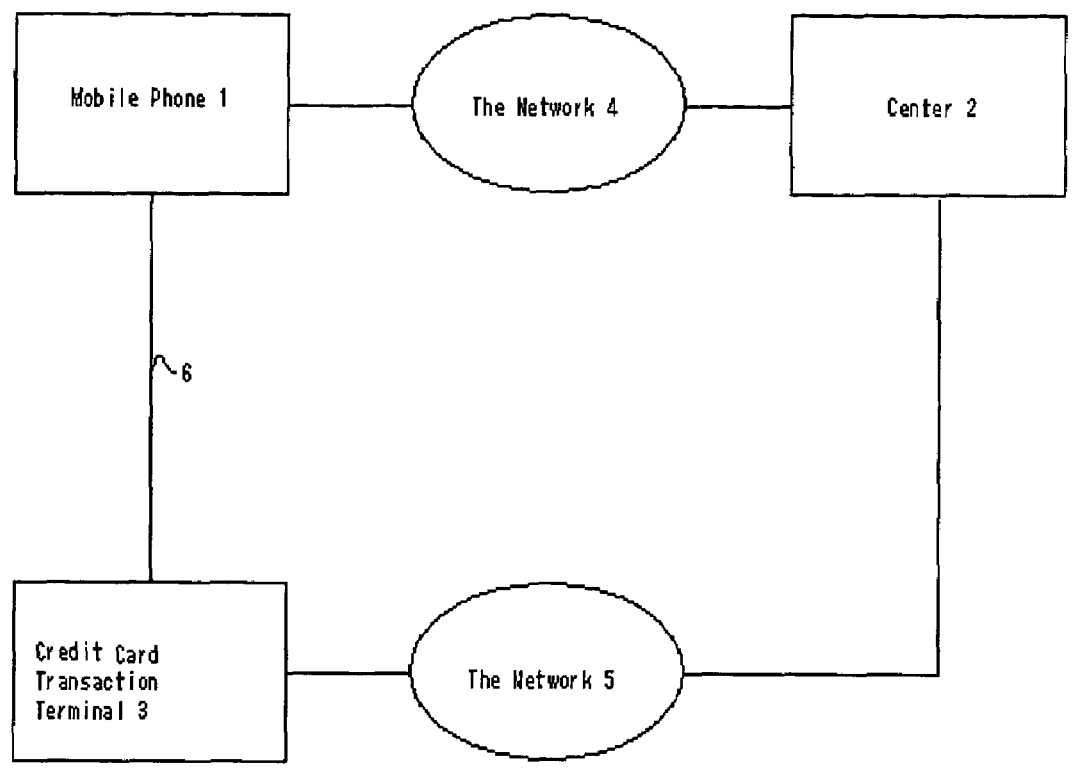
FIG. 30 is a block diagram of the electronic credit card transaction process in the fifth embodiment of the present invention.

As the fifth embodiment of the present invention, an electronic credit card transaction system will be described. FIG. 30 is a block diagram of an electronic credit card transaction system in the present embodiment. This electronic credit card transaction system comprises user's mobile phone 1, center 2 of credit card issuer, credit card transaction terminal 3 placed in a retail store. Mobile phone 1 and center 2 are connected through the telecommunication network 4 of the mobile phone, credit card transaction terminal 3 and center 2 are connected through the credit card transaction network 5, and mobile phone 1 and credit card transaction terminal 3 arbitrarily communicate with each other by using local wireless communication facility 6 such as infrared data communication, Bluetooth, wireless LAN, or a wireless communication facility of a non-contact IC card etc. In mobile phone 1, Java™ application for credit card transaction is downloaded in advance. In credit card transaction terminal 3, an account number of a credit card issuer is stored for verifying the digital signature of the credit card issuer on an electronic credit, and the master key Km of the encryption key of the electronic credit is managed in center 2 and credit card transaction terminal 3.

Figure 1:
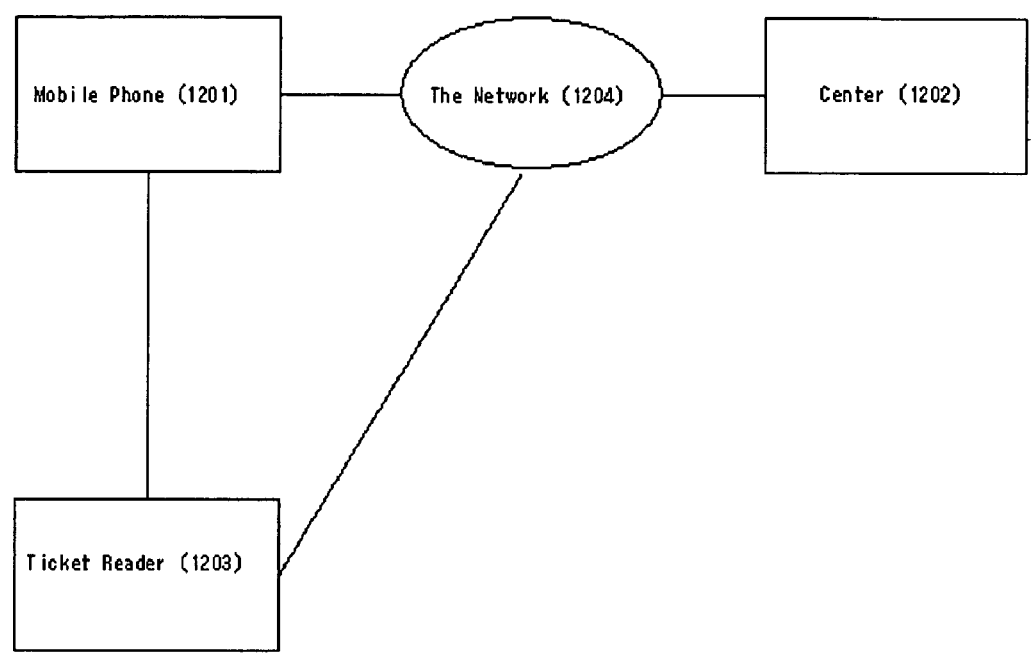
FIG. 1 is a flow chart of the download process of electronic credit in the fifth embodiment of the present invention.

Electronic credit such as credit card information converted to digitalized information, a type of electronic value, is downloaded from center 2 to mobile phone 1. FIG. 1 shows the download process of an electronic credit. Firstly, when user activates the Java™ application for credit card transaction (100), the menu window is displayed (101). After that, when user performs an electronic credit issue request operation (102), a window for inputting a credit card number, PIN, and password (VPW) corresponding to the electronic credit to be downloaded is displayed (103). When the user inputs credit card number, PIN, and password, mobile phone 1 stores result of hash calculation Hash(VPW) as reference data of the password in memory (105), further generates user identification information UID=Hash(CN∥T)(∥ indicates concatenation of data) from credit card number (CN) and time (T), and stores it in memory (106), further generates value authentication information F(VPW)=Hash(VPW∥UID) from password (VPW) and user identification information (UID) (107), and transmits an electronic credit issue request including the credit card number, PIN, value authentication information F(VPW) to center 2 (108). Center 2 verifies credit card number and PIN, and authenticates that the user is the cardholder of the credit card (109). In cases where a user is authenticated, electronic credit (ev) comprising value authentication information F(VPW) is generated (110). Value authentication information F(VPW) is executed by a hash calculation, concatenated with master key Km, and further calculated by hash function, so that encryption key Kc=hash(Km∥Hash(F(VPW)))

of a common key encryption system encrypting electronic credit (ev) is generated (111). By using generated encryption key Kc, electronic credit (ev) is encrypted, then encrypted electronic credit encrypt(ev)=Enc(Kc, ev) is generated (112). Encrypted electronic credit (ev) is transmitted to mobile phone 1 (113). Encrypted electronic credit (ev) is stored in memory of mobile phone (114). After that, mobile phone 1 displays completion of the download, and the download process of an electronic credit is finished.

Figure 3:
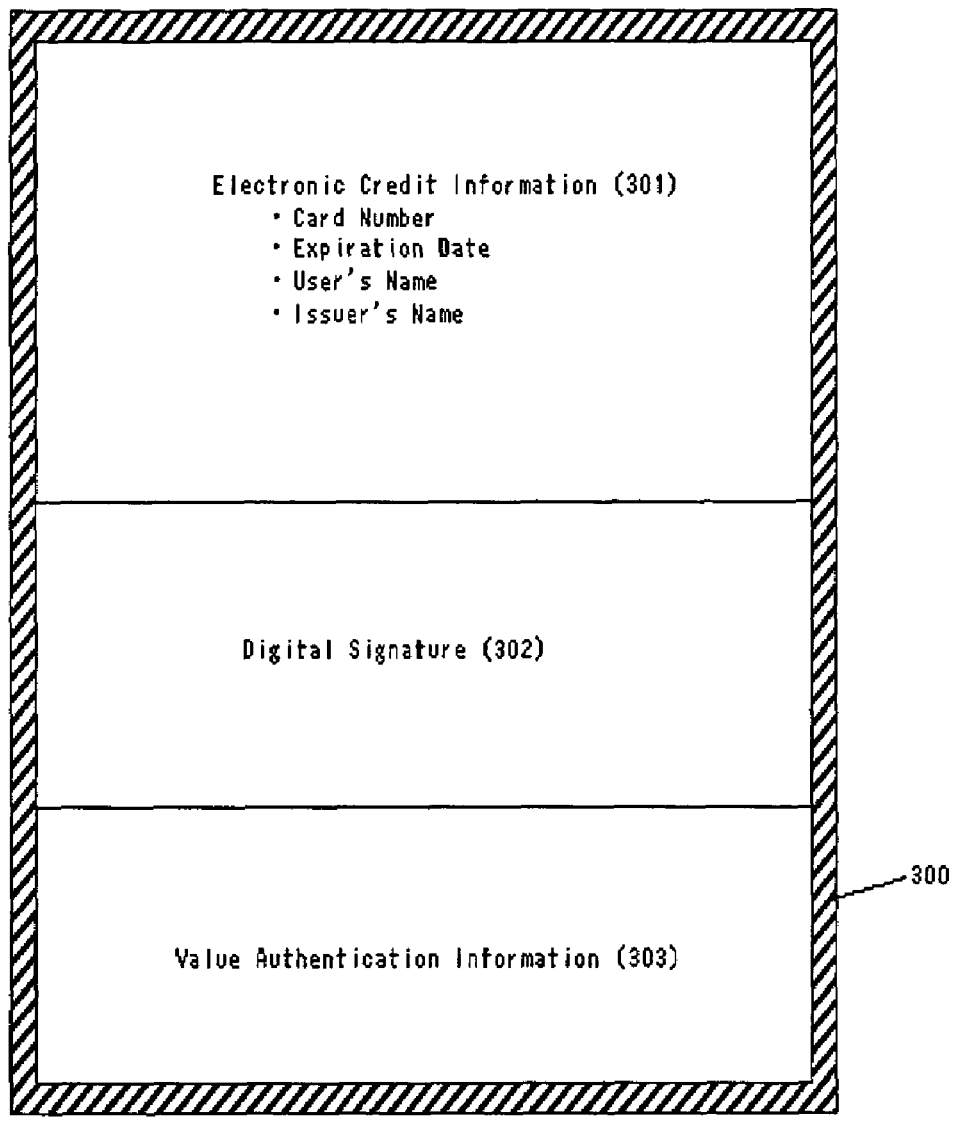
FIG. 3 is a diagram of the data structure of electronic credit in the fifth embodiment of the present invention.

The data structure of encrypted electronic credit 300 is shown in FIG. 3. Electronic credit which is an electronic credit before being encrypted comprises electronic credit information 301 indicating credit card number, expiration date, user's name, and credit card issuer etc.; digital signature 302 corresponding to electronic credit information 301, and value authentication information F(VPW) 303.

When the Java™ application for credit card transaction is ended, the password input by the user is deleted from memory. Since data stored in memory of a mobile phone is data wherein the password is calculated by the hash function, even if the mobile phone is stolen and its memory is analyzed, there's no risk of the password being revealed.

Next, the credit card transaction process by using downloaded electronic credit will be described with the use of FIG. 2.

Credit card transaction terminal 3 generates random number R as challenge information. When user activates the Java™ application for credit card transaction (201), a menu panel is displayed (202). When the user operates electronic credit card transaction (203), a panel for inputting password (VPW) of electronic credit is displayed (204). When user inputs password (VPW') (205), mobile phone 1 calculates the hash function Hash(VPW') of password (VPW'), verifies Hash(VPW') of reference data stored in memory, and authenticates the user (206). In cases where it is not identical to reference data, an error message is displayed. In cases where it is identical to the reference data, credit request from credit card transaction terminal 3 is received (207). Electronic credit request includes random number R. Mobile phone 1 calculates value authentication information F(VPW')=Hash(VPW∥UID), concatenated hash function Hash(F(VPW')∥R) of random number R and value authentication information F(VPW'), and hash function Hash(F (VPW')) of value authentication information (208). Encrypted electronic value encrypt(ev), Hash(F(VPW')∥R), and Hash(F(VPW')) are transmitted to credit card transaction terminal 3 (209). Credit card transaction terminal 3 calculates the hash function of the concatenation from the received hash function of the value authentication information Hash(F(VPW')) and master key Km, generates decryption key Kc'=Hash(Km∥Hash(F(VPW'))) of the common key encryption system of encrypted electronic credit, and decrypts electronic credit (210).

Credit card transaction terminal 3 extracts value authentication information F(VPW) from decrypted electronic credit (ev), calculates the hash function Hash(F(VPW)∥R) concatenated to random number R, and verifies Hash(F (VPW')∥R) received from mobile phone 1. When they are identical, the user is authenticated as the rightful owner of the electronic credit (211). When they are not identical, an error message is displayed. Moreover, credit card transaction terminal 3 verifies digital signature 302 (212), and when an error is detected, an error message to the user is displayed. When an error has not been detected in verification of digital signature 302 (212), credit card transaction terminal 3 transmits the result of the verification to mobile phone 1 (213), then further transmits authorization request of credit card transaction to center 2 (215). Center 2 processes authorization (216) and transmits a response of authorization request to credit card transaction terminal 3 (217), so that the credit card transaction in credit card transaction terminal 3 is completed. However, mobile phone 1, which received the authentication result, displays a message of completion of the credit card transaction process of electronic credit (214) and terminates credit card transaction process of electronic credit. Also in this case, password input by user is deleted when the Java™ application for the credit card transaction is terminated.

Since all data communicated between mobile phone 1 and credit card transaction terminal 3 is data calculated by hash function or encrypted, even if the data is intercepted, it would be impossible to pose as the rightful owner by using the data which has been intercepted.

From the aspect of the present embodiment hereinabove, the password corresponds to authentication information for electronic credit. Moreover, the password may correspond to biological information such as a fingerprint and iris code information of the user. In this case, mobile phone 1 comprises a fingerprint authentication sensor and an iris authentication camera etc.

In a still further aspect of the present embodiment, the authentication system thereof may be used for authentication processes of other electronic values such as an electronic debit card transaction system, an electronic ticket system, an electronic coupon system, a member's card, and ID card etc. by changing the content of electronic credit information 301. For example, in the case of an electronic debit card transaction system, the only action required is to input information such as a bank account number, user's name and issuer's name etc., to electronic credit information 301.

As the sixth embodiment of the present invention, an electronic credit card transaction system using a mobile credit card transaction terminal corresponding to multiple categories of credit cards and multiple acquirers, credit card processing companies, will be described. In the present embodiment, multiple electronic credits (ev) corresponding to credit cards translated into digitalized information are managed in a mobile phone, and transactions with a credit card transaction terminal is executed with the use of electronic credit (ev) which is selected by the user. Since the credit card transaction terminal is a mobile type, for example, the staff of an affiliated store such as a retail store or restaurant etc. can bring a credit card transaction terminal, so that a transaction can be executed at sales floors without keeping users waiting.

Figure 4:
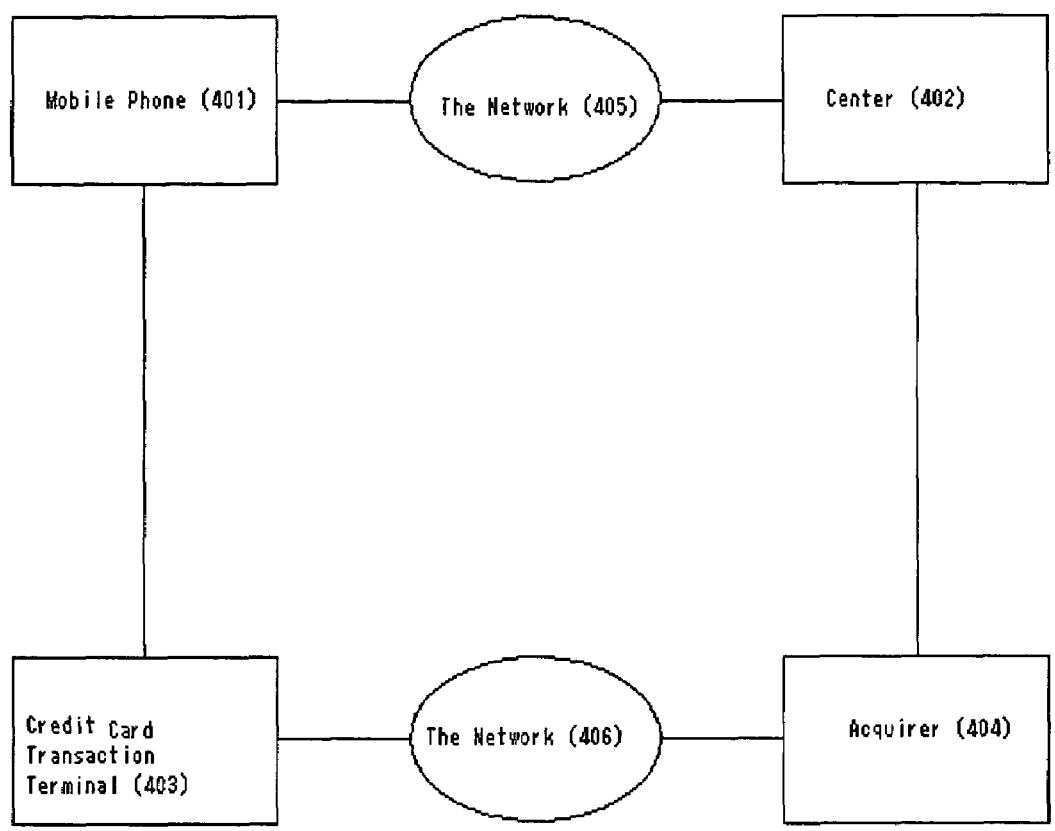
FIG. 4 is a block diagram of the electronic credit card transaction system in the sixth embodiment of the present invention.

FIG. 4 is a block diagram of an electronic credit card transaction system of the sixth embodiment of the present invention. This electronic credit card transaction system comprises the user's mobile phone 401, center 402 of the credit card issuer, credit card transaction terminal 403 which the staff may transport, acquirer 404 providing credit card transaction service for affiliated stores, the network 405 connecting mobile phone 401 with center 402, and the network 406 connecting credit card transaction terminal 403 with acquirer 404.

The network 405, comprising wireless communication network of mobile phone and the internet, enables wireless communication between mobile phone 401 and center 402. In communication between mobile phone 401 and center 402, a secure session such as SSL (Secure Socket Layer) and TLS (Transport Layer Security) are always established, and communication data is encrypted and transmitted.

The network 406, comprising a wireless communication network and a credit card transaction network, enables wireless communication between credit card transaction terminal 403 and acquirer 404. Mobile phone 401 arbitrarily communicates with credit card transaction terminal 403 by using a local wireless communication function such as infrared data communication, Bluetooth, wireless LAN, and wireless communication using non-contact IC card etc. Center 402 communicates with acquirer 404 through a secure line.

Credit card transaction terminal 403 corresponds to multiple categories of electronic credit card transaction, moreover it corresponds to multiple acquirers. Therefore, practically, credit card transaction terminal 403 communicates with multiple acquirers through the network 406 and processes transactions with multiple centers of the credit card issuer.

Wallet application managing electronic credit (ev) is downloaded to mobile phone 401 in advance. Besides, in credit card transaction terminal 403, card information of each card is stored in order to correspond to transactions of multiple categories of credit cards. Master key Km for generating encryption key for decrypting the encrypted part of electronic credit (ev) is managed in center 402 and credit card transaction terminal 403.

Figure 5:
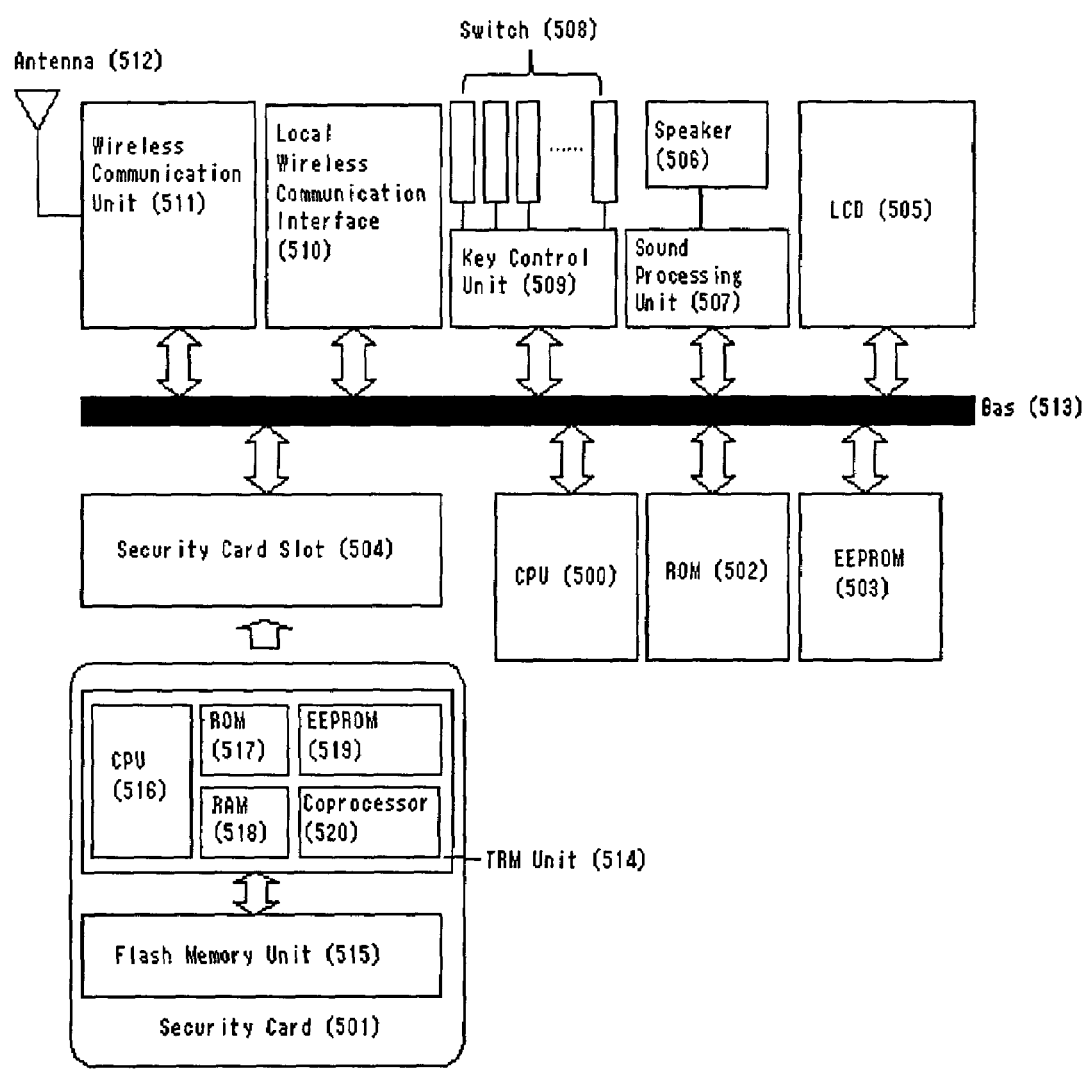
FIG. 5 is a block diagram of the credit card transaction terminal in the sixth embodiment of the present invention.

FIG. 5 is a block diagram of the internal configuration of credit card transaction terminal 403. Credit card transaction terminal 403 comprises a CPU (Central Processing Unit) which processes data stored in EEPROM (Electronically Erasable and Programmable Read Only Memory) 503 and transmission data based on program stored in ROM and controls components through bus 513, LCD 505, local wireless communication interface 510, security card slot 504, switch 508 for operating credit card transaction terminal, key control unit 509 for detecting operation of switch, sound processing unit 507 which drives speaker 506, wireless communication unit 511 which controls wireless data communication through antenna 512, and security card 501.

Local wireless communication interface 510 is a communication interface such as infrared data communication, Bluetooth, wireless LAN, and wireless communication using non-contact IC for communicating with a mobile phone.

Security card 501 is a device for safety management of a master key (Km) and an authentication process of electronic credit, and comprises TRM (Tamper Resistant Module) unit 514 and flash memory unit 515. TRM unit comprises CPU 516, ROM 517, RAM 518, EEPROM 519, and co-processor 520, and has a tamper-resistant function for preventing external unauthorized access.

Flash memory unit 515 stores electronic credit information list 601 and transaction history information 602 while encrypting each of them as shown in FIG. 6. Electronic credit information list 601 is a list wherein information related to electronic credit to which credit card transaction terminal corresponds. Transaction history information 602 is historical information of electronic transactions processed by the credit card transaction terminal. Electronic credit information list 601 and transaction history information 602 are encrypted and decrypted by CPU 516, typically in conjunction with co-processor 520.

FIG. 6 shows the case where information regarding 4 categories of electronic credits (ev) are registered in electronic credit information list 601. In electronic credit information list 601, card type, master key (Km), certificate of credit card issuer, negative list, acquirer information, risk management information are registered respectively to one type of the electronic credit.

Card type is information indicating the type of electronic credit (ev). Master key is a master key for generating the decryption key decrypting encrypted part of this electronic credit (ev). Certificate of credit card issuer is the certificate of the credit card issuer that issues this electronic credit (ev). The negative list is list of card numbers of invalid electronic credit (ev) in this type. Acquirer information is information regarding acquirer providing credit card transaction service of this type of electronic credit (ev). Risk management information is information such as floor limit etc. used for determining whether on-line authentication is executed at the point of transaction of this type of electronic credit (ev).

Moreover, sound information such as sound effect etc. and multimedia information such as image information etc., which are used at the point of electronic credit card transaction process, may be registered in electronic credit information list 601 with respect to each type of electronic credit (ev). For example, sound information and image information, which are specific to the type of electronic credit (ev) and to the credit card brand, are registered, furthermore, the sound effect is set to be output by speaker and image information is set to be displayed on LCD at the point of completion of the transaction process, so that it becomes possible to show usage of the type or the credit card brand of electronic credit (ev) explicitly.

Since access to information stored in flash memory unit 515 is controlled by CPU 516 of security card 501, although credit card transaction terminal 403 can read and write to transaction history information 602 through TRM unit 514 of security card 501, it cannot write on electronic credit information list 602. Master key (Km) in electronic credit information list 601 is controlled so as not to be read and written from credit card transaction terminal 403.

Electronic credit information list 601 is updated by security card 501 and acquirer establishing encrypted communication session through credit card transaction terminal 403 and the network 406 according to necessity. For example, addition and deletion of electronic credit information and updating of risk management information and updating of master key (Km) and negative list to increase security are executed based on contract between affiliated stores and acquirer.

Mobile phone 401 comprises a local wireless communication interface. Wallet application of mobile phone 401 connects to credit card transaction terminal 403 through a local wireless communication interface and transacts electronic credit with the use of electronic credit (ev) managed by wallet application.

Figure 7:
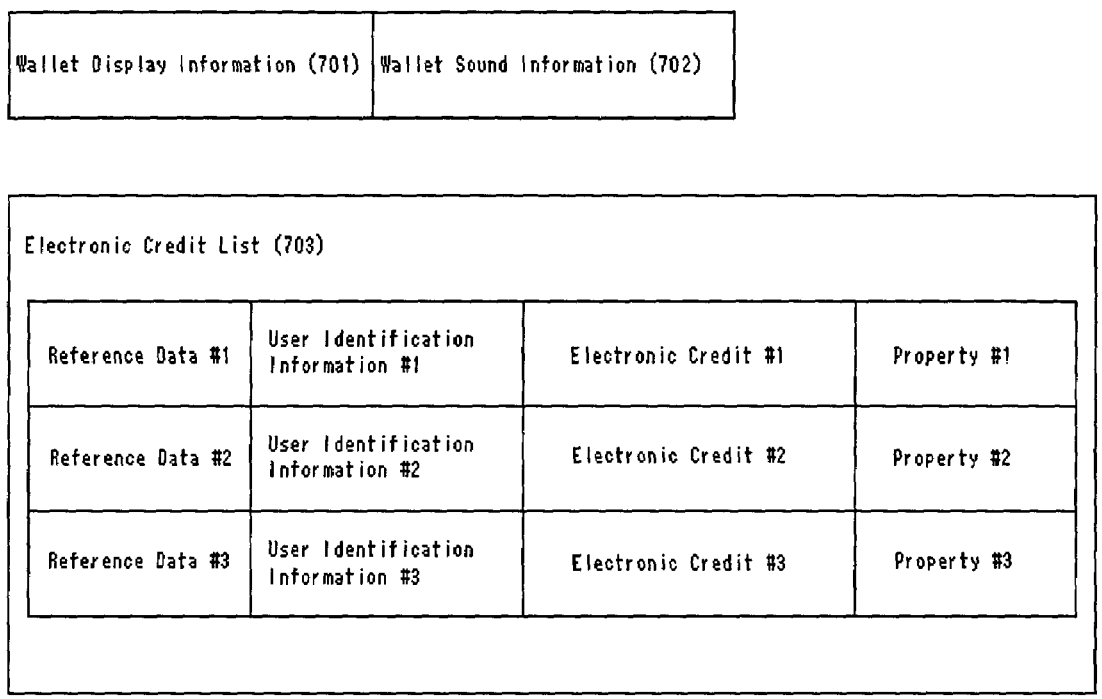
FIG. 7 is a diagram of the information managed by a wallet application stored in the non-volatile memory of a mobile phone in the sixth embodiment of the present invention.

Non-volatile memory of mobile phone 401 stores wallet display information 701, wallet sound information 702 and electronic credit list 703 of FIG. 7 as information managed by the wallet application. The wallet display information 701 is display information such as pictures and images displayed by the wallet application on screen of mobile phone. The wallet sound information 702 is sound information such as sound effects and melody information used by the wallet application. Electronic credit list 703 is a list of electronic credit (ev) managed by the wallet application.

FIG. 7 shows the case where three electronic credits (ev) are registered in the electronic credit list 703. In electronic credit list 703, reference data, user authentication information (UID), electronic credit (ev), and property are registered respectively to one electronic credit (ev). Reference data and user authentication information (UID) will be described in detail hereinafter. A "property" is attribute information which is set on the electronic credit (ev). Examples of property include: an order wherein wallet application displays list of electronic credit (ev), a sound effect used at the point of electronic credit card transaction, and operations of LED and vibration device etc. Thereby user becomes able to set an order of displaying electronic credit (ev) according to usage frequency, to select sound effects which is output at the point of completion of electronic credit (ev) or at the point of failure of transaction from wallet sound information 702 and set them, to set LED to blink at the point of completion of electronic credit (ev), and to set vibration device to operate at the point of failure of transaction.

Figure 8:
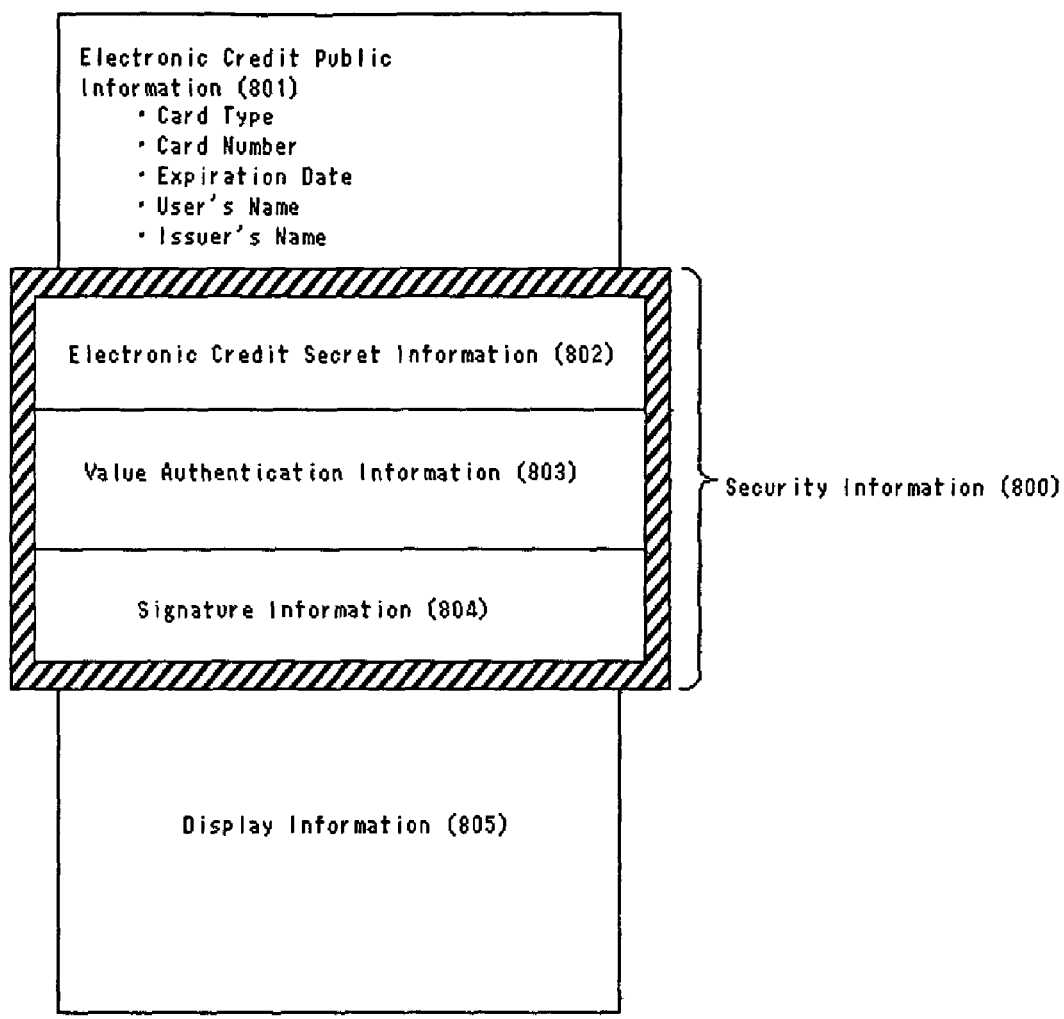
FIG. 8 is a diagram of the data structure of the electronic credit in the sixth embodiment of the present invention.

FIG. 8 shows the data configuration of electronic credit (ev). Electronic credit (ev) is comprised of electronic credit public information 801, security information 800, and display information 805. Security information 800 is information used for the authentication process of electronic credit, and encrypted by the encryption key generated from the master key (Km). Display information 805 is display information such as a logo mark of a credit card, pictures of user and layout information etc. and is an optional setting. Therefore, some have display information 805 and the others do not have it according to electronic credit (ev).

Electronic credit public information 801 includes information to be disclosed to user regarding electronic credit such as card type of electronic credit (ev), card number, expiration date, user's name, name of credit card issuer etc. Wallet application uses this electronic credit public information 801 at the point of displaying electronic credit on the screen.

Security information 800 is further comprised of electronic credit secret information 802, value authentication information 803, and signature information 804. Value authentication information 803 will be described in detail hereinafter.

Electronic credit secret information 802 stores information regarding electronic credit such as risk management information of credit card issuer that does not necessarily have to be disclosed to the user. At the point of electronic credit card transaction, electronic credit secret information 802 is decrypted in credit card transaction terminal 403, and used for determining whether on-line authentication is executed.

Signature information 804 is a digital signature of credit card issuer for data wherein electronic credit public information 801, electronic credit secret information 802, which is electronic credit secret information before being encrypted, and value authentication information 803, which is value authentication information before being encrypted, are concatenated. At the point of an electronic credit card transaction, signature information 804 is decrypted in credit card transaction terminal 403, and used for validation of electronic credit (ev).

Signature information 804 is preferably a digital signature generated with the use of a key which has enough key length for security based on public key encryption system. However, it may be data wherein electronic credit public information 801, electronic credit secret information 802 which is electronic credit secret information before being decrypted, and value authentication information 803 which is value authentication information before being encrypted are concatenated and calculated by the hash function.

Figure 9:
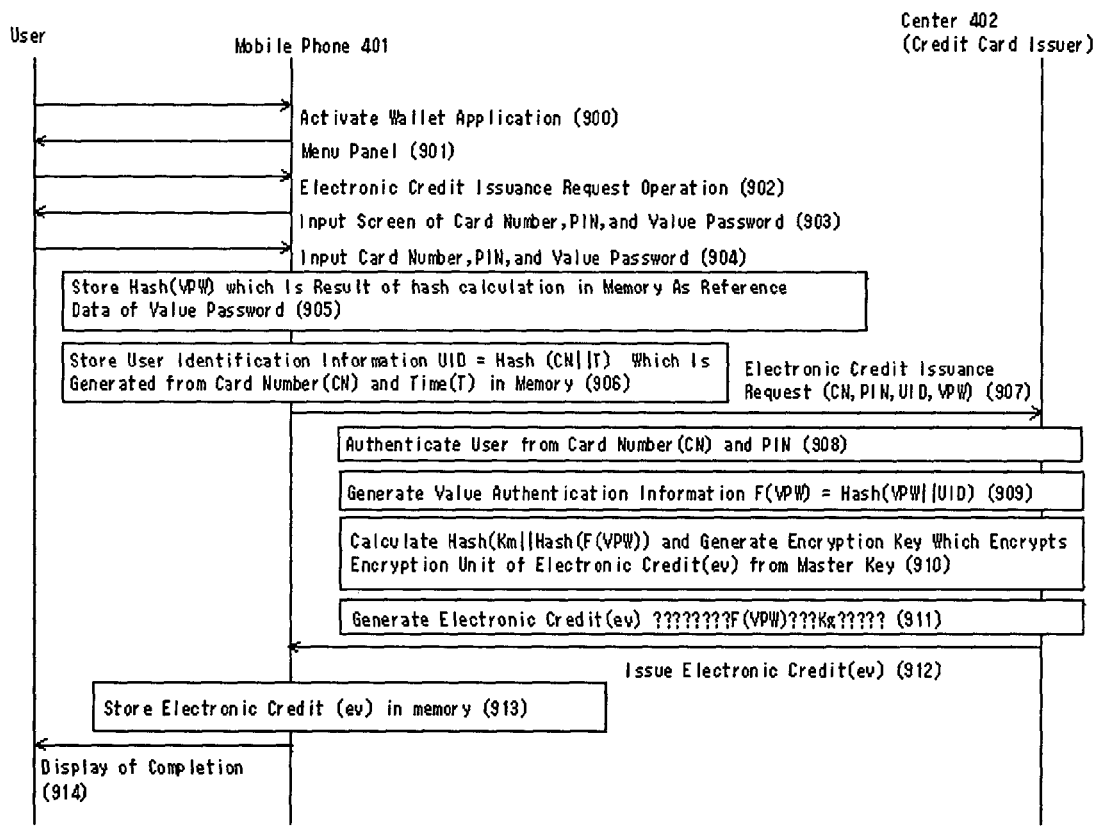
FIG. 9 is a flow chart of the download process of the electronic credit in the sixth embodiment of the present invention.

Next, the process wherein the user downloads electronic credit (ev) from center 402 to mobile phone 401 will be described. FIG. 9 shows the process for downloading electronic credit (ev). When user activates wallet application (900), menu panel is displayed (901). When user does electronic credit issuance request operation (902) by selecting menu, panel for inputting card number of electronic credit, PIN (Personal Identification Number), and value password (VPW:<U>v</U>alue<U>p</U>ass<U>w</U>ord) is displayed (903). In this case, card number and PIN correspond to card number and PIN of credit card which the user has already owned, and electronic credit to be downloaded is secondary card of user's card. Moreover, electronic credit may be issued as new contract between the user and the credit card issuer. In this case, user is notified of the proprietary card number and the PIN for electronic credit from credit card issuer by mail.

When user inputs card number, PIN and value password (904), mobile phone 401 stores the value password which is acquired by the hash calculation Hash(VPW) as reference data of value password (905). Moreover, mobile phone 401 generates user identification information UID=Hash(CN∥T) from card number (CN) and time (T) and stores it in memory (906). Then, mobile phone 401 transmits electronic credit issuance request including card number (CN), PIN, user identification information (UID) and value password (VPW) to center 402 (907). At this point, reference data Hash(VPW) and user identification information UID=Hash(CN∥T) are stored in each field of electronic credit list 703 in the memory of mobile phone 401 as data regarding electronic credit to be newly downloaded.

Center 402, receiving electronic credit issuance request, authenticates whether user is the rightful owner of the electronic credit to be issued by card number (CN) and PIN (908). When it is authenticated in center 402, value authentication information F(VPW)=Hash(VPW∥UID) is generated from value password (VPW) and user ID (UID)(909). Then, value authentication information F(VPW) is acquired by the hash calculation, concatenated with master key (Km) and further calculated by the hash function, so that encryption key Kc=Hash(Km∥Hash(F(VPW))) of common key encryption system for encrypting electronic credit (ev) is generated (910). Moreover, center 402 generates the electronic credit public information of electronic credit (ev), electronic credit secret information based on user's credit information and risk evaluation of value password (VPW), and electronic credit (ev) having data structure illustrated in FIG. 8 by using generated value authentication information F(VPW) and encryption key (Kc). In cases where the user is not authenticated from card number (CN) and PIN, an error message is transmitted from center 402 to mobile phone 401 and the download process of electronic credit (ev) is terminated.

Generated electronic credit (ev) is transmitted to mobile phone 401 (912) and stored in memory of mobile phone 401 (913). Mobile phone 401 displays completion of download (914), so that download process of electronic credit is completed. At this point, electronic credit (ev) is stored in electronic credit list 703 in the memory of mobile phone 401 as new electronic credit. Moreover, property is set to default. In the default setting, sound, which is used at the point of electronic credit card transaction, is not set.

Moreover, in step (904) of FIG. 9, when the user determines not to set the value of the password for the sake of convenience, in step (905), mobile phone 401 does not execute the hash calculation of the value password (VPW), and NULL, indicating that the value password (VPW) is not set, is set to the field of reference data of electronic credit list 703. In step (907), NULL is set to the field of value password (VPW), and an electronic credit issuance request is transmitted. In step (909), value authentication information F(VPW)=Hash(UID) is generated by executing the hash calculation of user identification information (UID).

Moreover, when the wallet application is terminated, value password (VPW), input by user, is deleted from memory of mobile phone 401. Since reference data stored in memory of mobile phone is data wherein the value password is acquired by the hash calculation, it is impossible to steal the value password even if the mobile phone is stolen and the internal memory of the mobile phone is analyzed.

Figure 10:
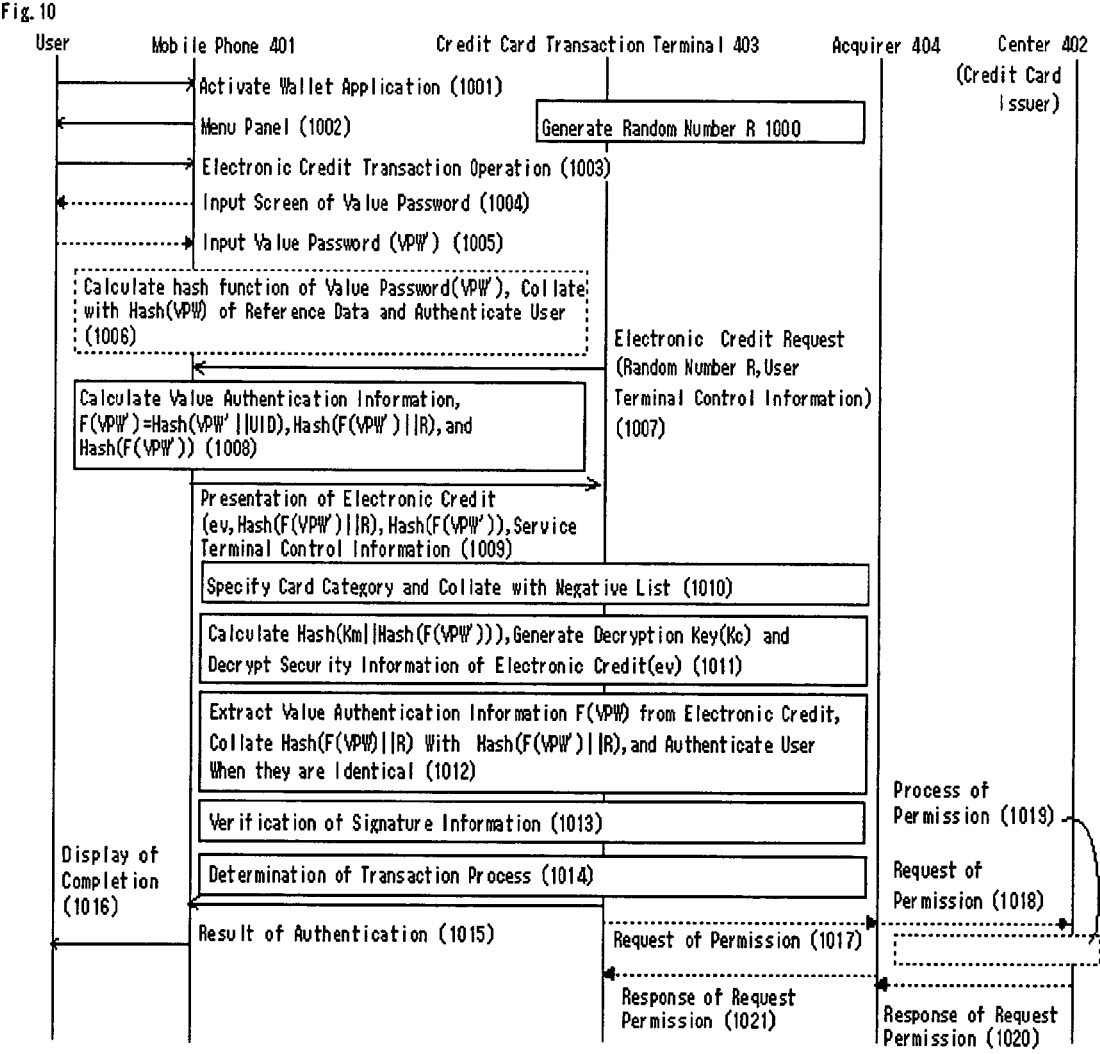
FIG. 10 is a flow chart of the electronic credit card transaction process in the sixth embodiment of the present invention.

The process of electronic credit card transaction by using downloaded electronic credit (ev) will be described. FIG. 10 shows the process of electronic credit card transaction by using downloaded electronic credit (ev). When a member of the staff starts operation of electronic credit card transaction (input of settlement value etc.), credit card transaction terminal 403 generates random number R as challenge information (1000). This random number R is acquired from security card 501, and practically generated by CPU 516 of security card 501. When user activates wallet application (1001), the menu panel is displayed (1002). When user selects electronic credit from menu and executes electronic credit card transaction process (1003), menu panel for inputting the value password corresponding to electronic credit is displayed (1004).

When user inputs value password (VPW') (1005), mobile phone 401 operates hash function Hash(VPW') on the value password (VPW'), and verifies it with hash function Hash (VPW) of reference data of electronic credit on electronic credit list 703 corresponding to electronic credit thereof (1006). When they are not identical, an error message is displayed. When they are identical, an electronic credit request is received from credit card transaction terminal 403 (1007). The electronic credit request includes random number R and user terminal control information. User terminal control information is information for controlling the operation of mobile phone 401 at the point of transaction, and includes setting by credit card issuer and by affiliated store according to the situation of electronic credit card transaction. In detail, user terminal control information is information to control usage of sound effects that the user sets as property of the electronic credit and its volume level, moreover, operations of LED and vibration device. According to user terminal control information, for example, in the case of a quiet environment such as hospital etc. where loud sound is not allowed, the volume level is set to a low level that is recognizable only to user, or sound effect is muted. Moreover, LED and vibration device are controlled, so that it becomes possible to notify the user whether authentication process has succeeded. Furthermore, in the case of a noisy environment such as a busy street, volume level is set to a high level, so that it becomes possible to notify user whether authentication process has succeeded.

Mobile phone 401 calculates the value authentication information F(VPW')=Hash(VPW'||UID), Hash function Hash(F(VPW')||R) wherein value authentication information F(VPW') and random number R are concatenated, and hash function Hash(F(VPW')) of value authentication information (1008). Mobile phone 401 transmits, as a message of presenting electronic credit, electronic credit (ev), Hash function Hash(F(VPW')||R), hash function Hash(F(VPW')), and service terminal control information to credit card transaction terminal 403 (1009). At this point, display information 805 of electronic credit (ev) is not transmitted. Service terminal control information is information for controlling the operation of credit card transaction terminal 403 at the point of electronic credit card transaction and includes setting information based on property of electronic credit which the user sets. In detail, in cases where sound effects which the user set are available in user terminal control information and sound effects, which are output at the point of completion of electronic credit card transaction, are already set, service terminal control information is information to restrict the output of sound effects of credit card transaction terminal 403 at the point of completion of an electronic credit card transaction.

Credit card transaction terminal 403, after validating electronic credit public information 801 of received electronic credit (ev), transmits electronic credit (ev), Hash function Hash(F(VPW')||R), and hash function Hash(F (VPW')) to security card 501, and makes security card 501 execute off-line authentication of the electronic credit (ev) and the user. When validation of electronic credit public information 801 indicates an error, an error message is transmitted from credit card transaction terminal 403 to mobile phone 401, so that the electronic credit card transaction is terminated.

Security card 501 verifies the card type of electronic credit public information 801 with the card type of electronic credit information list 601, and specifies which information regarding electronic credit of electronic credit information list 601 such as master key (Km), certificate of credit card issuer, negative list, acquirer information, and risk management information is used in processes afterwards. It further verifies the card number of electronic credit (ev) with the negative list, and examines that electronic credit (ev) is not registered in the negative list (1010).

In cases where electronic credit indicated by information of card type of received electronic credit (ev) is not registered in electronic credit information list 601 or in cases where received electronic credit (ev) is registered in the negative list, security card 501 transmits an error message to credit card transaction terminal 403. Then, an error message is transmitted from credit card transaction terminal 403 to mobile phone 401, so that the process of electronic credit card transaction is terminated.

Moreover, security card 501 calculation the hash function wherein hash function Hash(F(VPW')) of received value authentication information and master key (Km) are concatenated, generates decryption key Kc'=(Km||Hash(F (VPW'))) of common key encryption system to decrypt security information 800 of electronic credit, and decrypts security information 800 of electronic credit by using co-processor 520 (1011).

Moreover, security card 501 extracts value authentication information 803 F(VPW) from decrypted security information 800, and calculates hash function Hash(F(VPW)||R) wherein value authentication information 803 F(VPW) and random number R are concatenated. Then, security card 501 verifies hash function Hash(F(VPW)||R) with hash function Hash(F(VPW')||R) which is received from mobile phone 401. When they are identical, the user is authenticated to be the rightful owner of the electronic credit (ev) (1012).

Moreover, security card 501 verifies the digital signature indicated by signature information 804 of decrypted security information 800 decrypted by using co-processor 520 with the use of public key in the certificate of credit card issuer, and further verifies that electronic credit (ev) is not to be tampered with or falsified (1013). In cases where Hash(F (VPW)||R) and Hash(F(VPW')||R) are not identical, or in cases where an error is detected in verification of signature information (1013), security card 501 responds with an error message to credit card transaction terminal 403. Then, an error message is transmitted from credit card transaction terminal 403 to mobile phone 401, so that the process of electronic credit card transaction is terminated.

In cases where an error is not detected in the verification of signature information (1013), that is, where electronic credit (ev) is validated, security card 501 determines whether on-line authentication as transaction processing operation is executed based on risk management information and electronic credit secret information 802 of electronic credit (ev) (1014).

In step (1014) of FIG. 10, in cases where on-line authentication is executed:

security card 501 notifies the end of the off-line authentication and requests an on-line authentication at the same point, credit card transaction terminal 403 transmits the authentication result to mobile phone 401 (1015) and further transmits a request for approval of electronic credit card transaction to acquirer 404 based on acquirer information (1017), acquirer 404 transmits request for approval of electronic credit card transaction to center 402 (1018), center 402 executes approval process (1019) and transmits response of request for approval (1020), acquirer 404 transmits response of request for approval (1021), so that processes of electronic credit card transaction is terminated. Meanwhile mobile phone 401, which received result of authentication, displays completion message (1016) and terminates electronic credit card transaction process.

Moreover, in step (1014) of FIG. 10, in cases where it is determined that on-line authentication is not necessary:

security card 501 notifies the end of off-line authentication to credit card transaction terminal 403, credit card transaction terminal 403 transmits the result of authentication to mobile phone 401 (1015) and terminates the electronic credit card transaction process, mobile phone 401 which received result of authentication displays completion message (1016) and terminates electronic credit card transaction process.

Moreover, after completion of the electronic credit card transaction process, credit card transaction terminal 403 registers the transaction history to transaction history information 602 of security card 501, and displays that the electronic credit card transaction process is terminated based on information registered in electronic credit information list 601 and received service terminal control information. For example, in cases where sound information is registered in electronic credit information list 601, credit card transaction terminal 403 outputs the sound information as a sound effect. In cases where output of sound is controlled in service terminal control information, credit card transaction terminal 403 does not output sound effect.

Moreover, mobile phone 401 indicates completion of the credit card transaction process based on properties of the credit and received user terminal control information. For example, in cases where sound information which is output at the point of completion of an electronic credit card transaction process is set, in user terminal control information, usage of a sound effect which is set in the property is permitted, and its volume is specified, mobile phone 401 outputs the sound information as sound effect at specified volume. In cases where, in user terminal control information, usage of sound effect set in the property is not permitted, mobile phone 401 does not output a sound effect. In further cases where an error message is transmitted from credit card transaction terminal 403 and electronic credit card transaction process is terminated, mobile phone 401 indicates failure of electronic credit card transaction process based on property of the credit and received user terminal control information.

Moreover, when user selects electronic credit wherein a value password is unspecified in electronic credit card transaction operation (1003), mobile phone 401 skips step (1004), (1005) and (1006) of FIG. 10, and receives electronic credit request from credit card transaction terminal 403 (1007), and generates value authentication information F(VPW')=Hash(UID) by executing hash calculation on user identification information (UID) (1008).

Moreover, in cases where signature information 804 of received electronic credit (ev) is not a digital signature base on public key encryption system but electronic credit (ev) wherein electronic credit public information 801, electronic credit secret information 802 which is decrypted, and value authentication information 803 which is decrypted, are concatenated and calculated by the hash function, in step (1013), electronic credit public information 801 of received electronic credit (ev), electronic credit secret information 802 which is decrypted, and value authentication information 803 which is decrypted are concatenated, calculated by the hash function, and collated with signature information 804. Thereby it is verified that electronic credit (ev) has not been tampered with or falsified.

Additionally, in this case of electronic credit card transactions, when the user terminates the wallet application, the value password and value authentication information which user inputs are deleted from memory. Because all data for the authentication process that are exchanged between mobile phone 401 and credit card transaction terminal 403 are calculated by a hash function or encrypted, even if they are intercepted by someone, it would be impossible for them to pose as the rightful user by using the data which has been intercepted.

Another process of electronic credit card transaction by using downloaded electronic credit (ev) will be described.

FIG. 11 shows another process of electronic credit card transaction by using downloaded electronic credit (ev). Although, in processes of FIG. 10, the user initially activates the wallet application by himself, in processes of FIG. 11, the wallet application is activated based on a message received from credit card transaction terminal 403.

When a staff member starts operation of electronic credit card transaction (input of settlement value etc.), credit card transaction terminal 403 generates a random number R as challenge information (1100). This random number R is acquired from security card 501, and practically generated by CPU 516 of security card 501. When the user executes an operation which enables reception of message from credit card transaction terminal 403 (1101), mobile phone 401 receives an electronic credit request from credit card transaction terminal 403 (1102). Electronic credit request includes transaction amount, random number R and user terminal control information.

Mobile phone 401 received the electronic credit request wherein:

the wallet application is activated and dialogue inquiring which electronic credit is used for received transaction amount is displayed (1103), when user selects electronic credit from menu and executes electronic credit card transaction operation (1104), the panel for inputting value password corresponding to electronic credit is displayed (1105).

When the user inputs value password (VPW') (1106), mobile phone 401 operates the hash function Hash(VPW') of value password (VPW'), and verifies it with hash function Hash(VPW) of reference data of electronic credit on electronic credit list 703 corresponding to electronic credit thereof (1107). When they are not identical, an error message is displayed. When they are identical, mobile phone 401 calculates value authentication information F(VPW')=Hash(VPW'||UID), Hash function Hash(F(VPW')||R) wherein value authentication information F(VPW') and random number R are concatenated, and hash function Hash(F(VPW')) of value authentication information (1108). Mobile phone 401 transmits, as a message for presenting electronic credit, electronic credit (ev), hash function Hash(F(VPW')||R), hash function Hash(F(VPW')), and service terminal control information to credit card transaction terminal 403 (1109). At this point, display information 805 of electronic credit (ev) is not transmitted.

Credit card transaction terminal 403, after validating electronic credit public information 801 of received electronic credit (ev), transmits electronic credit (ev), Hash function Hash(F(VPW')||R), hash function Hash(F(VPW')) to security card 501, and makes security card 501 execute off-line authentication of electronic credit (ev) and user. When validation of electronic credit public information 801 indicates error, an error message is transmitted from credit card transaction terminal 403 to mobile phone 401, so that the electronic credit card transaction is terminated.

Security card 501 verifies the card type of electronic credit public information 801 with card type of electronic credit information list 601, specifies which information regarding electronic credit of electronic credit information list 601 such as master key (Km), certificate of credit card issuer, negative list, acquirer information, and risk management information is used in processes afterwards, further verifies card number of electronic credit (ev) with negative list, and examines that electronic credit (ev) is not registered in negative list (1110).

In cases where electronic credit indicated by information of card type of received electronic credit (ev) is not registered in electronic credit information list 601 or in cases where received electronic credit (ev) is registered in negative list, security card 501 transmits error message to credit card transaction terminal 403. Then, the error message is transmitted from credit card transaction terminal 403 to mobile phone 401, so that the process of electronic credit card transaction is terminated.

Moreover, security card 501 calculates the hash function wherein hash function Hash(F(VPW')) of received value authentication information and master key (Km) are concatenated, generates decryption key Kc'=(Km||Hash(F(VPW'))) of common key encryption system to decrypt security information 800 of electronic credit, and decrypts security information 800 of electronic credit by using coprocessor 520 (1111).

Moreover, security card 501 extracts value authentication information 803 F(VPW) from decrypted security information 800, and calculates hash function Hash(F(VPW)||R) wherein value authentication information 803 F(VPW) and random number R are concatenated. Then, security card 501 verifies hash function Hash(F(VPW)||R) with hash function Hash(F(VPW')||R) which is received from mobile phone 401. When they are identical, the user is authenticated to be the rightful owner of the electronic credit (ev) (1112).

Moreover, security card 501 verifies the digital signature indicated by signature information 804 of security information 800 decrypted by using co-processor 520 with the use of public key in the certificate of credit card issuer, and further verifies that the electronic credit (ev) has not been tampered with or falsified (1113). In cases where Hash(F(VPW)||R) and Hash(F(VPW')||R) are not identical, or in cases where error is detected in verification of signature information (1113), security card 501 responds with an error message to credit card transaction terminal 403. Then, the error message is transmitted from credit card transaction terminal 403 to mobile phone 401, so that the process of the electronic credit card transaction is terminated.

In cases where an error is not detected, verification of signature information (1113), therefore, in cases where validity of electronic credit (ev) is verified, security card 501 determines the transaction processing operation wherein on-line authentication is executed from risk management information and electronic credit secret information 802 of electronic credit (ev) (1114).

In step (1114) of FIG. 11, in cases where on-line authentication is executed:

security card 501 notifies the end of off-line authentication and requests on-line authentication at the same point, credit card transaction terminal 403 transmits authentication result to mobile phone 401 (1115) and further transmits request for approval of electronic credit card transaction to acquirer 404 based on acquirer information (1117), acquirer 404 transmits a request for approval of electronic credit card transaction to center 402 (1118), center 402 executes approval process (1119) and transmits response of request for approval (1120), acquirer 404 transmits response of request for approval (1121), so that processes of electronic credit card transaction is terminated. However, mobile phone 401, which received result of authentication, displays completion message (1116) and terminates electronic credit card transaction process.

Moreover, in step (1114) of FIG. 11, in cases where it is determined that on-line authentication is not necessary:

security card 501 notifies the end of off-line authentication to credit card transaction terminal 403, credit card transaction terminal 403 transmits result of authentication to mobile phone 401 (1115) and terminates the electronic credit card transaction process, mobile phone 401, which received the result of authentication, displays the completion message (1116) and terminates the electronic credit card transaction process.

Moreover, after completion of the electronic credit card transaction process, credit card transaction terminal 403 communicates transaction history to transaction history information 602 of security card 501, and displays that the electronic credit card transaction process has been terminated based on information registered in electronic credit information list 601 and receives service terminal control information. For example, in cases where the sound information is registered in electronic credit information list 601, credit card transaction terminal 403 outputs the sound information as sound effects. In cases where the output of sound is controlled by the service terminal control information, credit card transaction terminal 403 does not output sound effect.

Moreover, mobile phone 401 indicates completion of credit card transaction process based on property of the credit and received user terminal control information. For example, in cases where sound information which is output at the point of completion of electronic credit card transaction process is set, in user terminal control information, usage of sound effect which is set in the property is permitted, and its volume is specified, mobile phone 401 outputs the sound information as a sound effect at the specified volume. In cases where, in user terminal control information, usage of the sound effect set in the property is not permitted, mobile phone 401 does not output the sound effect. In further cases where an error message is transmitted from credit card transaction terminal 403 and electronic credit card transaction process is terminated, mobile phone 401 indicates failure of electronic credit card transaction process based on property of the credit and receives user terminal control information.

Moreover, when the user selects electronic credit wherein the value password is unspecified in electronic credit card transaction operation (1104), mobile phone 401 skips steps (1105), (1106) and (1107) of FIG. 11, and proceeds to step (1108), and calculates value authentication information F(VPW')=Hash(UID) by executing hash calculation on user identification information (UID).

Moreover, in cases where signature information 804 of received electronic credit (ev) is not a digital signature based on the public key encryption system but electronic credit (ev) wherein electronic credit public information 801, electronic credit secret information 802 which is decrypted, and value authentication information 803 which is decrypted are concatenated and calculated by the hash function, in step (1113), electronic credit public information 801 of received electronic credit (ev), electronic credit secret information 802 which is decrypted, and value authentication information 803 which is decrypted are concatenated, calculated by the hash function, and collated with signature information 804. Thereby it is verified that the electronic credit (ev) has not been tampered with or falsified.

Additionally, in this case of electronic credit card transactions, when the user terminates the wallet application, the value password and the value authentication information which the user inputs are deleted from memory. Since all of the data for the authentication process that are exchanged between mobile phone 401 and credit card transaction terminal 403 are executed by the hash calculation or encryption, even if they are intercepted by someone, it would be impossible to pose as the rightful owner by using the data which has been intercepted.

In a still further aspect of the present embodiment, it is possible to use the authentication system thereof for the authentication process of other electronic values such as an electronic debit card transaction system, member's card, and ID card etc. by changing the content of electronic credit public information 801 and electronic credit secret information 802. For example, in the case of electronic debit card transaction system, the only action required is to input information such as bank account number, user's name and issuer's name etc. to electronic credit public information 801.

As the seventh embodiment of the present invention, electronic ticket system will be described. In the seventh embodiment, multiple types of electronic tickets, which are translated into digitalized information (ev: one type of electronic value), are managed by a mobile phone and examined by ticket reader with the use of an electronic ticket (ev) selected by user.

FIG. 12 is a block diagram of an electronic ticket system. Electronic ticket system is comprised of mobile phone 1201, center 1202 of ticket service company, ticket reader 1203 placed in the station and entrance of event floor etc, and the network 1204 between mobile phone 1201 and center 1202, and ticket reader 1203 and center 1202.

The network 1204 is comprised of a wireless communication network of a mobile phone and the internet, and enables communication between mobile phone 1201 and center 1202 through wireless communication and communication ticket reader 1203 and center 1202 through the internet. In the communications between mobile phone 1201 and center 1202, and between ticket reader 1203 and center 1202, secure sessions such as SSL (Secure Socket Layer) and TLS (Transport Layer Security) etc. are always established, so that encrypted communication data are transmitted. Mobile phone 1201 and ticket reader 1203 connect and communicate with each other by use of a local wireless communication function (infrared data communication, Bluetooth, wireless LAN, wireless communication using a non-contact IC card etc.).

The wallet application managing electronic ticket (ev) is downloaded to mobile phone 1201 in advance. Besides, in ticket reader 1203, ticket information is stored with respect to each ticket type in order to correspond to readings of multiple types of tickets. Master key (Km) for generating decrypting key for decrypting part of electronic ticket (ev) is managed in center 1202 and ticket reader 1203.

Figure 13:
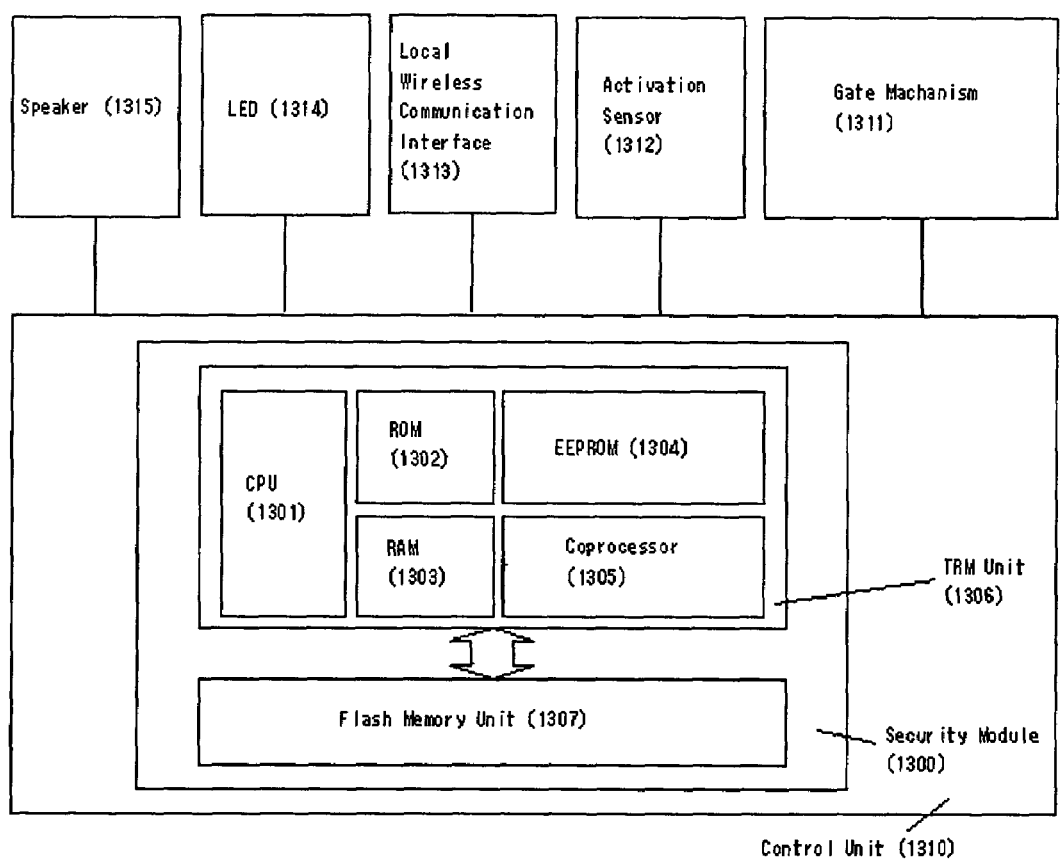
FIG. 13 is a block diagram of the ticket reader in the seventh embodiment of the present invention.

FIG. 13 is a block diagram illustrating the configuration of ticket reader 1203. Ticket reader 1203 is comprised of gate mechanism 1311 opening and shutting gate, activation sensor 1312 detecting when a user approaches the gate and activating ticket reader 1203, local wireless communication interface 1313, LED 1314, speaker 1315, and control unit 1310 directly controlling other units and comprising security module 1300.

Local wireless communication interface 1313 is a communication interface such as infrared data communication, Bluetooth, wireless LAN, and wireless communication using a non-contact IC card for communicating with mobile phone.

Security module 1300 is a device for safety management of master key (Km) and an authentication process of electronic ticket, and comprises TRM (Tamper Resistant Module) unit 1306 and flash memory unit 1307. TRM unit 1306 comprises CPU 1301, ROM 1302, RAM 1303, EEPROM 1304, and coprocessor 1305, and having tamper-resistant function for preventing external unauthorized access.

Figure 14:
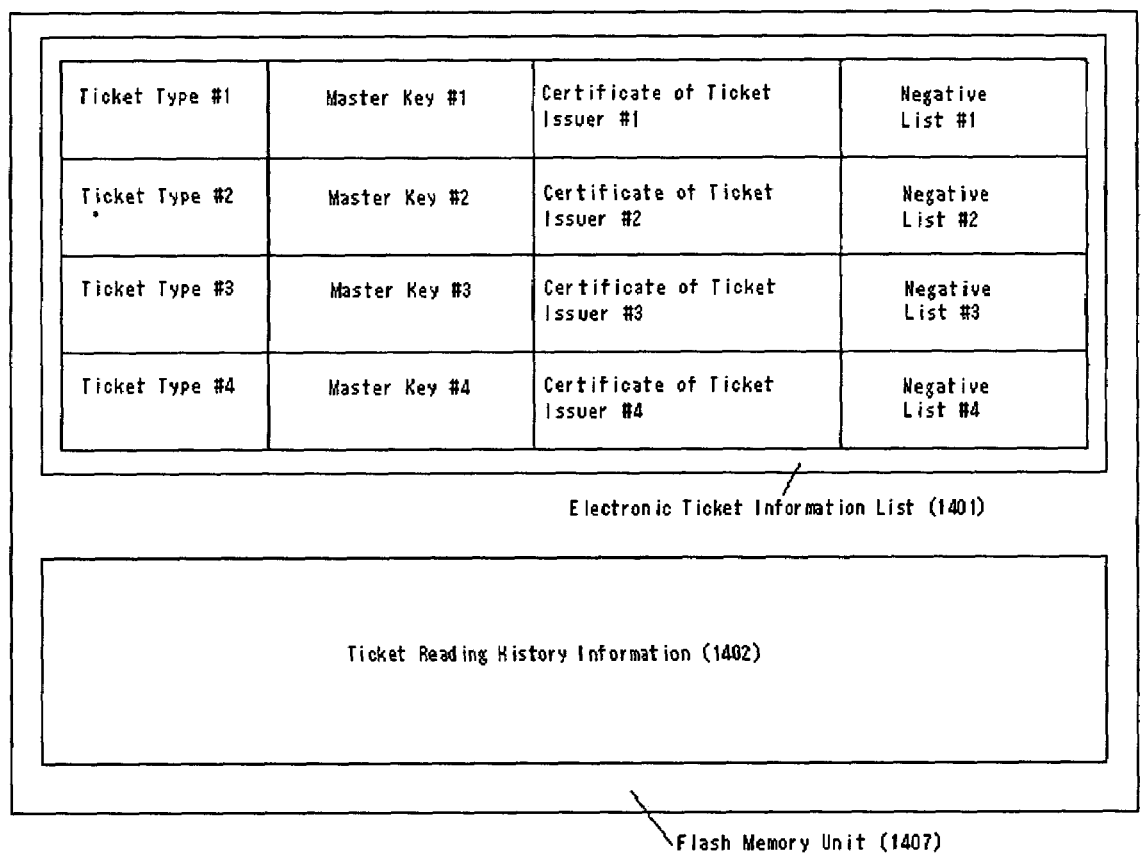
FIG. 14 is a diagram of information stored in a flash memory unit of the security module in the seventh embodiment of the present invention.
Figure 1:
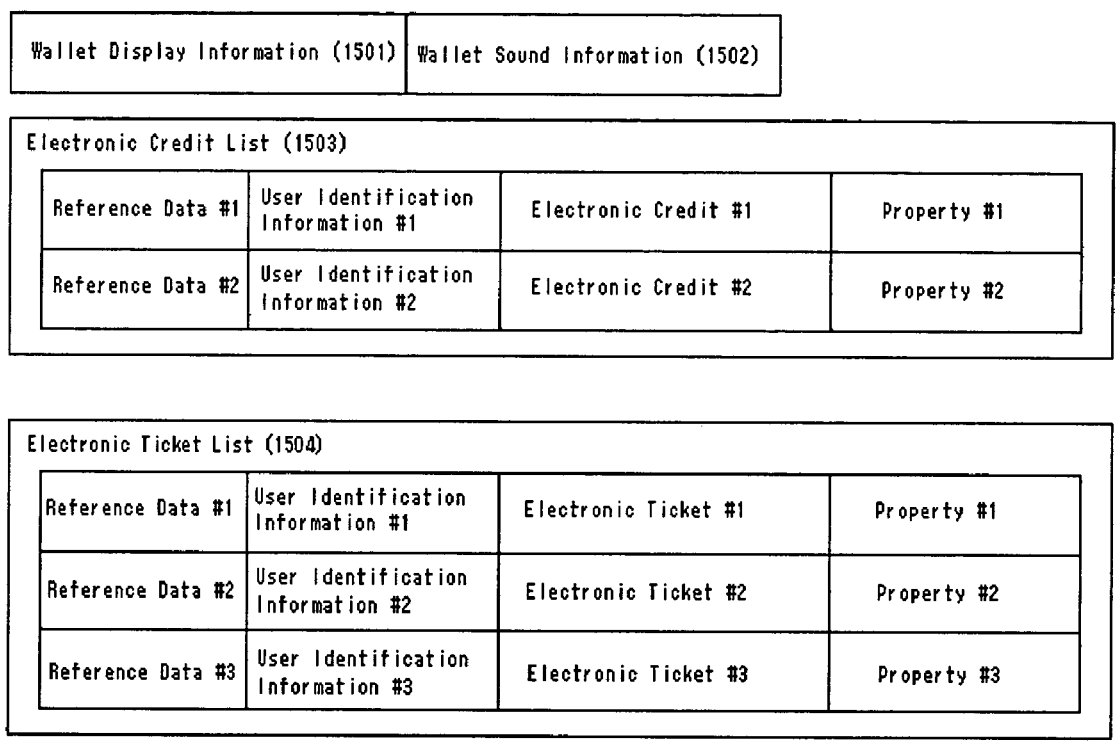

Flash memory unit 1307 stores electronic ticket information list 1401 and ticket reader history information 1402, that has been encrypted respectively, as shown in FIG. 14. Electronic ticket information list 1401 is a list wherein information related to the electronic ticket type, to which ticket reader corresponds, is registered. Ticket reader history information 1402 is historical information of ticket reader of the electronic ticket processed by the ticket reader. Electronic ticket information list 1401 and ticket reader history information 1402 are encrypted and decrypted by CPU 1301 with controlling coprocessor 1305. FIG. 14 shows the case where information regarding 4 types of electronic tickets (ev) is registered in electronic ticket information list 1401. In electronic ticket information list 1401, the card type, the master key (Km), the certificate of ticket service company, and the negative list are registered respectively to one type of electronic ticket.

Ticket type is identification information indicating the type of electronic ticket (ev). Master key (Km) is a master key for generating the decryption key for decrypting part of this type of electronic ticket (ev). Certificate of ticket service company is a certificate of ticket service company that issues this type of electronic ticket (ev). Negative list is a list of ticket numbers of invalid electronic tickets (ev) of this type.

Moreover, sound information such as sound effect etc. and multimedia information such as image information etc. which are used at the point of electronic ticket reader process may be registered in electronic ticket information list 1401 with respect to each type of electronic ticket (ev). For example, sound information and image information, which are specific to the type of electronic ticket (ev) or to the ticket service company, are registered. Furthermore, the sound effect is set to be output through speaker and image information is set to be displayed on LCD at the point of completion of the ticket reading process, so that it becomes possible to show usage of the type or the ticket service company of electronic ticket (ev).

Moreover, sound information such as sound effects of electronic ticket reading of each type of electronic ticket (ev) may be listed in electronic ticket information list 1401. For example, sound information which is specific to type of the electronic ticket (ev) or to the ticket service company sound effect is listed and set to be used at the point of completion of the reading process, so that it becomes possible to show the type or the ticket service company of electronic ticket (ev) which is used.

Since access to information stored in flash memory unit 1307 is controlled by CPU 1301 of security module 1300, although ticket reader 1203 can both read and write to ticket reading history information 1402 through TRM unit 1306 of security module 1300, can only read electronic ticket information list 1401. Master key (Km) in electronic ticket information list 1401 is controlled, so as not to be read or written from ticket reader 1203.

Electronic ticket information list 1401 is updated by security module 1300 and center establishing encrypted communication section through ticket reader 1203 and the network 1204 according to necessity. For example, addition and deletion of electronic ticket information based on the contract between the company that manages ticket reader 1203 and ticket service company are executed, and master key (Km) and negative list are updated to increase security.

Mobile phone 1201 comprises local wireless communication interface. The wallet application of mobile phone 401 arbitrarily connects to ticket reader 1203 through local wireless communication interface and reads the electronic ticket with the use of electronic ticket (ev) managed by wallet application. Moreover, wallet application of the present embodiment has functions of management and transaction of electronic credit which are described in the sixth embodiment.

Non-volatile memory of mobile phone 1201, as shown FIG. 15, stores wallet display information 1501, wallet sound information 1502, electronic credit list 1503, and electronic ticket list 1504 as information managed by the wallet application. Wallet display information 1501 is display information such as pictures and images displayed by wallet application on the screen of mobile phone. Wallet sound information 1502 is sound information such as sound effects and melody information used by wallet application. Electronic ticket list 1504 is a list of electronic ticket (ev) managed by wallet application. Electronic credit list 1503 is the same as electronic credit list 703 described in the second embodiment.

FIG. 15 shows the case where three type of electronic tickets (ev) are listed in electronic ticket list 1504. In electronic ticket list 1504, reference data, user authentication information (UID), electronic ticket (ev), and property are listed respectively to one electronic ticket (ev). Reference data and user identification information (UID) will be described in detail afterwards.

Property is attribute information which is set on the electronic ticket (ev). Examples of property include: an order wherein wallet application displays the list of electronic tickets, sound effects used at the point of electronic ticket reading, and operations of LED and vibration device etc. Thereby user becomes able to set an order of displaying electronic ticket according to usage frequency, to select sound effect which is output at the point of completion of electronic ticket reading or at the point of failure of ticket reading from wallet sound information 1502 and set them, to set LED to blink at the point of completion of electronic ticket reading, and to set vibration device to operate at the point of failure of ticket reading.

Figure 16:
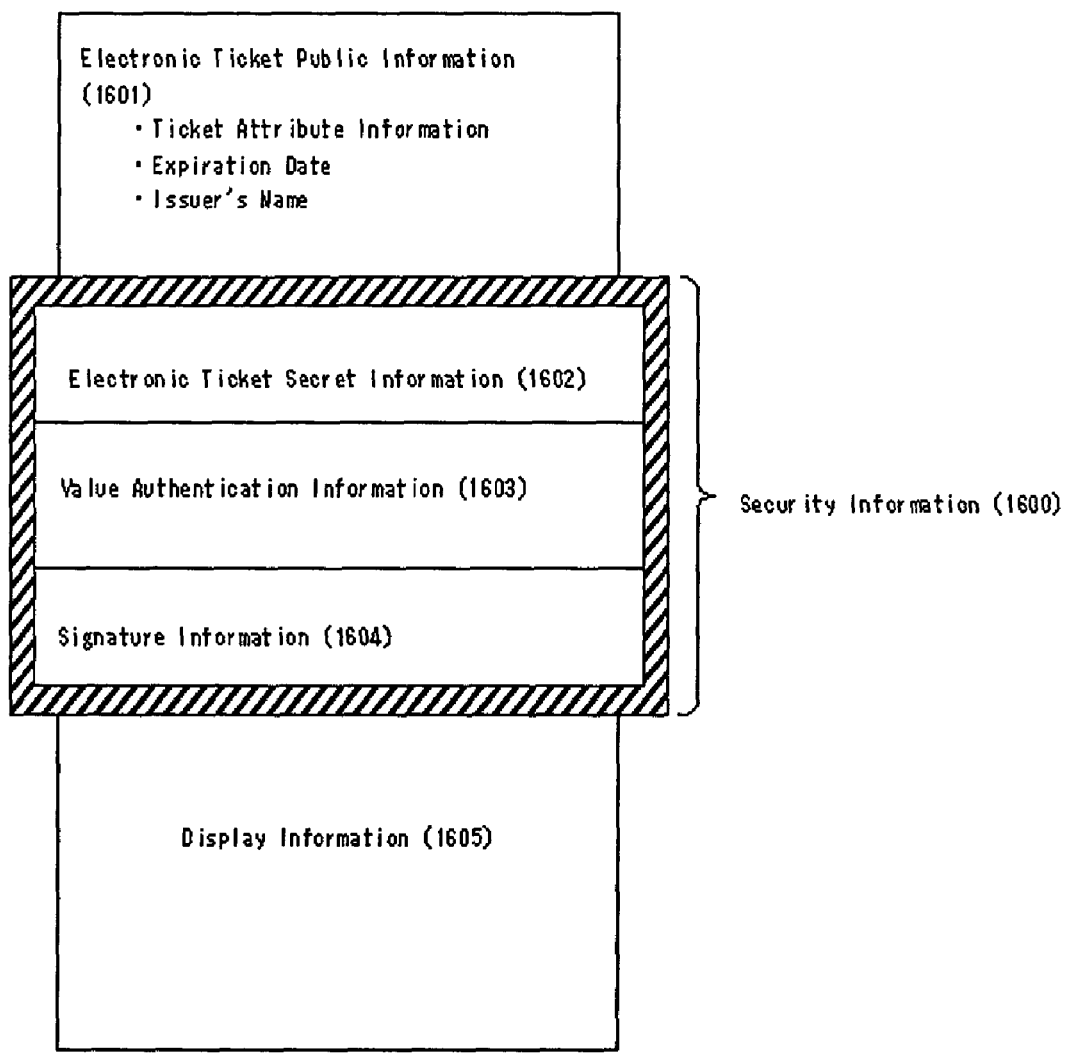
FIG. 16 is a diagram of the data structure of an electronic ticket in the seventh embodiment of the present invention.

FIG. 16 shows the data configuration of electronic ticket (ev). Electronic ticket (ev) is comprised of electronic ticket public information 1601, security information 1600, and display information 1605. Security information 1600 is information used for the authentication process of electronic ticket, and is encrypted by encryption key generated from master key (Km). Display information 1605 is display information such as picture and layout information etc. used by the wallet application at the point of display of electronic ticket and is an optional setting. Therefore, some have display information 1605 and the others do not have it according to electronic ticket (ev).

Electronic ticket public information 1601 comprises information to be disclosed to user such as ticket attribute information, expiration date, ticket issuer's name etc. The wallet application uses this electronic ticket public information 1601 when the electronic ticket is displayed on screen. Ticket attribute information comprises ticket type indicating type of ticket, ticket number indicating identification information of each electronic ticket, read flag indicating whether electronic ticket has been read, usable number of times indicating usable number of times of electronic ticket. Moreover, examples of in event ticket include, name of the event, date, seat number, and floor information etc.

Security information 1600 is comprised of electronic ticket secret information 1602, value authentication information 1603, and signature information 1604. Value authentication information 1603 will be described hereinafter.

Electronic ticket secret information 1602 stores information regarding electronic ticket such as customer management information of ticket issuer which is not necessary to be disclosed to the user. At the point of electronic ticket reading, electronic ticket secret information 1602 is decrypted in ticket reader 1203, and used for by the company that manages ticket reader 1203 and ticket service company, as required.

Signature information 1604 is the digital signature of ticket issuer for data wherein electronic ticket public information 1601, electronic ticket secret information 1602 which is the electronic ticket secret information before being encrypted, and value authentication information 1603 which is the value authentication information before being encrypted are concatenated. At the point of electronic ticket reading, signature information 1604 is decrypted in ticket reader 1203, and used for validation of electronic ticket (ev).

Signature information 1604 is preferably a digital signature generated with the use of a key that has enough key length for security based on public key encryption system. However, it may be data acquired by the hash calculation wherein electronic ticket public information 1601, electronic ticket secret information 1602 which is the electronic ticket secret information before being encrypted, and value authentication information 1603 which is the value authentication information before being encrypted are concatenated.

Figure 17:
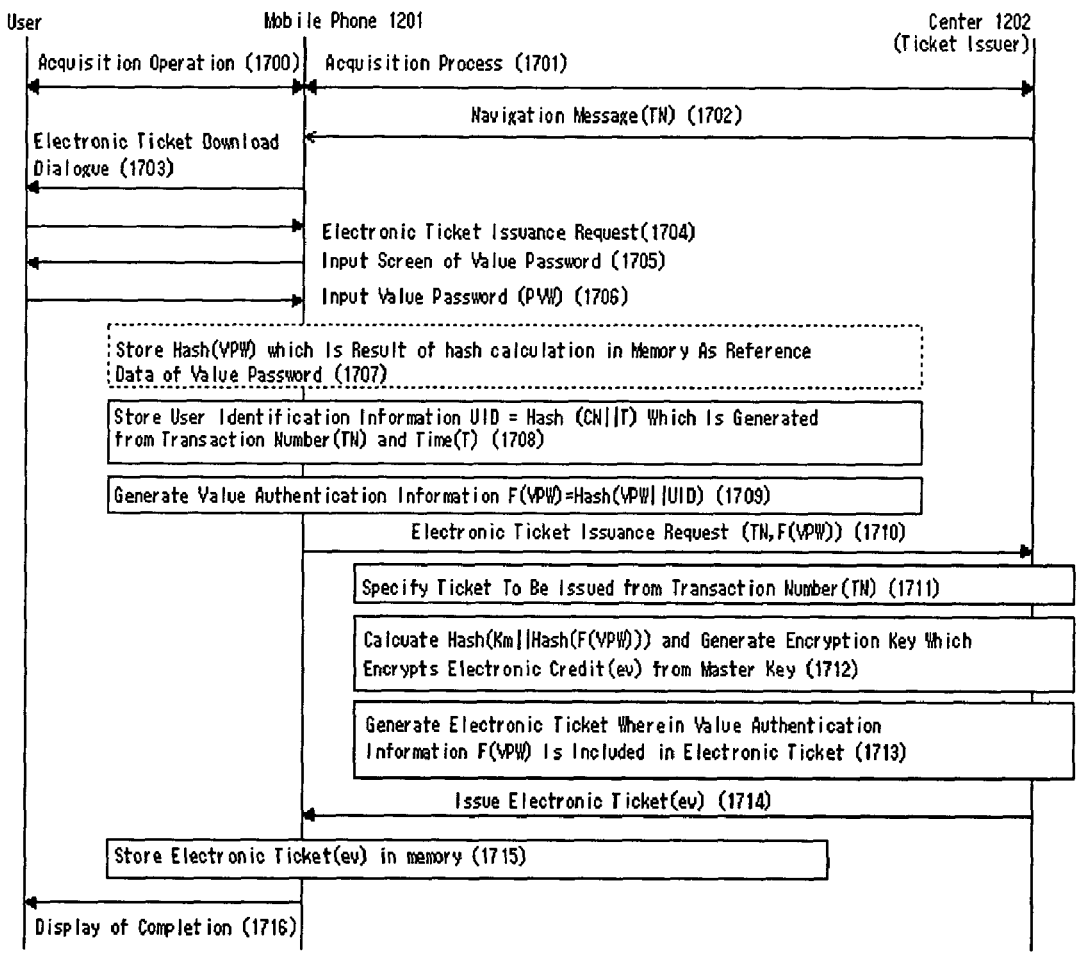
FIG. 17 is a flow chart of the download process of an electronic ticket in the seventh embodiment of the present invention.

Next, the process wherein user downloads electronic ticket (ev) from center 1202 to mobile phone 1201, will be described. FIG. 17 shows the process for downloading electronic ticket (ev) wherein:

- user accesses center 1202 by using the internet access function of mobile phone 1201, selects the electronic ticket which he desires, and executes operation for acquiring ticket such as payment process of the electronic ticket as required (1700),
- acquisition process is executed between mobile phone 1201 and center 1202 (1701),
- navigation message is transmitted from center 1202 to mobile phone 1201 (1702). Navigation message is a message which makes mobile phone 1201 download electronic ticket and includes transaction number (TN) for identifying the electronic ticket to be downloaded.

When mobile phone 1201 receives navigation message (1702), the wallet application is activated and dialogue for inquiring regarding the download of electronic ticket is displayed (1703). When user executes electronic ticket issuance request operation (1704), panel for inputting value password set by user (VPW:<U>v</U>alue<U> p</U>ass<U>w</U>ord) is displayed according to electronic ticket (ev) to be downloaded. (1705).

When user inputs value password (1706), mobile phone 1201 stores the result of the hash calculation of the value password Hash(VPW) as reference data of value password (VPW) (1707). Moreover, mobile phone 1201 generates user identification information UID=Hash(TN||T) from transaction number (TN) and time (T) and stores it in memory (1708). Then, mobile phone 1201 generates value authentication information F(VPW)=Hash(VPW||UID) from value password (VPW) and user identification information (UID) (1709), and transmits electronic ticket issuance request including transaction number (TN) and value authentication information F(VPW) to center 1202 (1710). At this point, reference data Hash(VPW) and user identification information UID=Hash(TN||T) are stored in each field of electronic ticket list 1504 in the memory of mobile phone 1201 as data regarding the electronic ticket to be downloaded.

Center 1202 receiving electronic ticket issuance request specifies electronic ticket to be issued (1711). Then, value authentication information F(VPW) is executed by the hash calculation, concatenated with master key (Km) and further executed by the hash calculation, so that encryption key Kt=Hash(Km||Hash(F(VPW))) of common key encryption system for encrypting electronic ticket (ev) is generated (1712). Moreover, center 1202 generates electronic ticket public information and electronic ticket secret information of electronic ticket (ev), and further generates electronic ticket (ev) having the data structure illustrated in FIG. 16 by using received value authentication information F(VPW) and encryption key (Kt) (1713).

Generated electronic ticket (ev) is transmitted to mobile phone 1201 (1714) and stored in the memory of mobile phone (1715). Mobile phone 1201 displays completion of download (1716), so that the download process of the electronic ticket is completed. At this point, electronic ticket (ev) is stored in electronic ticket list 1504 on the memory of mobile phone 1201 as a new electronic ticket. Moreover, property is set to default. In default setting, sound which is used at the point of electronic ticket reading process is not set.

Moreover, in step S1706 of FIG. 17, when user determines not to set the value password because of convenience, in step (1707), mobile phone 1201 does not execute the hash calculation of the value password (VPW), and NULL, indicating that value password (VPW) is not set, is set to the field of reference data of electronic ticket list 1504. In step (1709), value authentication information F(VPW)=Hash (UID) is generated by executing hash calculation on user identification information (UID).

Moreover, when the wallet application is terminated, the value password (VPW) and the value authentication information F(VPW) which are input by user are deleted from memory of the mobile phone 1201. Since reference data stored in the memory of the mobile phone is data wherein the value password is executed by the hash calculation, it is impossible to steal the value password even if mobile phone is stolen and the internal memory of the mobile phone is analyzed.

Figure 18:
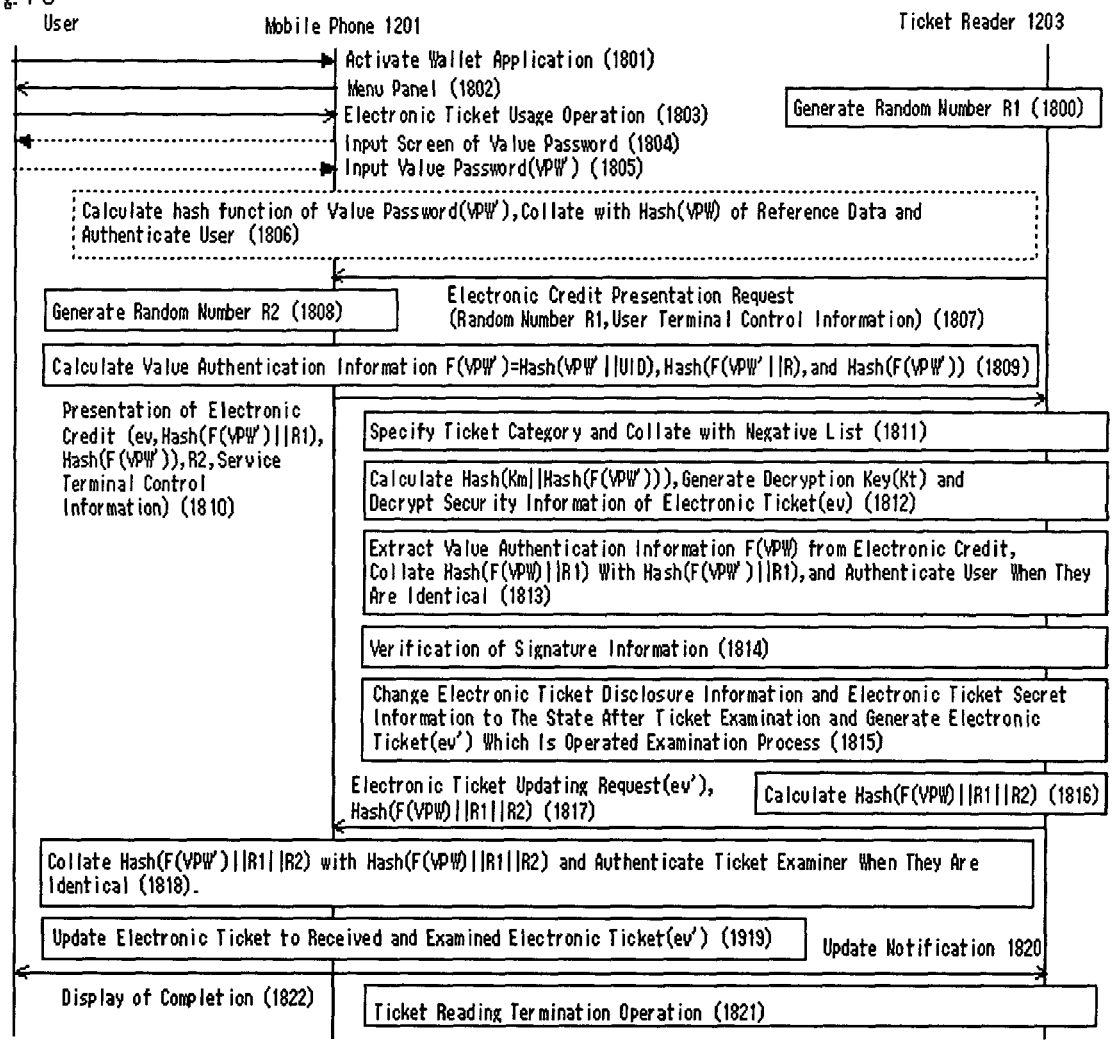
FIG. 18 is a flow chart of the ticket reading process in the seventh embodiment of the present invention.

Next, electronic ticket reading process by using downloaded electronic ticket (ev) will be described. FIG. 18 shows the ticket reading process of electronic ticket with the use of electronic ticket (ev).

When user approaches gate of ticket reader 1203 while having mobile phone 1201, activation sensor 1312 detects it and activates ticket reader 1203, ticket reader 1203 generates random number R1 as challenge information (1802). This random number R1 is acquired from security module 1300, and practically generated by CPU 1301 of security module 1300. When user activates wallet application (1801), menu panel is displayed (1802). When user selects electronic ticket from menu and executes electronic ticket usage operation (1803), menu panel for inputting value password corresponding to the electronic ticket is displayed (1804).

When user inputs value password (VPW') (1805), mobile phone 1201 calculates hash function Hash(VPW') of value password (VPW'), and verifies it with hash function Hash (VPW) of reference data of electronic ticket on electronic ticket list 1504 corresponding to electronic ticket thereof (1806). When they are not identical, an error message is displayed. When they are identical, electronic ticket presentation request is received from ticket reader 1203 (1807). Electronic ticket presentation request includes random number R1 and user terminal control information. User terminal control information is information for controlling the operation of mobile phone 1201 at the point of ticket reading, and includes setting by ticket service company and by management company ticket reader according to the situation of electronic ticket reading. In detail, user terminal control information is information to control usage of sound effect which user sets as property of electronic ticket and its volume, moreover, operations of LED and vibration device. According to user terminal control information, for example, in the case of an environment such as classical concert etc. where loud sound is not allowed, the volume level is set to a low level that is recognizable only to user, or sound effect is muted. Moreover, LED and vibration device are controlled, so that it becomes possible to notify the user whether authentication process has succeeded explicitly. Furthermore, in the case of a noisy environment such as a busy street, volume level is set to a high level, so that it becomes possible to notify user whether authentication process has succeeded explicitly.

Mobile phone 1201 generates random number R2 (1808), calculates value authentication information F(VPW')=Hash (VPW'||UID), Hash function Hash(F(VPW')||R1) wherein value authentication information F(VPW') and random number R are concatenated, and hash function Hash(F(VPW'))

of value authentication information (1809). Mobile phone 401 transmits, as a message of presenting electronic ticket, electronic ticket (ev), Hash function Hash(F(VPW')∥R1), hash function Hash(F(VPW')), and service terminal control information to ticket reader 1203 (1810). At this point, display information 1605 of electronic ticket (ev) is not transmitted. Service terminal control information is information for controlling operation of ticket reader 1203 at the point of electronic ticket reading and includes setting information based on property of electronic ticket which user sets. In detail, in cases where sound effect which user set is available in user terminal control information and sound effect, which is output at the point of completion of electronic ticket reading process, is already set, service terminal control information is information to control output of sound effect of ticket reader 1203 at the point of completion of electronic ticket reading.

Ticket reader 1203, after validating electronic ticket public information 1601 of received electronic ticket (ev), transmits electronic ticket (ev), Hash function Hash(F(VPW')∥R1), hash function Hash(F(VPW')) to security module 1300, and makes security module 1300 execute an off-line authentication of electronic ticket (ev) and user. When validation of electronic ticket public information 1601 indicates an error, the error message is transmitted from ticket reader 1203 to mobile phone 1201, so that the electronic ticket reading process is terminated.

Security module 1300 collates card type in electronic ticket public information 1601 with card type of electronic ticket information list 1401, specifies which information regarding type of electronic ticket in electronic ticket information list 1401 such as master key (Km), certificate of ticket service company is used in processes afterwards, further verifies ticket number of electronic ticket (ev) with a negative list, and determines that electronic ticket (ev) is not listed in negative list (1811).

In cases where electronic ticket indicated by information regarding ticket type of received electronic ticket (ev) is not listed in electronic ticket information list 1401 or in cases where received electronic ticket (ev) is listed in negative list, security module 1301 transmits error message to ticket reader 1203. Then, the error message is transmitted from ticket reader 1203 to mobile phone 1201, so that the process of electronic ticket reading is terminated.

Moreover, security module 1300 calculates the hash function wherein hash function Hash(F(VPW')) of received value authentication information and master key (Km) are concatenated, generates decryption key Kt'=(Km∥Hash(F(VPW'))) of common key encryption system to decrypt security information 1600 of electronic ticket, and decrypts security information 1600 of the electronic ticket by using coprocessor 1305 (1812).

Moreover, security module 1300 extracts value authentication information 1603 F(VPW) from decrypted security information 1600, and calculates hash function Hash(F(VPW)∥R1) wherein value authentication information 1603 F(VPW) and random number R1 are concatenated. Then, security module 1300 collates hash function Hash(F(VPW)∥R1) with hash function Hash(F(VPW')∥R1) which is received from mobile phone 1201. When they are identical, user is authenticated to be the rightful owner of the electronic ticket (ev) (1813).

Moreover, security module 1300 verifies digital signature indicated by signature information 1604 of security information 1600 decrypted by using coprocessor 1305 with the use of public key in the certificate of ticket service company, and further verifies that electronic ticket (ev) has not been tampered with or falsified (1814). In cases where Hash(F(VPW)∥R1) and Hash(F(VPW')∥R1) are not identical, or in cases where error is detected in verification of signature information (1814), security module 1300 responds with an error message to ticket reader 1203. Then, the error message is transmitted from ticket reader 1203 to mobile phone 1201, so that the process of electronic ticket reading is terminated.

In cases where an error is not detected in verification of signature information (1814), therefore, in cases where validity of electronic ticket (ev) is verified, security module 1300 changes the contents of electronic ticket public information 1601 and electronic ticket secret information 1602 to state of after ticket reading and generates electronic ticket (ev') which is executed ticket reader (1815). For example, at this point, flag indicating examined is on, so that usable number of times is subtracted. Signature information 1604 of this electronic ticket which is executed by the hash calculation comprises electronic ticket public information 1601 and data wherein electronic ticket secret information 1602 which is electronic ticket secret information before being encrypted, and value authentication information 1603 are concatenated and acquired by the hash calculation.

Security module 1300 calculates hash function Hash(F(VPW)∥R1∥R2) wherein value authentication information 1603 F(VPW), random number R1, and random number R2 are concatenated and acquired by the hash calculation (1816) and displays completion of off-line authentication of the electronic ticket. Then ticket reader 1203 transmits electronic ticket (ev') and hash function Hash(F(VPW)∥R1∥R2) to mobile phone 1201 as message requesting update of electronic ticket. Hash function Hash(F(VPW)∥R1∥R2) is information which is impossible to be generated without registration of electronic ticket information of electronic ticket (ev) and master key (Km), so that it becomes information to authenticate ticket reader 1203 by mobile phone 1201.

Mobile phone 1201 calculates hash function Hash(F(VPW)∥R1∥R2) wherein value authentication information 1603 F(VPW), random number R1, and random number R2 are concatenated and acquired by the hash calculation, collates it with received hash function Hash(F(VPW')∥R1∥R2). When they are identical, mobile phone 1201 authenticates ticket reader 1203 to be ticket reader wherein electronic ticket information of electronic ticket (ev) is listed in security module 1300 (1818). Then mobile phone 1201 updates electronic ticket (ev) in electronic ticket list 1504 to received electronic ticket (ev') which is processed ticket reading (1819), transmits update notification indicating that electronic ticket is updated to ticket reader 1203, and displays completion of electronic ticket reading process, so that it terminates the electronic ticket reading process. However, in ticket reader 1203 which receives update notification, control unit 1306 controls gate mechanism 1307 to open the gate and admits the user, so that it terminates the electronic ticket reading process (1821).

Moreover, after completion and termination of the electronic ticket reading process, ticket reader 1203 registers electronic ticket reader history to electronic ticket reader history information 1402 of security module 1300, and displays that electronic ticket reading process is terminated based on information listed in electronic ticket information list 1401 and received service terminal control information. For example, in cases where sound information is listed in electronic ticket information list 1401, ticket reader 1203 outputs the sound information as a sound effect. In cases where output of sound is controlled in service terminal control information, ticket reader 1203 does not output sound effect.

Moreover, mobile phone 1201 indicates completion of the electronic ticket reading process based on property of the used electronic ticket and received user terminal control information. For example, in cases where sound information which is output at the point of completion of electronic ticket reading process is set, in user terminal control information, use of a sound effect which is set in the property is permitted, and its volume is specified, mobile phone 1201 outputs the sound information as a sound effect at a specified volume. In cases where, in user terminal control information, use of a sound effect set in the property is not permitted, mobile phone 1201 does not output a sound effect. In further cases where an error message is transmitted from ticket reader 1203 and electronic ticket reading process is terminated, mobile phone 1201 expresses failure of electronic ticket reading process based on property of the used ticket and received user terminal control information as described above.

Moreover, when the user selects electronic ticket wherein the value password is unspecified in electronic ticket usage operation (1803), mobile phone 1201 skips steps (1804), (1805) and (1806) of FIG. 18, and receives electronic ticket presentation request from ticket reader (1807), and calculates the hash function of value authentication information F(VPW')=Hash(UID) from user identification information (UID) (1809).

Moreover, in cases where the signature information 1604 of received electronic ticket (ev) is not a digital signature based on the public key encryption system but the electronic ticket (ev) wherein electronic ticket public information 1601, electronic ticket secret information 1602 which is decrypted, and value authentication information 1603 which is decrypted are concatenated and calculated by the hash function, in step (1814), electronic ticket public information 1601 of received electronic ticket (ev), electronic ticket secret information 1602 which is decrypted, and value authentication information 1603 which is decrypted are concatenated, calculated by the hash function, and collated with signature information 1604. Thereby it is verified that electronic ticket (ev) has not been tampered with or falsified.

Also in this case of the electronic ticket reading process, when the user terminates the wallet application, the value password and the value authentication information which user inputs are deleted from memory. Since all of the data for the authentication process that are exchanged between mobile phone 1201 and ticket reader 1203 are encoded by a hash calculation or encryption, even if they are intercepted, it would be impossible to pose as the rightful owner by using the data which has been intercepted.

Another process of electronic ticket reading process by using downloaded electronic ticket (ev) will be described.

Figure 19:
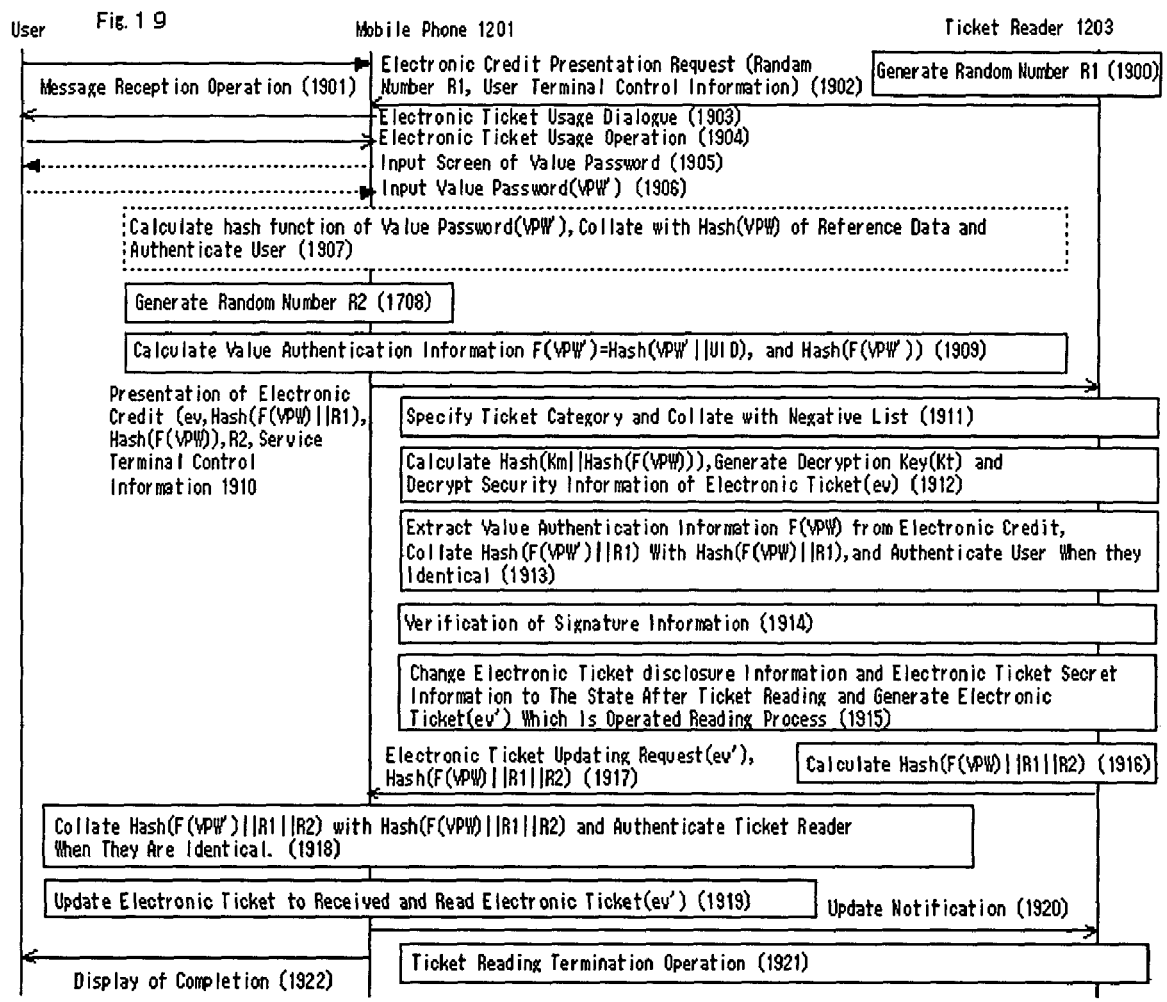
FIG. 19 is a flow chart of the ticket reading process in the seventh embodiment of the present invention.

FIG. 19 shows another process of electronic ticket reading process by using downloaded electronic ticket (ev). Although, in processes of FIG. 18, user initially activates the wallet application by himself, in processes of FIG. 19, wallet application is activated based on a message received from ticket reader 1203.

When the user approaches the gate of ticket reader 1203 while having a mobile phone 1201, activation sensor 1312 detects it and activates ticket reader 1203, ticket reader 1203 generates random number R1 as challenge information (1900). This random number R1 is acquired from security module 1300, and practically generated by CPU 1301 of security module 1300. When the user executes operations enabling the reception of a message from ticket reader 1203 (1901), mobile phone 1201 receives electronic ticket presentation request (1902). Electronic ticket presentation request includes information regarding ticket type, random number R1 and user terminal control information. Ticket type is information regarding ticket type listed in electronic ticket information list 1401 and information indicating type of electronic ticket which ticket reader 1203 can execute the electronic ticket reading process.

In mobile phone 1201 which received electronic ticket presentation request, the wallet application is activated and dialogue inquiring whether an electronic ticket is used is displayed (1903). At this point, mobile phone 1201 collates the received ticket type information with electronic ticket list 1504 and presents an electronic ticket to be executed electronic ticket reading process by ticket reader 1203 to user. In cases where multiple electronic tickets corresponding to electronic ticket list 1504 exist, they are displayed. In cases where multiple electronic tickets corresponding in electronic ticket list 1504 do not exist, it is displayed for user that no electronic ticket corresponds.

When user selects electronic ticket from menu and executes electronic ticket usage operation (1904), the panel for inputting the value password corresponding to electronic ticket is displayed (1905).

When user inputs value password (VPW') (1906), mobile phone 1201 calculates hash function Hash(VPW') of value password (VPW'), and collates it with hash function Hash (VPW) of the reference data of the electronic ticket on electronic ticket list 1504 corresponding to the electronic ticket thereof (1907). When they are not identical, an error message is displayed. When they are identical, mobile phone 1201 calculates value authentication information F(VPW')=Hash(VPW'||UID), Hash function Hash(F(VPW')|| R1) wherein value authentication information F(VPW') and random number R1 concatenated and encoded by a hash calculation, and hash function Hash(F(VPW')) of value authentication information (1909). Mobile phone 1201 transmits, as a message presenting the electronic ticket, electronic ticket (ev), hash function Hash(F(VPW')||R1), hash function Hash(F(VPW')), and service terminal control information to ticket reader 1203 (1910). At this point, display information 1605 of electronic ticket (ev) is not transmitted.

Ticket reader 1203, after validating electronic ticket public information 1601 of received electronic ticket (ev), transmits electronic ticket (ev), Hash function Hash(F (VPW')||R1), hash function Hash(F(VPW')) to security module 1300, and makes security module 1300 execute off-line authentication of electronic ticket (ev) and user. When the validation of electronic ticket public information 1601 indicates an error, an error message is transmitted from ticket reader 1203 to mobile phone 1201, so that the electronic ticket reading process is terminated.

Security module 1300 collates the card type in electronic ticket public information 1601 with the card type of electronic ticket information list 1401, specifies which information regarding type of electronic ticket in electronic ticket information list 1401 such as master key (Km), certificate of ticket service company is used in processes afterwards, further verifies ticket number of electronic ticket (ev) with the negative list, and examines that electronic ticket (ev) is not listed in the negative list (1911).

In cases where the electronic ticket indicated by information regarding ticket type of received electronic ticket (ev) is not listed in electronic ticket information list 1401 or in cases where received electronic ticket (ev) is listed in the negative list, security module 1301 transmits an error message to ticket reader 1203. Then, the error message is transmitted from ticket reader 1203 to mobile phone 1201, so that the process of electronic ticket reading is terminated.

Moreover, security module 1300 calculates the hash function wherein hash function Hash(F(VPW')) of received value authentication information and master key (Km) are concatenated, generates decryption key Kt'=(Km∥Hash(F(VPW'))) of common key encryption system to decrypt security information 1600 of electronic ticket, and decrypts security information 1600 of electronic ticket by using coprocessor 1305 (1912).

Moreover, security module 1300 extracts value authentication information 1603 F(VPW) from decrypted security information 1600, and calculates hash function Hash(F(VPW)∥R1) wherein value authentication information 1603 F(VPW) and random number R1 are concatenated. Then, security module 1300 collates hash function Hash(F(VPW)∥R1) with hash function Hash(F(VPW')∥R1) which is received from mobile phone 1201. When they are identical, user is authenticated to be the rightful owner of the electronic ticket (ev) (1913).

Moreover, security module 1300 verifies the digital signature indicated by signature information 1604 of security information 1600 decrypted by using coprocessor 1305 with the use of public key in the certificate of ticket service company, and further verifies that electronic ticket (ev) has not been tampered with or falsified (1914). In cases where Hash(F(VPW)∥R1) and Hash(F(VPW')∥R1) are not identical, or in cases where an error is detected in verification of signature information (1914), security module 1300 responds with an error message to ticket reader 1203. Then, the error message is transmitted from ticket reader 1203 to mobile phone 1201, so that the process of electronic ticket reading is terminated.

In cases where an error is not detected in the verification of signature information (1914), therefore, in cases where validity of electronic ticket (ev) is verified, security module 1300 changes the contents of electronic ticket public information 1601 and electronic ticket secret information 1602 to the state corresponding to after ticket reading and generates electronic ticket (ev') which is executed ticket reading (1915). For example, at this point, a flag, which indicates that the ticket reading process has been terminated, is on, so that a usable number of times is decremented. Signature information 1604 of this electronic ticket which is encoded by a hash calculation comprises electronic ticket public information 1601 and data wherein electronic ticket secret information 1602 which is an electronic ticket secret information before being encrypted and value authentication information 1603 are concatenated and encoded by the hash calculation is calculated.

Security module 1300 calculates hash function Hash(F(VPW)∥R1∥R2) wherein value authentication information 1603 F(VPW), random number R1, and random number R2 are concatenated and encoded by the hash calculation (1916) and displays completion of off-line authentication of the electronic ticket. Then ticket reader 1203 transmits electronic ticket (ev') and hash function Hash(F(VPW)∥R1∥R2) to mobile phone 1201 as message requesting update of the electronic ticket. Hash function Hash(F(VPW)∥R1∥R2) is information which is impossible to generate without the registration of the electronic ticket information of electronic ticket (ev) and master key (Km), so that it becomes information to authenticate ticket reader 1203 by mobile phone 1201.

Mobile phone 1201 calculates hash function Hash(F(VPW)∥R1∥R2) wherein value authentication information 1603 F(VPW), random number R1, and random number R2 are concatenated and encoded by the hash calculation is calculated, collates it with received hash function Hash(F(VPW')∥R1∥R2). When they are identical, mobile phone 1201 authenticates ticket reader 1203 to be ticket reader wherein electronic ticket information of electronic ticket (ev) is listed in security module 1300 (1918). Then mobile phone 1201 updates electronic ticket (ev) in electronic ticket list 1504 to received electronic ticket (ev') which is processed ticket reading (1919), transmits update notification indicating that the electronic ticket is updated to ticket reader 1203 (1920), and indicates completion of electronic ticket reading process, so that it terminates the electronic ticket reading process. However, in ticket reader 1203 which receives update notification, control unit 1306 controls gate mechanism 1307 to open the gate and admit the user, so that it terminates the electronic ticket reading process (1921).

Moreover, after termination of the electronic ticket reading process, ticket reader 1203 lists electronic ticket reading history to electronic ticket reading history information 1402 of security module 1300, and displays that electronic ticket reading process is terminated based on information listed in electronic ticket information list 1401 and received service terminal control information. For example, in cases where sound information is listed in electronic ticket information list 1401, ticket reader 1203 outputs the sound information as a sound effect. In cases where output of sound is controlled in service terminal control information, ticket reader 1203 does not output the sound effect.

Moreover, mobile phone 1201 indicates completion of the electronic ticket reading process based on property of the used electronic ticket and receives user terminal control information. For example, in cases where sound information which is output upon completion of electronic ticket reading process is set, in the user terminal control information, usage of sound effect which is set in the property is permitted, and its volume is specified, mobile phone 1201 outputs the sound information as sound effect at specified volume. In cases where, in user terminal control information, usage of sound effect set in the property is not permitted, mobile phone 1201 does not output the sound effect. In further cases where an error message is transmitted from ticket reader 1203 and the electronic ticket reading process is terminated, mobile phone 1201 indicates failure of electronic ticket reading process based on property of the used ticket and received user terminal control information as described above.

Moreover, when user selects the electronic ticket wherein value password is unspecified in electronic ticket usage operation (1903), mobile phone 1201 skips steps (1905), (1906) and (1807) of FIG. 18, and proceeds to step (1908). Moreover, mobile phone 1201 calculates value authentication information F(VPW')=Hash(UID) by executing hash calculation on user identification information (UID) (1909).

Moreover, in cases where signature information 1604 of received electronic ticket (ev) is not a digital signature based on the public key encryption system but based on an electronic ticket (ev) wherein electronic ticket public information 1601, electronic ticket secret information 1602 which is decrypted, and value authentication information 1603 is decrypted are concatenated and the hash function is calculated, in step (1914), electronic ticket public information 1601 of received electronic ticket (ev), electronic ticket secret information 1602 which is decrypted, and value authentication information 1603 which is decrypted are concatenated, encoded by a hash calculation, and collated with signature information 1604. Thereby it is verified that electronic ticket (ev) has not been tampered with or falsified.

Also in this case of the electronic ticket reading process, when the user terminates the wallet application, value password and value authentication information which user inputs are deleted from memory. Since all of the data for authentication process that are exchanged between mobile phone 1201 and ticket reader 1203 are encoded by a hash calculation or encryption, even if they are intercepted, it would be impossible to pose as the rightful owner by using the data which has been intercepted.

In a still further aspect of the present embodiment, the authentication system thereof becomes possible to be used for the authentication process of other electronic values such as an electronic coupon system, money system etc. by changing the content of electronic ticket public information 1601 and electronic ticket secret information 1602. For example, in the case of an electronic coupon system, all that needs to be executed is to input information regarding services such as discount rate etc. to electronic ticket public information 1601, and in the case of an electronic money system, all that needs to be executed is to input information indicating balance of electronic money instead of number of usage times to the electronic ticket public information 1601, so that ticket reader 1203 can subtract spent money at the point of ticket reading.

As the eighth embodiment of the present invention, an electronic key system for business use will be described. In the eighth embodiment of the present invention, multiple types of electronic keys which are translated into digitalized information (ev: a type of electronic key) are managed by a mobile phone, and the authentication process between the mobile phone and the lock apparatus is executed with the use of electronic key (ev) selected by the user.

Figure 20:
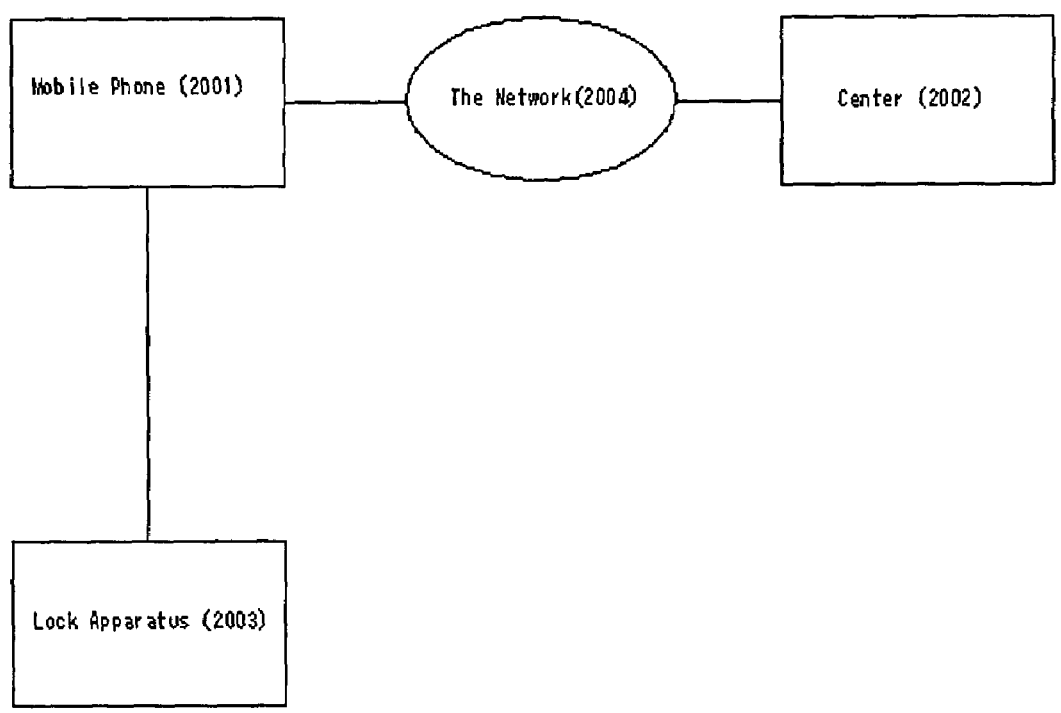
FIG. 20 is a block diagram of the electronic key system in the eighth and the ninth embodiments of the present invention.

FIG. 20 is a block diagram of the electronic key system. The electronic key system is comprised of mobile phone 2001 which the user owns, center 2002 of management company which manages facilities such as a conference hall or assembly hall and services such as rental car, lock apparatus 2003 which is attached to the door of conference room or car, and the network 2004 which connects mobile phone 2001 and center 2002. According to electronic key system of the present embodiment, the user is able to download electronic key (ev) from center 2002 to mobile phone 2001 and to lock or unlock lock apparatus 2003. Therefore, since actual delivery does not exist, it is not necessary for user to go to a place where the key is managed, and it is not necessary for a management company to place worker for actual delivery, thereby making business more efficient.

The network 2004 is comprised of a wireless communication network of mobile phone and the internet, and enables communication between mobile phone 2001 and center 2002 though the wireless communication. In the communications between mobile phone 2001 and center 2002, secure sessions such as SSL (Secure Socket Layer) and TLS (Transport Layer Security) etc. are always established, so that encrypted communication data are transmitted.

Mobile phone 2001 and lock apparatus 2003 arbitrarily connect and communicate with each other with the use of local wireless communication function (such as infrared data communication, Bluetooth, wireless LAN, wireless communication using a non-contact IC card etc.).

The wallet application managing electronic key (ev) is downloaded to mobile phone 2001 in advance. Additionally, master key (Km) for generating decryption key for decrypting part of electronic key (ev) is managed in center 2002 and lock apparatus 2003. From the security point of view, master key (Km) is preferably different with respect to each lock apparatus 2003, or may be shared with respect to each group of lock apparatuses 2003. Center 2002 manages master key (Km) with respect to each lock apparatus 2003.

Figure 21:
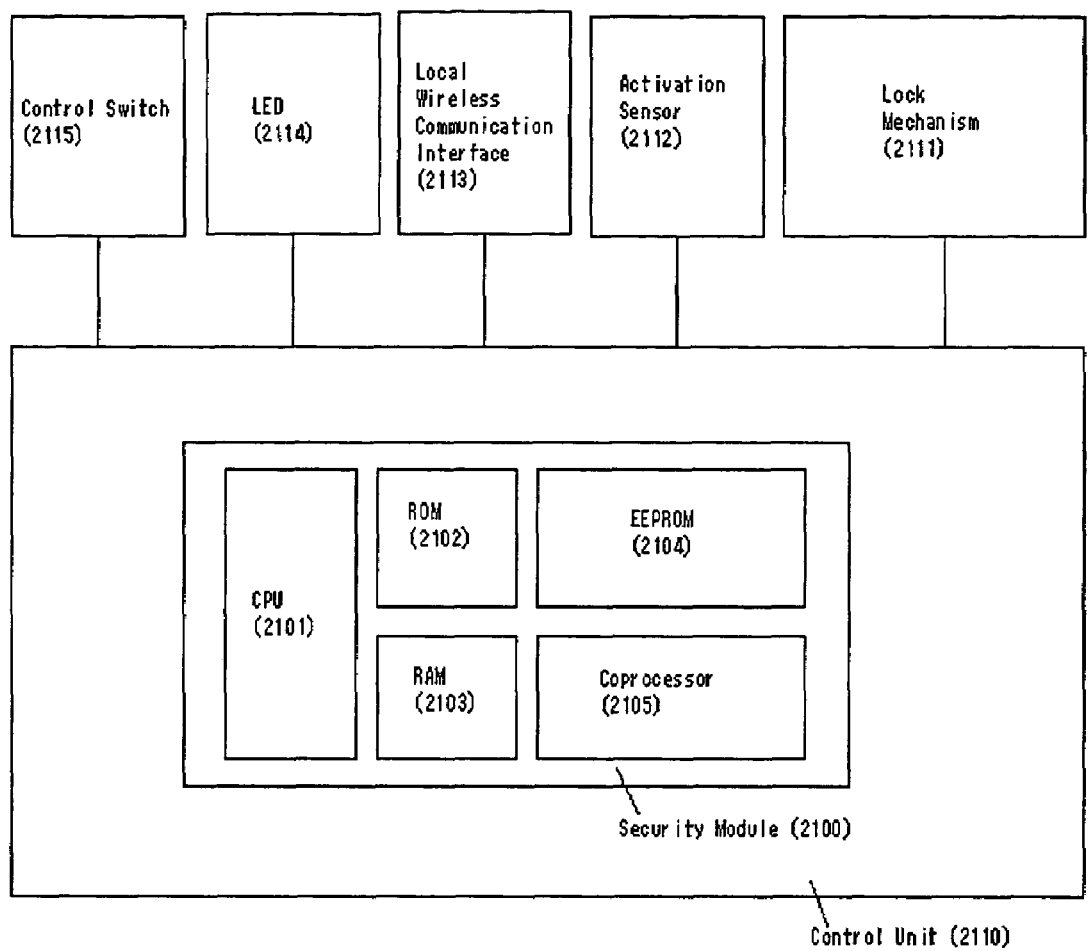
FIG. 21 is a block diagram of locks in the eighth and the ninth embodiments of the present invention.

FIG. 21 is a block diagram illustrating the configuration of lock apparatus 2003. Lock apparatus 2003 is comprised of lock mechanism 2111 physically controlling the opening and closing of the lock, activation sensor 2112 detecting the user's operation and activating lock apparatus 2003, local wireless communication interface 2113, LED 2114 indicating the state of lock apparatus 2003, control switch 2115, and control unit 2110 controlling other units and comprising security module 2100.

Local wireless communication interface 2113 is a communication interface such as infrared data communication, Bluetooth, wireless LAN, and wireless communication using a non-contact IC card for communicating with mobile phone.

Security module 2100 is a device for safety management of master key (Km) and authentication process of the electronic key, and comprises CPU 2101, ROM 2102, RAM 2103, EEPROM 2104, and coprocessor 2105, and having a tamper-resistant function for preventing external unauthorized access.

EEPROM 2104 stores lock ID, master key (Km) and public key of the management company. Lock ID is identification information of lock apparatus 2003. Master key (Km) is a master key for generating decryption key for decrypting encrypted part of electronic key (ev) of this lock apparatus 2003. The public key of management company is the public key of the management company issuing electronic key (ev) of this lock apparatus 2003.

Access to information stored in EEPROM 2104 of security module 2100 is controlled by CPU 2101, so that lock ID and the public key of the management company can be read, but cannot be rewritten. The master key is controlled so as not to be read or rewritten.

Mobile phone 2001 comprises local wireless communication interface. The wallet application of mobile phone 2001 arbitrary connects to lock apparatus 2003 through local wireless communication interface and executes authentication of electronic key with the use of electronic key (ev) managed by the wallet application. Moreover, the wallet application of the present embodiment manages the electronic credit of the second embodiment and electronic ticket of the third embodiment, and further has functions for executing the electronic credit card transaction process and the electronic ticket reading process.

The non-volatile memory of mobile phone 2001, as shown FIG. 22, stores wallet display information 2201, wallet sound information 2202, electronic credit list 2203, electronic ticket list 2204, and electronic key list 2205 as information managed by the wallet application. The wallet display information 2201 is display information such as pictures and images displayed by the wallet application on the screen of the mobile phone. Wallet sound information 2202 is sound information such as sound effects and melody information used by the wallet application. Electronic key list 2205 is a list of electronic key (ev) managed by the wallet application. Electronic credit list 2203 is the same as electronic credit list 703 described in the second embodiment. Electronic ticket list 2204 is the same as electronic ticket list 1504 described in the third embodiment.

FIG. 22 shows the case where three types of electronic keys (ev) are listed in electronic key list 2205. In electronic key list 2205, reference data, user authentication information (UID), electronic key (ev), and property are registered respectively to one electronic key (ev). Reference data and user identification information (UID) will be described in detail afterwards.

A property is attribute information which is set on the electronic key (ev). Examples of a property include an order wherein wallet application displays the list of electronic key, sound effect used at the point of electronic key authentication, and operations of LED and vibration device etc. Thereby the user becomes able to set an order of displaying electronic key according to usage frequency, to select a sound effect which is output upon completion of the electronic key authentication or upon failure of the key authentication process from the wallet sound information 2202 and set them, to set LED to blink upon completion of the electronic key authentication, and to set the vibration device to operate at the point of failure of key authentication process selectively.

Figure 23:
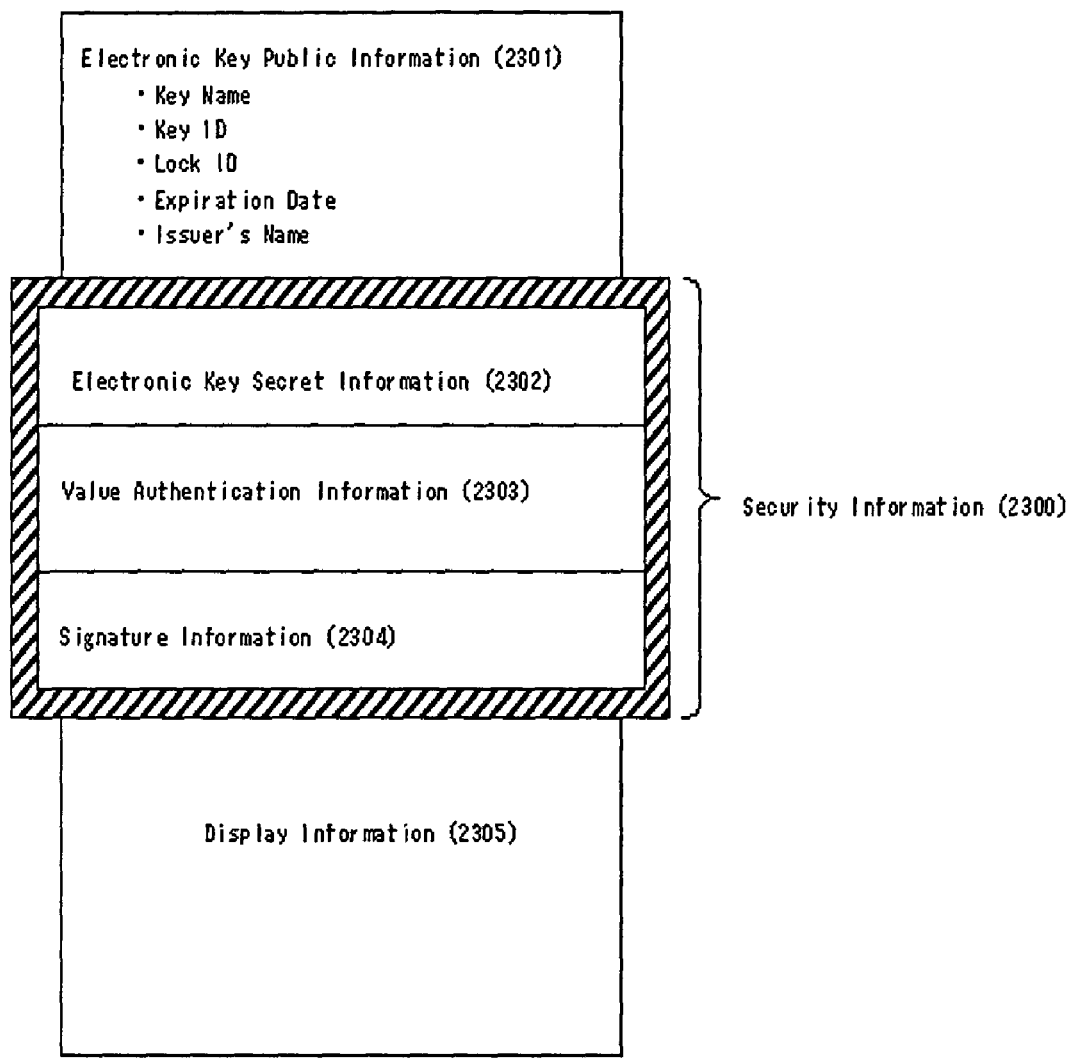
FIG. 23 is a diagram of the data structure of the electronic key in the eighth and the ninth embodiments of the present invention.

FIG. 23 shows the data configuration of electronic key (ev). Electronic key (ev) is comprised of electronic key public information 2301, security information 2300, and display information 2305. Security information 2300 is information used for the authentication process of the electronic key, and is encrypted by encryption key generated from master key (Km). Display information 2305 is display information such as picture and layout information etc. used by the wallet application at the point of display of electronic key and is an optional setting. Therefore, some have display information 2305 and the others do not have it according to electronic key (ev). For example, in the case of electronic key of conference room, display information such as a map indicating the point of a conference room and floor plan etc. is set.

Electronic key public information 2301 comprises information to be disclosed to user such as key's name, key ID, lock ID, expiration date, key issuer's name etc. The wallet application uses this electronic key public information 2301 when the electronic key is displayed on screen.

Security information 2300 is comprised of electronic key secret information 2302, value authentication information 2303, and signature information 2304. Value authentication information 2303 will be described afterwards.

Electronic key secret information 2302 stores information regarding the electronic key such as customer management information of the management company of lock apparatus 2003 which is not necessary to be disclosed to user. Upon authentication of the electronic key, electronic key secret information 2302 is decrypted in lock apparatus 2003 and used by the management company which manages lock apparatus 2003.

Signature information 2304 is the digital signature of the key issuer for data wherein electronic key public information 2301, electronic key secret information 2302 which is the electronic key secret information before being encrypted and value authentication information 2303 which is the value authentication information before being encrypted are concatenated. During electronic key authentication process, signature information 2304 is decrypted in lock apparatus 2003, and used for validation of the electronic key (ev).

Signature information 2304 is preferably a digital signature generated with the use of key which has enough key length for security based on the public key encryption system. However, it may be data wherein electronic key public information 2301, electronic key secret information 2302 which is electronic key secret information before being encrypted and value authentication information 2303 which is the value authentication information before being encrypted are concatenated and calculated by the hash function.

Figure 24:
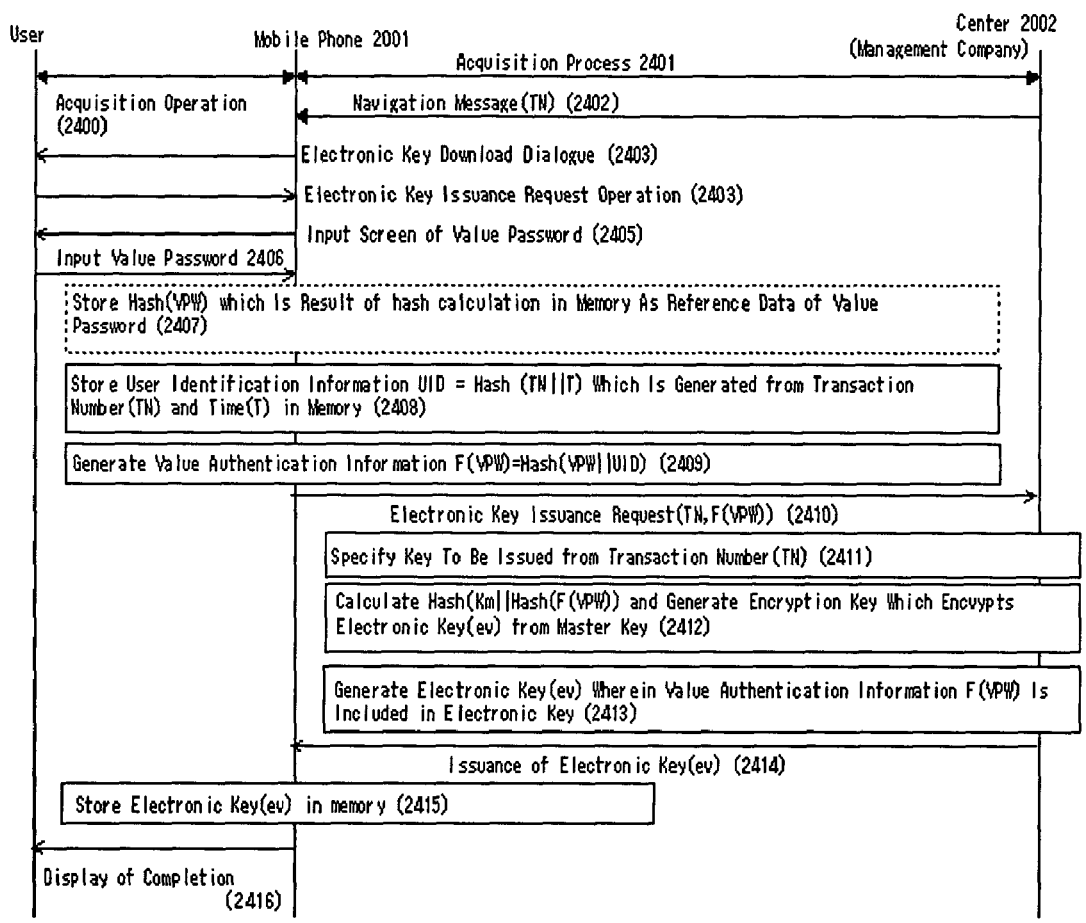
FIG. 24 is a flow chart of the download process of an electronic key in the eighth embodiment of the present invention.

Next, the process wherein the user downloads electronic key (ev) from center 2002 to mobile phone 2001 will be described. FIG. 24 shows the process for downloading electronic key (ev) wherein:

the user accesses center 2002 by using the internet access function of mobile phone 2001, reserves a facility such as a conference room or rental car, and executes an operation for acquiring a key such as the payment process of the electronic key (2400), an acquisition process is executed between mobile phone 2001 and center 2002 (2401), a navigation message is transmitted from center 2002 to mobile phone 2001 (2402). The navigation message is a message which causes mobile phone 2001 to download the electronic key and includes transaction number (TN) for identifying the electronic key to be downloaded.

When mobile phone 2001 receives navigation message (2402), wallet application is activated and dialogue for determining the status of the download of electronic key is displayed (2403). When the user executes the electronic key issuance request operation (2404), the panel for inputting value password set by user (VPW:<U>v</U>alue<U>p</U>ass<U>w</U>ord) is displayed according to the electronic key (ev) to be downloaded. (2405).

When the user inputs value password (2406), mobile phone 2001 stores the result of the hash calculation of value password Hash(VPW) as reference data of value password (VPW) (2407). Moreover, mobile phone 2001 generates user identification information UID=Hash(TN∥T) from transaction number (TN) and time (T) and stores it in memory (2408). Then, mobile phone 2001 generates value authentication information F(VPW)=Hash(VPW∥UID) from value password (VPW) and user identification information (UID) (2409), and transmits electronic key issuance request including transaction number (TN) and value authentication information F(VPW) to center 2002 (2410). At this point, reference data Hash(VPW) and user identification information UID=Hash(TN∥T) are stored in each field of electronic key list 2204 in the memory of mobile phone 2001 as data regarding electronic key to be newly downloaded.

Center 2002 receiving electronic key issuance request specifies electronic key to be issued (2411). Then, value authentication information F(VPW) is encoded by the hash calculation, concatenated with master key (Km) and further acquired by the hash calculation, so that encryption key Kk=Hash(Km∥Hash(F(VPW))) of common key encryption system for encrypting electronic key (ev) is generated (2412). Moreover, center 2002 generates electronic key public information and electronic key secret information of the electronic key (ev), and further generates electronic key (ev) having the data structure illustrated in FIG. 23 by using received value authentication information F(VPW) and encryption key (Kk) (2413). At this point, the expiration date based on content of reservation in acquisition process of step (2401) is set to the expiration date of electronic key (ev). For example, in the case of electronic key (ev) of conference room, expiration date based on time zone which is reserved is set to the expiration date of electronic key (ev)

The generated electronic key (ev) is transmitted to mobile phone 2001 (2414) and stored in the memory of mobile phone (2415). Mobile phone 2001 displays completion of download (2416), so that the download process of the electronic key is completed. At this point, electronic key (ev)

is stored in electronic key list 2204 in the memory of mobile phone 2001 as new electronic key. Moreover, the property is set to default. In the default setting, sound, which is used at the point of authentication process of electronic key, is not set.

Moreover, in step (2406) of FIG. 24, when user determines not to set value password for the sake of convenience, in step (2407), mobile phone 2001 does not perform hash calculation on the value password (VPW), and NULL indicating that value password (VPW) is not set is set to the field of reference data of electronic key list 2204. In step (2409), value authentication information F(VPW)=Hash(UID) is generated by executing hash calculation on user identification information (UID).

Moreover, when the wallet application is terminated, value password (VPW) and value authentication information F(VPW), which are input by the user, are deleted from the memory of mobile phone 2001. Since reference data stored in the memory of mobile phone is data wherein value password is encoded by hash calculation, it is impossible to steal the value password even if the mobile phone is stolen and the internal memory of the mobile phone is analyzed.

Figure 25:
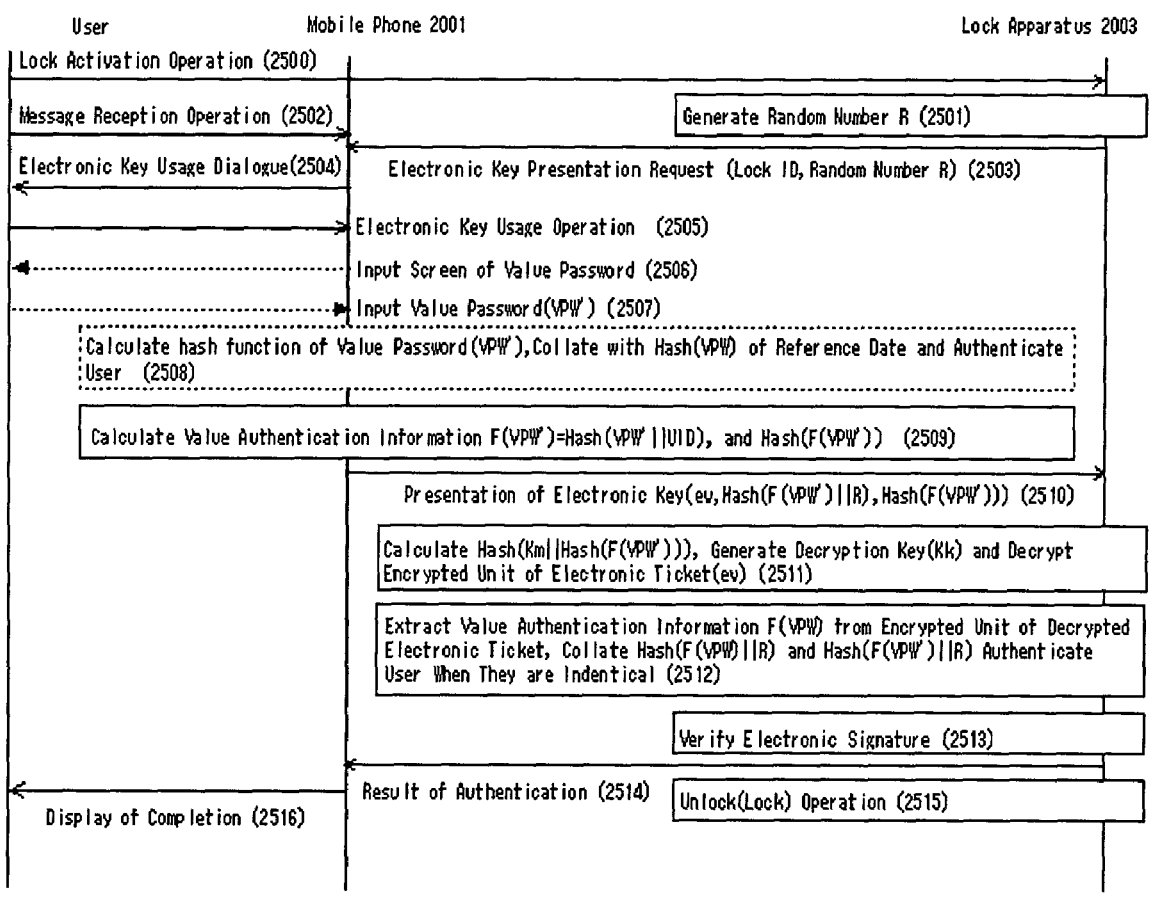
FIG. 25 is a flow chart of the authentication process of an electronic key in the eighth embodiment of the present invention.

Next, the process wherein authentication process is executed in lock apparatus 2003 and lock apparatus 2003 is unlocked (or locked) by using the downloaded electronic key (ev) will be described. FIG. 25 shows the authentication process of the electronic key of the present embodiment with the use of the electronic key (ev).

When the user executes the operation activating lock apparatus 2003 such as touching a doorknob to which a lock apparatus is attached (2500), activation sensor 2112 detects it and activates lock apparatus 2003, lock apparatus 2003 generates random number R as challenge information (2501). This random number R is acquired from security module 2100, and is generated by CPU 2101 of security module 2100. When the user executes operation enabling to receive message from lock apparatus 2003 (2502), mobile phone 2001 receives electronic key presentation request (2503). The electronic key presentation request includes lock ID and random number R.

In mobile phone 2001, which received electronic key presentation request, the wallet application is activated and dialogue inquiring whether electronic key is used is displayed (2504). At this point, mobile phone 2001 collates the received lock ID with electronic key list 2205 and presents the electronic key of the lock apparatus 2003 to user. In cases where electronic key fitting to lock apparatus 2003 does not exist, it is displayed to the user that no electronic key fits.

When user executes electronic key usage operation (2505), the panel for inputting value password corresponding to electronic key is displayed (2506).

When user inputs value password (VPW') (2507), mobile phone 2001 calculates the hash function Hash(VPW') of value password (VPW'), and collates it with hash function Hash(VPW) of reference data of electronic key on electronic key list 2204 corresponding to electronic key (2508). When they are not identical, an error message is displayed. When they are identical, mobile phone 2001 calculates value authentication information F(VPW')=Hash(VPW'||UID), Hash function Hash(F(VPW')||R) wherein value authentication information F(VPW') and random number R are concatenated and encoded by the hash calculation, and hash function Hash(F(VPW')) of value authentication information (2509). Mobile phone 2001 transmits electronic key (ev), hash function Hash(F(VPW')||R) and hash function Hash(F(VPW')) as a display message of electronic key (2510). At this point, display information 2305 of electronic key (ev) is not transmitted.

Lock apparatus 2003, after validating electronic key public information 2301 of received electronic key (ev), transmits electronic key (ev), Hash function Hash(F(VPW')||R1) and hash function Hash(F(VPW')) to security module 2100, and causes security module 2100 to execute off-line authentication of electronic key (ev) and the user. When the validation of electronic key public information 2301 (validation of lock ID and expiration date) indicates an error, an error message is transmitted from lock apparatus 2003 to mobile phone 2001, so that the authentication process of the electronic key is terminated. Therefore, the expired electronic key (ev) becomes non-usable, so that it is not necessary to return to the electronic key after use.

Moreover, security module 2100 calculates the hash function wherein hash function Hash(F(VPW')) of received value authentication information and master key (Km) are concatenated, generates decryption key Kk'=(Km||Hash(F(VPW'))) of common key encryption system to decrypt security information 2300 of electronic key, and decrypts security information 2300 of the electronic key by using coprocessor 2105 (2511).

Moreover, security module 2100 extracts value authentication information 2303 F(VPW) from decrypted security information 2300, and calculates hash function Hash(F(VPW)||R) wherein value authentication information 2303 F(VPW) and random number R are concatenated. Then, security module 2100 collates hash function Hash(F(VPW)||R) with hash function Hash(F(VPW')||R) which is received from mobile phone 2001. When they are identical, the user is authenticated to be the rightful owner of the electronic key (ev) (2512). Moreover, security module 2100 verifies the digital signature indicated by signature information 2304 of security information 2300 decrypted by using coprocessor 2105 with the use of public key of management company, and further verifies that electronic key (ev) has not been tampered with or falsified (2513). In cases where Hash(F(VPW)||R) and Hash(F(VPW')||R1) are not identical, or in cases where an error is detected in verification of signature information (2513), security module 2100 responds with an error message to lock apparatus 2003. Then, the error message is transmitted from lock apparatus 2003 to mobile phone 2001, so that the electronic key authentication process is terminated.

In cases where an error is not detected in the verification of signature information (2513), therefore, in cases where validity of electronic key (ev) is verified, security module 2100 indicates the completion of off-line authentication, lock apparatus 2003 transmits the result of authentication to mobile phone 2001 (2514), and mobile phone 2001 displays completion of authentication (2516), so that the authentication process of electronic key is terminated (2515).

Moreover, in lock apparatus 2003, control unit 2106 controls lock mechanism 2107 to unlock (or lock) lock apparatus 2103, so that the authentication process of the electronic key in lock apparatus 2003 is terminated (2515).

Moreover, mobile phone 2001 indicates completion of electronic key authentication process based on the property of the used electronic key when electronic key authentication process is terminated. In further cases where an error message is transmitted from lock apparatus 2003 and electronic key authentication process is terminated, mobile phone 2001 indicates failure of the electronic key authentication process based on the property of the used electronic key as described above.

Moreover, when the user selects the electronic key wherein the value password is unspecified in electronic key usage operation (2505), mobile phone 2001 skips steps (2506), (2507) and (2508) of FIG. 25, and proceeds to step (2509). Mobile phone 2001 calculates value authentication information F(VPW')=Hash(UID) by executing the hash calculation on user identification information (UID) (2509).

Moreover, in cases where signature information 2304 of the received electronic key (ev) is not the digital signature based on the public key encryption system but based on an electronic key (ev) wherein electronic key public information 2301, electronic key secret information 2302 which is decrypted, and value authentication information 2303 are concatenated and encoded by the hash calculation: in step (2513), electronic key public information 2301 of received electronic key (ev), electronic key secret information 2302 which is decrypted, and value authentication information 2303 which is decrypted are concatenated, encoded by the hash calculation, and collated with signature information 2304. Thereby it is verified that electronic key (ev) has not been tampered with or falsified.

Also in this case of electronic key authentication process, when the user terminates the wallet application, the value password and the value authentication information which user inputs are deleted from memory. Since all of the data for authentication process that are exchanged between mobile phone 2001 and lock apparatus 2003 are decoded by hash calculation or encryption, even if they are intercepted, it would be impossible to pose as the rightful owner by using the data which has been intercepted.

As the ninth embodiment of the present invention, an electronic key system for household use will be described. In the present embodiment, lock apparatus issues an electronic key which is translated into digitalized information (ev: a type of electronic value) to the mobile phone and the authentication process between mobile phone and lock apparatus is executed with the use of the electronic key (ev), so that the lock apparatus is either unlocked or locked.

The block diagram of the present electronic key system is basically the same as the case of the fourth embodiment, FIG. 20 shows the block diagram of the present electronic key system. The electronic key system is comprised of mobile phone 2001 which the user owns, center 2002, lock apparatus 2003, and the network 2004 connecting mobile phone 2001 and center 2002.

Note that lock apparatus 2003 for household use can be attached to the door of a house by the user who purchases it. Center 2002 is the center apparatus which is managed by the company manufacturing and distributing lock apparatus 2003 or the company providing a wallet application downloaded to mobile phone 2001. In the present electronic key system, since center 2002 exists for downloading wallet application for managing electronic key (ev) to mobile phone 2001, in cases where wallet application is equipped or downloaded in mobile phone 2001 in advance, center 2002 is not required.

According to the present embodiment of the electronic key system, it becomes possible to issue electronic keys (ev) of lock apparatus 2003 to multiple mobile phones 2001 under the management of the user and to invalidate them. Therefore, multiple users can own spare keys of a lock apparatus 2003 and the spare keys can be invalidated respectively. In the case of a conventional key system, when a key is lost or when a spare key is not returned, it is necessary to change the lock apparatus for security reasons. However, according to the present electronic key system, even if mobile phone 2001 storing electronic key (ev) is lost or electronic key (ev) issued to a friend's mobile phone is not returned, it is able to invalidate electronic key (ev) in lock apparatus 2003 and to issue electronic key (ev) to mobile phone 2001 again, thereby increasing convenience to users.

The network 2004 is comprised of a wireless communication network of mobile phone and the internet, and enables communication between mobile phone 2001 and center 2002 through wireless communication. In the communications between mobile phone 2001 and center 2002, secure sessions such as SSL (Secure Socket Layer) and TLS (Transport Layer Security) etc. are always established, so that encrypted communication data are transmitted.

Mobile phone 2001 and lock apparatus 2003 connect and communicate with each other with the use of local wireless communication function (such as infrared data communication, Bluetooth, wireless LAN, wireless communication using a non-contact IC card etc.).

In mobile phone 2001, wallet application managing electronic key (ev) is equipped. Both the multipurpose wallet application downloaded by user to mobile phone 2001 in advance and the proprietary wallet application downloaded by user who has purchased lock apparatus 2003 from center 2002 to mobile phone 2001 are permitted as the wallet application. The download process of the wallet application from center 2002 to mobile phone 2001 by user who has purchased lock apparatus 2003 will be described in detail afterwards.

In center 2002, the wallet application is managed. In lock apparatus 2003, master key (Km) for generating a decryption key decrypting encrypted part of electronic key (ev), lock ID which is identification information of lock apparatus 2003, lock number (LN), which is used as identification number at the point of issuing electronic key (ev) by lock apparatus 2003 etc., are managed.

The configuration of lock apparatus 2003 of the present electronic key system is basically the same as of the eighth embodiment. FIG. 21 is a block diagram illustrating the configuration of lock apparatus 2003. Lock apparatus 2003 is comprised of lock mechanism 2111 physically controlling the opening and closing of the lock, activation sensor 2112 detecting user's operation and activating lock apparatus 2003, local wireless communication interface 2113, LED 2114 indicating the state of lock apparatus 2003, control switch 2115, and control unit 2110 controlling other units and comprising security module 2100. In cases where lock apparatus 2003 is a type attached to the door, it is preferably to be attached inside the door to prevent intrusion from outside.

Local wireless communication interface 2113 is a communication interface such as infrared data communication, Bluetooth, wireless LAN, and wireless communication using a non-contact IC for communicating with mobile phone.

Security module 2100 is device for safety management of master key (Km) and authentication process of the electronic key, and comprises CPU 2101, ROM 2102, RAM 2103, EEPROM 2104, and coprocessor 2105, and having a tamper-resistant function for preventing external unauthorized access.

Figure 26:
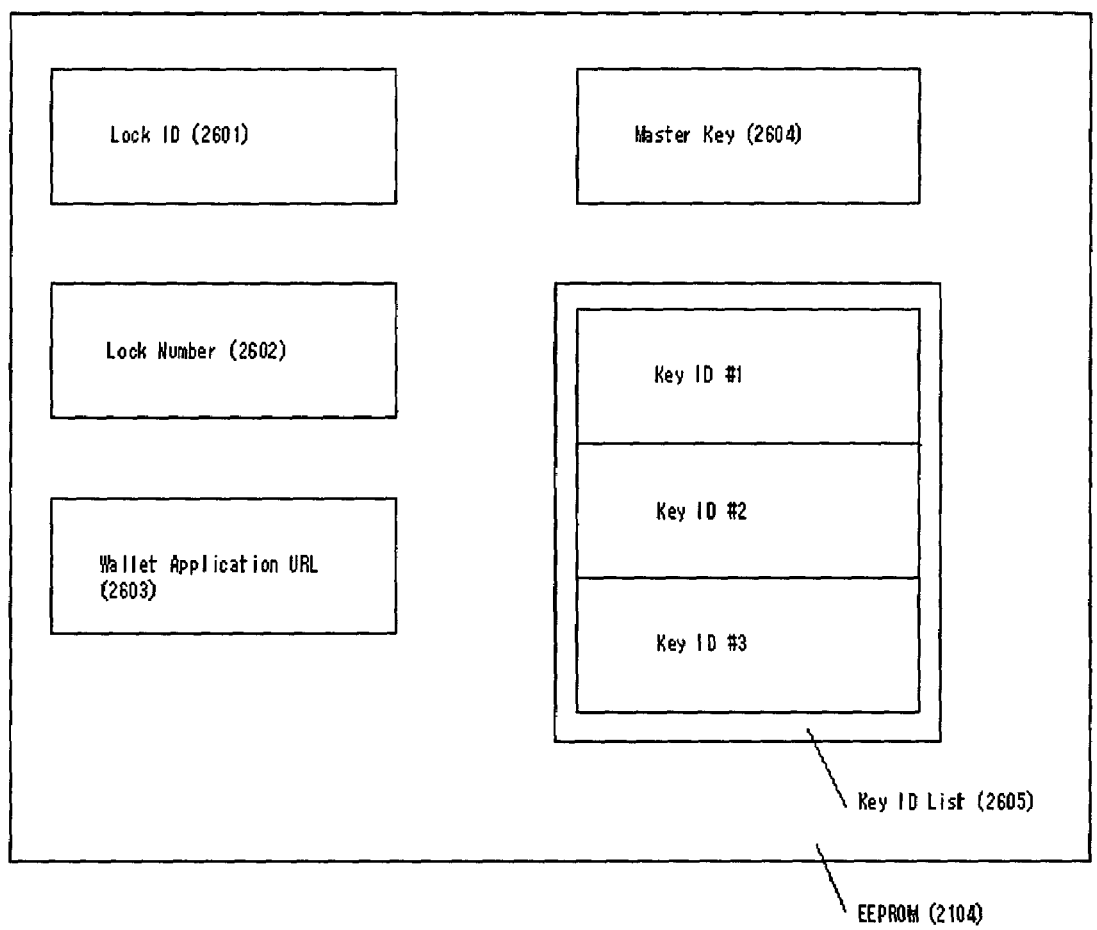
FIG. 26 is a block diagram of information stored in EEPROM of security module in the ninth embodiment of the present invention.

In EEPROM 2104, as shown in FIG. 26, lock ID 2601, lock number (LN) 2602, wallet application URL 2603, master key (Km) 2604, and key ID list 2605 are stored. Lock ID 2601 is the identification information of lock apparatus 2003. Lock number (LN) 2602 is identification number used for identification of user at the point of issuing electronic key (ev) by lock apparatus 2003. Wallet application URL 2603 is a URL (Uniform Resource Locator) of proprietary wallet application of this lock apparatus 2003. Master Key (Km) 2604 is a master key for generating a decryption key decrypting encrypted part of electronic key (ev) of lock apparatus 2003. Key ID list 2605 is list of Key ID of electronic key (ev) which has issued by lock apparatus 2003 and is presently valid.

Lock number (LN) 2602 is number set at the point of manufacture of lock apparatus 2003 and is number which is necessary to be known only by user who owns lock apparatus 2003. Therefore, when lock apparatus 2003 is sold, lock number (LN) is sold in such a way that lock number is not known by anybody. For example, it is sold in such a way that the user becomes able to know the lock number (LN) only by scratching attached card of lock apparatus 2003 purchased by user.

Access to information stored in EEPROM 2104 of security module 2100 is controlled by CPU 2101, so that lock ID 2601 and wallet application URL 2603 can be read, but cannot be rewritten. Lock number (LN) is controlled so as not to be read or rewritten. Master key (Km) 2604 cannot be read or rewritten, but can be updated to new master key (Km) generated in security module 2100. Key ID list 2605 is controlled so as not to be read or rewritten, but to be deleted and added with respect to each issuance of electronic key.

Users can update the master key (Km) and delete key ID by operating control switch 2115 by checking the state of lock apparatus 2003 indicated by LED 2114. When master key (Km) is updated, key ID list 2605 is deleted.

Mobile phone 2001 is the same as mobile phone 2001 described in the eighth embodiment except the wallet application having the acquisition function of electronic key (ev) from lock apparatus 2003. Mobile phone 2001 comprises a local wireless communication interface. Wallet application of mobile phone 2001 connects to lock apparatus 2003 through local wireless communication interface and authenticates the electronic key with the use of electronic key (ev) managed by wallet application.

Moreover, the data structure of the electronic key (ev) is basically the same as of the eighth embodiment. FIG. 23 illustrates the data structure of the electronic key (ev) of the present electronic key system. Note that signature information 2304 is information wherein electronic key public information 2301 and data, wherein electronic key secret information 2302 which is electronic key secret information before being encrypted, and value authentication information 2303 which is the value authentication information before being encrypted are concatenated and calculated by the hash function. Signature information 2304 is decrypted in lock apparatus 2003, collated with information newly calculated by the hash function, and used for verifying that electronic key (ev) has not been tampered with or falsified at the point of authentication process of electronic key.

Figure 27:
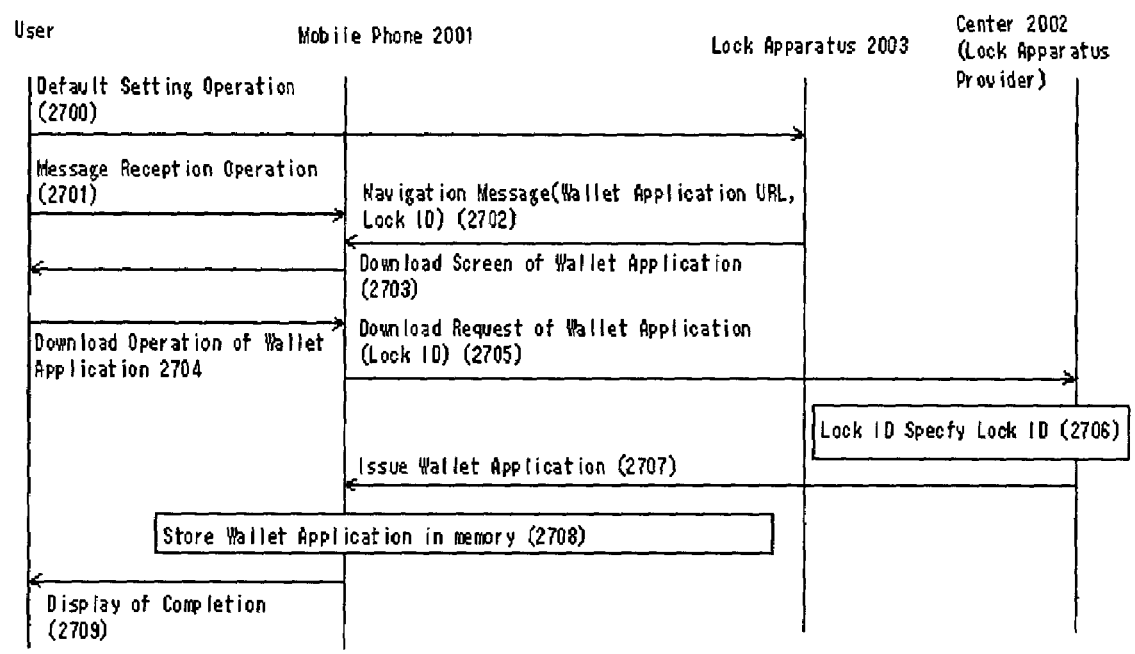
FIG. 27 is a flow chart of the download process of wallet application in the ninth embodiment of the present invention.

Next, the download process of the wallet application from center 2002 to mobile phone 2001 wherein user operates control switch 2115 of lock apparatus 2003 will be described. FIG. 27 illustrates the download process of the wallet application. The user executes default setting operation to download wallet application by operating control switch 2115 of lock apparatus 2003 (2700). When the user operates mobile phone 2001 enabling to receive message from lock apparatus 2003 (2701), mobile phone 2001 receives the navigation message from lock apparatus 2003 (2702). The navigation message includes the wallet application URL and lock ID.

Mobile phone 2001, which received the navigation message, displays dialogue inquiring whether the wallet application is downloaded to user (2703). When the user executes the operation for downloading wallet application (2704), mobile phone 2001 transmits wallet application downloading request to center 2002 indicated by wallet application URL (2705). The wallet application downloading request includes lock ID.

Center 2002, which received the wallet application downloading request, specifies the type of lock apparatus by lock ID (2706) and issues a wallet application adequate to lock apparatus 2003 to mobile phone 2001 (2707). Mobile phone 2001, which received the wallet application, stores the wallet application in memory (2708) and displays completion of download (2709), so that it terminates the download process of the wallet application.

Figure 28:
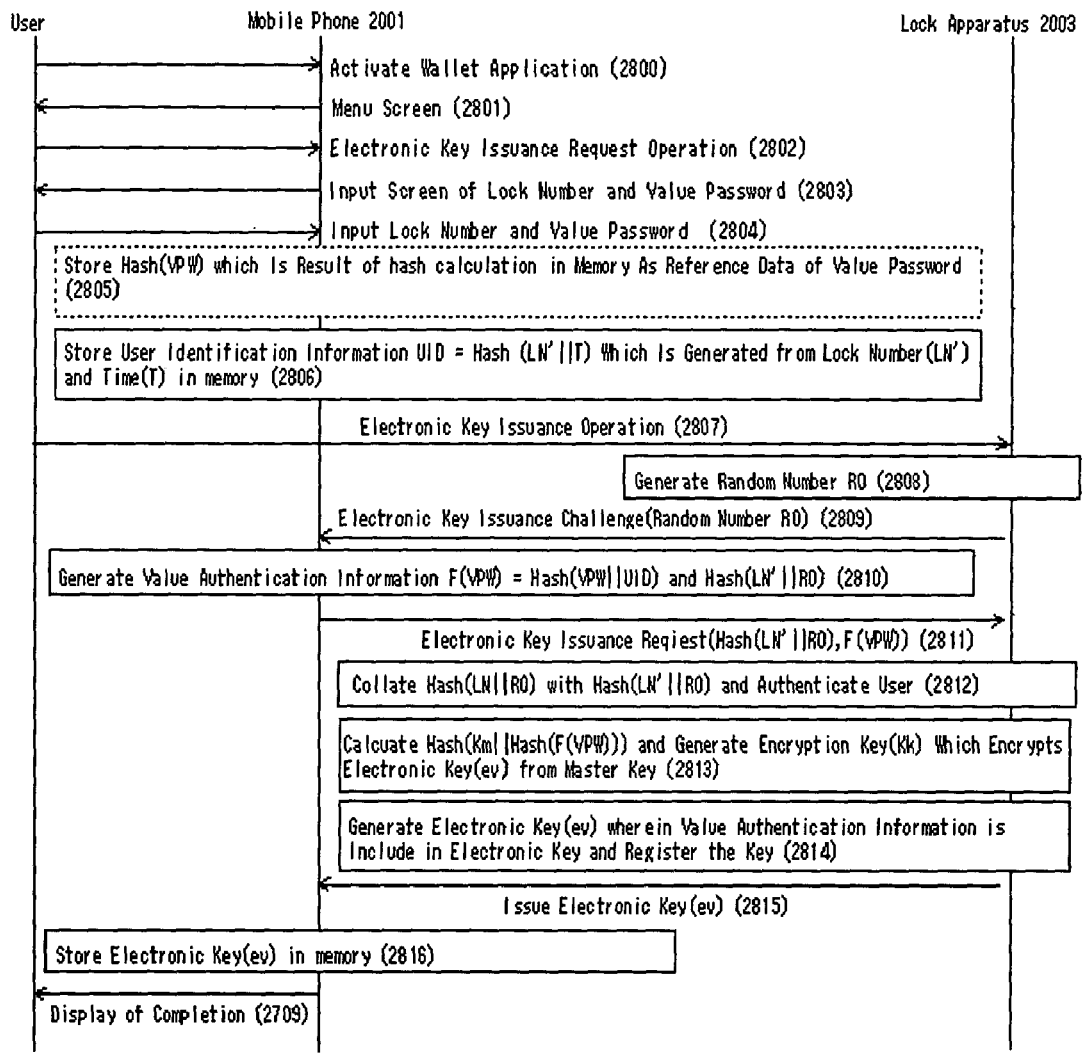
FIG. 28 is a flow chart of the issuance process of an electronic key in the ninth embodiment of the present invention.

The issuance process of electronic key (ev) from lock apparatus 2003 to mobile phone 2001 will be described. FIG. 28 illustrates the issuance process of the electronic key (ev) from lock apparatus 2003 to mobile phone 2001. When the user activates wallet application of mobile phone 2001 (2800), a menu panel is displayed (2801). When the user executes electronic key issuance request operation (2802), the lock number and the panel for inputting value password set by user (VPW:<U>v</U>alue<U>p</U>ass<U>w</U>ord) are displayed according to the electronic key (ev) to be downloaded (2803).

When user inputs lock number (LN') of lock apparatus 2003 and value password (VPW) (2804), mobile phone 2001 stores result of the hash calculation of value password Hash(VPW) as reference data of value password (VPW) (2805). Moreover, mobile phone 2001 generates user identification information UID=Hash(LN'∥T) from lock number (LN') and time (T) and stores it in memory (2806). At this point, reference data Hash(VPW) and user identification information UID=Hash(LN'∥T) are stored in each field of electronic key list 2204 in the memory of mobile phone 2001 as new data regarding electronic key to be downloaded.

When the user operates control switch 2115 of lock apparatus 2003 and sets lock apparatus 2003 to electronic key (ev) issuance mode (2807), lock apparatus 2003 generates random number R0 (2808) and transmits electronic key issuance challenge to mobile phone 2001 (2809). Electronic key issuance challenge is a challenge message to mobile phone 2001 and includes random number R0. This random number R0 is acquired from security module 2100, and generated by CPU 2101 of security module 2100.

Mobile phone 2001, which received electronic key issuance challenge, generates value authentication information F(VPW)=Hash(VPW∥UID), concatenates lock number (LN') and random number R0, and calculates the hash function of thereof. Hash(LN'∥R0) (2810), and transmits Hash(LN'∥R0) and electronic key issuance request including value authentication information F(VPW) to lock apparatus 2003 (2811).

Lock apparatus 2003, which received the electronic key issuance request, transmits Hash(LN'∥R0) and electronic key issuance request which are received to security module 2100, and causes security module 2100 to execute the generation process of the electronic key (ev). Security module 2100 concatenates lock number (LN) and random number R0, calculates the hash function of thereof. Hash(LN∥R0), collates it with received Hash(LN'∥R0), so that user is authenticated to be the rightful owner of lock apparatus 2003 who knows lock number (LN) (2812).

In cases where user is authenticated (Hash(LN'∥R0) and Hash(LN∥R0) are identical), security module 2100 executes the hash calculation on value authentication information F(VPW), concatenates it with a master key (Km), further executes hash calculation thereon, and generates encryption key Kk=Hash(Km∥Hash(F(VPW))) of common key encryption system encrypting electronic key (ev) (2813). Moreover, security module 2100 generates electronic key public information and electronic key secret information of electronic key (ev), generates electronic key (ev) having data structure of FIG. 23 with the use of received value authentication information F(VPW) and encryption key (Kk), and lists the key ID of generated electronic key (ev) to key ID list 2605 (2814). When electronic key (ev) is generated, security module 2100 assigns unique ID to electronic key (ev).

In cases where user is not authenticated (Hash(LN'∥R0) and Hash(LN∥R0) are not identical), security module 2100 responds with an error message to lock apparatus 2003, then lock apparatus 2003 transmits the error message to mobile phone 2001, so that the issuance process of the electronic key is terminated.

Generated electronic key (ev) is transmitted to mobile phone 2001 (2815) and stored in the memory of mobile phone (2816). Mobile phone 2001 displays completion of issuance process (2817), so that the issuance process of electronic key is completed. At this point, electronic key (ev) is stored in electronic key list 2204 in memory of mobile phone 2001 as a new electronic key. Moreover, the property is set to default. In the default setting, sound, which is used at the point of authentication process of electronic key, is not set.

Moreover, in step (2804) of FIG. 28, when user determines not to set value password for the sake of convenience, in step (2805), mobile phone 2001 does not execute the hash calculation of value password (VPW), and NULL, indicating that value password (VPW) is not set, is set to the field of reference data of electronic key list 2204. In step (2810), value authentication information F(VPW)=Hash(UID) is generated by executing the hash calculation on user identification information (UID).

Moreover, when the wallet application is terminated, value password (VPW) and value authentication information F(VPW), which are input by user, are deleted from the memory of mobile phone 2001. Since reference data stored in the memory of mobile phone is data wherein value password is encoded by hash calculation, it is impossible to steal value password even if mobile phone is stolen and internal memory of the mobile phone is analyzed.

Figure 29:
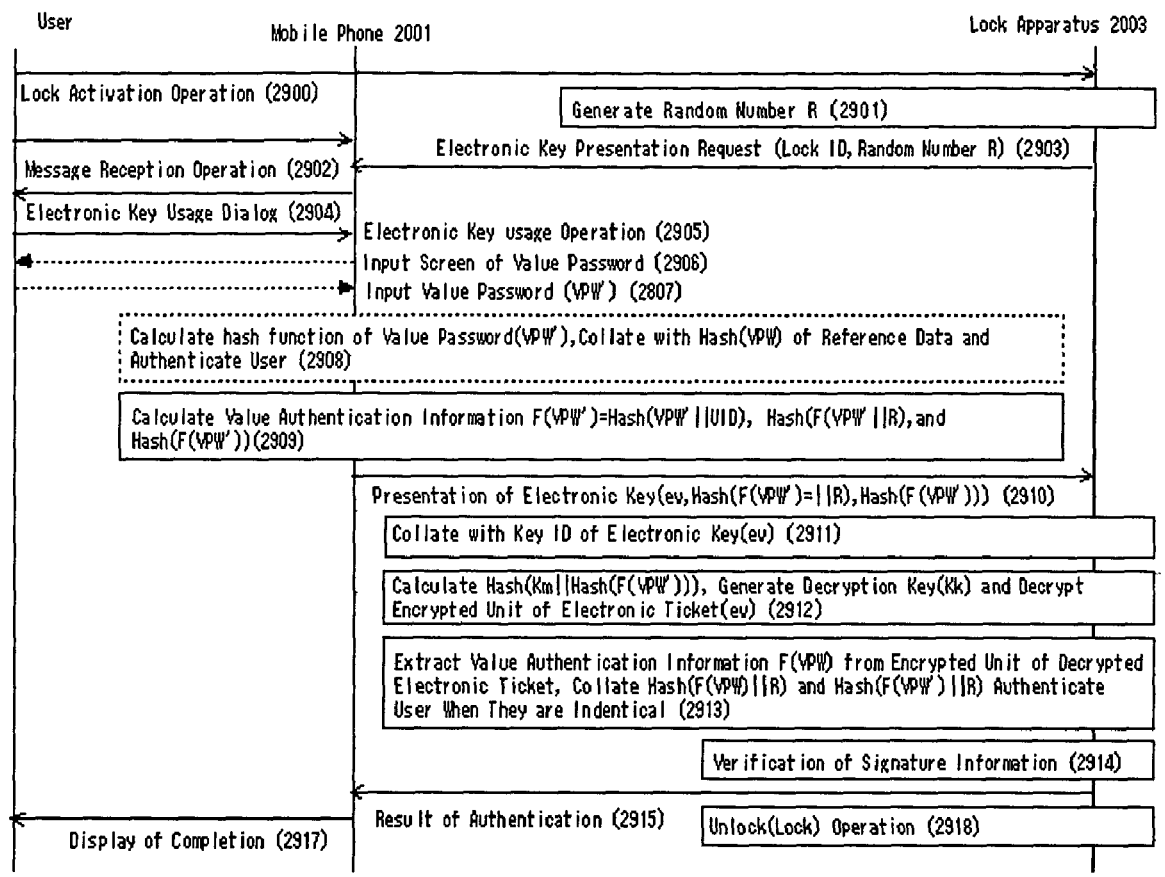
FIG. 29 is a flow chart of the authentication process of an electronic key in the ninth embodiment of the present invention.

Next, the process wherein authentication process is executed in lock apparatus 2003 and lock apparatus 2003 is unlocked (or locked) by using the downloaded electronic key (ev) will be described. FIG. 29 shows the authentication process of the electronic key of the present embodiment with the use of electronic key (ev).

When user executes operation activating lock apparatus 2003 such as touching a doorknob to which a lock apparatus is attached (2900), activation sensor 2112 detects it and activates lock apparatus 2003, lock apparatus 2003 generates random number R as challenge information (2901). This random number R is acquired from security module 2100, and generated by CPU 2101 of security module 2100. When the user executes operation enabling to receive message from lock apparatus 2003 (2902), mobile phone 2001 receives electronic key presentation request (2903). Electronic key presentation request includes lock ID and random number R.

In mobile phone 2001, which received the electronic key presentation request, wallet application is activated and dialogue inquiring whether electronic key is used is displayed (2904). At this point, mobile phone 2001 collates the received lock ID with electronic key list 2205 and presents the electronic key of the lock apparatus 2003 to user. In cases where the electronic key corresponding to lock apparatus 2003 does not exist, it is displayed for user that no electronic key corresponds thereto.

When the user executes electronic key usage operation (2905), panel for inputting value password corresponding to electronic key is displayed (2906). When user inputs value password (VPW') (2907), mobile phone 2001 calculates hash function Hash(VPW') of value password (VPW'), and collates it with hash function Hash(VPW) of reference data of electronic key on electronic key list 2204 corresponding to electronic key (2908). When they are not identical, an error message is displayed. When they are identical, mobile phone 2001 calculates value authentication information F(VPW')=Hash(VPW'∥UID), Hash function Hash(F(VPW')∥R) wherein value authentication information F(VPW') and random number R concatenated and encoded by the hash calculation, and hash function Hash(F(VPW')) of value authentication information (2909). Mobile phone 2001 transmits electronic key (ev), hash function Hash(F(VPW')∥R) and hash function Hash(F(VPW')) as a message of electronic key (2910). At this point, display information 2305 of electronic key (ev) is not transmitted.

Lock apparatus 2003, after validating electronic key public information 2301 of received electronic key (ev), transmits electronic key (ev), Hash function Hash(F(VPW')∥R1) and hash function Hash(F(VPW')) to security module 2100, and causes security module 2100 to execute off-line authentication of the electronic key (ev) and the user. When validation of electronic key public information 2301 (validation of lock ID and expiration date) indicates an error, an error message is transmitted from lock apparatus 2003 to mobile phone 2001, so that the authentication process of the electronic key is terminated.

Security module 2100 collates key ID of electronic key public information 2301 of electronic key (ev) with key ID list 2605, and verifies that electronic key (ev) is an electronic key which is a valid key listed in key ID list 2605 (2911). In cases where electronic key (ev) is registered in key ID list 2605, security module 2100 calculates the hash function wherein hash function Hash(F(VPW')) of value authentication information and master key (Km) are concatenated, generates decryption key Kk'=(Km∥Hash(F(VPW'))) of common key encryption system to decrypt security information 2300 of the electronic key, and decrypts security information 2300 of electronic key by using coprocessor 2105 (2912).

Moreover, security module 2100 extracts value authentication information 2303 F(VPW) from decrypted security information 2300, and calculates hash function Hash(F(VPW)∥R) wherein value authentication information 2303 F(VPW) and random number R are concatenated. Then, security module 2100 collates hash function Hash(F(VPW)∥R1) with hash function Hash(F(VPW')∥R1) which is received from mobile phone 2001. When they are identical, user is authenticated to be the rightful owner of the electronic key (ev) (2913). Moreover, security module 2100 calculates hash function wherein electronic key public information 2301 of electronic key (ev), electronic key secret information 2302 which is decrypted, and value authentication information 2303 which is the value authentication information before being encrypted are concatenated, collates it with signature information 2304, and verifies that electronic key (ev) has not been tampered with or falsified (2914). In cases where electronic key (ev) is not listed in key ID list 2605, in cases where Hash(F(VPW)||R) and Hash(F(VPW')||R) are not identical, or in cases where an error is detected in verification of signature information (2913), security module 2100 responds by an error message to lock apparatus 2003. Then, the error message is transmitted from lock apparatus 2003 to mobile phone 2001, so that the authentication process of the electronic key is terminated.

In cases where an error is not detected in verification of signature information (2914), therefore, in cases where validity of electronic key (ev) is verified, security module 2100 indicates completion of off-line authentication, lock apparatus 2003 transmits result of authentication to mobile phone 2001 (2915), and mobile phone 2001 displays completion of authentication (2917), so that the authentication process of the electronic key is terminated.

Besides, in lock apparatus 2003, control unit 2106 controls lock mechanism 2107 to unlock (or lock) lock apparatus 2003, so that the authentication process of the electronic key in lock apparatus 2003 is terminated (2916).

Moreover, mobile phone 2001 indicates completion of electronic key authentication process based on property of the used electronic key when electronic key authentication process is terminated. In further cases where an error message is transmitted from lock apparatus 2003 and electronic key authentication process is terminated, mobile phone 2001 indicates failure of electronic key authentication process based on the property of the used electronic key as described above.

Moreover, when the user selects an electronic key wherein the value password is unspecified in electronic key usage operation (2905), mobile phone 2001 skips steps (2906), (2907) and (2908) of FIG. 29, and proceeds to step (2909). Mobile phone 2001 calculates value authentication information F(VPW')=Hash(UID) by executing the hash calculation on user identification information (UID) (2909).

Also in this case of electronic key authentication process, when the user terminates the wallet application, the value password and value authentication information which user inputs are deleted from memory. Since all of the data for authentication process that are exchanged between mobile phone 2001 and lock apparatus 2003 are encoded by hash calculation or encryption, even if they are intercepted, it would be impossible to pose as the rightful owner by using the data which has been intercepted.

According to electronic value authentication method, authentication system and apparatus, it becomes possible to execute a safety authentication process with the use of a mobile terminal that does not have a tamper-resistant function.

In a still further aspect of the present invention, it enables a safety credit card transaction process with the use of mobile phone by downloading electronic credit as an electronic value to a mobile phone, so that the user is not required to bring credit card, thereby increasing user's convenience.

In a still further aspect of the present invention, the user becomes able to select the electronic credit from multiple types of electronic credit downloaded in mobile phone and to use it. The credit card transaction terminal becomes able to communicate with multiple types of credit cards and multiple acquirers. Moreover, since credit the transaction terminal is portable, for example, staff of affiliated retail stores and restaurants can carry it and transact on the sales floor without making customer wait.

In a still further aspect of the present invention, it enables ticket reading of electronic tickets with the use of a mobile phone by downloading an electronic ticket as an electronic value to a mobile phone, so that user becomes able to acquire a ticket without actually going to a specific place or receiving it by mail, thereby increasing user's convenience.

In a still further aspect of the present invention, it enables the locking or unlocking of lock apparatus with the use of mobile phone by downloading an electronic key as electronic value to a mobile phone without actual delivery, so that user is not required to go to the place wherein the physical key is managed and the management company is not required to place a person to deliver the key, thereby making business more efficient.

In a still further aspect of the present invention, it becomes possible to issue electronic keys of a lock apparatus to multiple mobile phones and to invalidate them. In the case of a conventional key system, when a key is lost or when a spare key is not returned, it has been required to change the lock apparatus for safety's sake. However, according to the present electronic key system, when a mobile phone storing an electronic key is lost or when an electronic key issued to a friend's mobile phone is not returned, it is possible to invalidate the electronic key on the lock apparatus side, thereby increasing user's convenience.

What is claimed is:

1. An authentication method wherein:
a user owns an electronic value including encrypted value authentication information (F(VPW)) wherein authentication information (VPW) corresponding to said electronic value specified by said user is encoded by a first irreversible calculation process (F),
in a process for authenticating said user as the right owner of said electronic value, an authentication side generates a random number (R) and transmits it to said user side,
said user side generates value authentication information (F(VPW')) from said authentication information (VPW) corresponding to said electronic value input by said user, further generates authentication information (G(R,F(VPW'))) wherein said random number (R) and said value authentication information (F(VPW')) are concatenated and encoded by a second irreversible calculation process (G) and transmits said electronic value and said authentication information (G(R,F(VPW'))) to said authentication side,
said authentication side decrypts code of said received electronic value, extracts said value authentication information (F(VPW)) from said electronic value, generates authentication information (G(R,F(VPW))) wherein said random number (R) and said value authentication information (F(VPW)) are concatenated and encoded by said second irreversible calculation process (G), collates said received authentication information (G(R,F(VPW'))) with said generated authentication information (G(R,F(VPW))), verifies that they are identical, and authenticates user.

2. The authentication method of claim 1 wherein:
a decryption key of an encrypted part of said electronic value is generated from data (H(F(VPW))) wherein said value authentication information (F(VPW)) is encoded by a third irreversible calculation process (H) and a master key,
in said process for authenticating said user as the rightful owner of said electronic value, said user side further generates data (H(F(VPW'))) wherein said value authentication information (F(VPW')) is encoded by said third irreversible calculation process (H), transmits data (H(F(VPW'))) with said electronic value and said authentication information (G(R,F(VPW'))) to said authentication side, said authentication side generates said decryption key from received data (H(F(VPW'))) and said master key, and decrypts code of received electronic value.

3. A mobile terminal wherein:

comprising storage means storing an electronic value, generating value authentication information (F(VPW')) wherein value authentication information (VPW') corresponding to said electronic value input by a user is encoded by a first irreversible calculation process (F), further generating a second random number (R2), said value authentication information (F(VPW')) and a first random number (R1) received from an authentication apparatus are concatenated, generating authentication information (G(R1,F(VPW'))) by a second irreversible calculation process (G) on said concatenation, and transmitting said electronic value, said authentication information (G(R1,F(VPW'))) and said second random number (R2) to said authentication apparatus, thereby authenticating said user to be the rightful owner of said electronic value.

4. The mobile terminal of claim 3 wherein:

a decryption key of an encrypted part of said electronic value is generated from data (H(F(VPW))) wherein value authentication information (F(VPW)) is encoded by a fourth irreversible calculation process (H) and a master key, said mobile terminal generates data (H(F(VPW'))) wherein said value authentication information (F(VPW')) is encoded by said fourth irreversible calculation process (H) and transmits said electronic value, said authentication information (G(R,F(VPW'))) and said data (H(F(VPWD))to said authentication apparatus, thereby authenticating said user to be the rightful owner of said electronic value.

5. The mobile terminal of claim 3 characterized in that:

said storage means stores a property which is attribute information set with respect to each electronic value, in authentication process with the use of said electronic value, an operation is executed based on said property.

6. The mobile terminal of claim 3 characterized in that:

said storage means stores a property which is attribute information set with respect to each electronic value, in authentication process with the use of said electronic value, an operation is executed based on user terminal control information received from said authentication information and said property.

7. An authentication apparatus characterized in:

generating a random number (R) and transmitting it to a mobile terminal, receiving authentication information (G(R,F(VPW'))) and an electronic value from said mobile terminal, decrypting code of an encrypted part of said electronic value, and validating said electronic value, further extracting value authentication information (F(VPW)) from said electronic value, wherein the function (F) is a first irreversible calculation process, generating authentication information (G(R,F(VPW))) wherein said value authentication information (F(VPW)) and said random number (R) are concatenated and encoded by a second irreversible calculation process (G), and collating received authentication information (G(R,F(VPW'))) with generated authentication information (G(R,F(VPW))), verifying that they are identical, thereby authenticating a user.

8. The authentication apparatus of claim 7 wherein:

a decryption key for said encrypted part of said electronic value is generated from data (H(F(VPW))) wherein said value authentication information (F(VPW)) is encoded by a third irreversible calculation process (H) and a master key, said authentication apparatus generates said decryption key from data (H(F(VPW'))) received from said mobile terminal and said master key, and decrypts code of said received electronic value.

9. The authentication apparatus of claim 7, comprising a security module having a tamper-resistant function, characterized in that:

said security module decrypts the encrypted part of said electronic value, stores a negative list of electronic values, and verifies that said received electronic value is not listed in said negative list of electronic value at the point of validation of said received electronic value.

10. The authentication apparatus of claim 9 wherein:

said security module communicates with a center and updates information stored in said security module.

11. The authentication apparatus of claim 7 wherein:

transmitting user terminal information to said mobile terminal and controlling operation of said mobile terminal at the point of said authenticating step by said electronic value and executing operation of its own based on service terminal control information received from said mobile terminal.

12. An electronic value issuance server wherein:

extracting authentication information (VPW) corresponding to an electronic value specified by a user from electronic value issuance request received from said mobile terminal, generating value authentication information (F(VPW)) wherein said authentication information (VPW) corresponding to said electronic value is encoded by a first irreversible calculation process (F), generating an encryption key from data (H(F(VPW))) wherein said value authentication information (F(VPW)) is encoded by a third irreversible calculation process (H) and a master key, generating said electronic value with the use of said value authentication information (F(VPW)) and said generated encryption key, and transmitting said electronic value to said mobile terminal.

13. An electronic value issuance server wherein:

extracting authentication information (F(VPW)) corresponding to an electronic value specified by user, wherein authentication information (VPW) is encoded by a first irreversible calculation process (F), from electronic value issuance request message received from a mobile terminal, generating an encryption key from data (H(F(VPW))) wherein said value authentication information (F(VPW)) is encoded by a second irreversible calculation process (H) and a master key, generating said electronic value with the use of said value authentication information (F(VPW)) and said generated encryption key, and transmitting said electronic value to mobile terminal.

14. The electronic value issuance server of either claim 12 or 13 wherein:

said electronic value includes electronic value disclosure information and security information, said security information is data including electronic value secret information, wherein said value authentication information (F(VPW)) and signature information are encrypted by said generated encryption key, said signature information is a digital signature for data wherein said electronic value disclosure information, said electronic value secret information, and said value authentication information (F(VPW)) are concatenated.

15. The electronic value issuance server of either claim 12 or 13 wherein:
   said electronic value includes electronic value disclosure information and security information,
   said security information is data wherein electronic value secret information, said value authentication information (F(VPW)) and signature information are encrypted by said generated encryption key,
   said signature information is a result of a hash calculation for data wherein said electronic value disclosure information, said electronic value secret information, and said value authentication information (F(VPW)) are concatenated.

16. The electronic value issuance server of claim 14 wherein:
   generating risk management information based on credit information of said user and a result of risk evaluation on said value authentication information (F(VPW)) corresponding to said electronic value specified by said user and building said risk management information in said electronic value secret information.

17. An authentication system, comprised of a mobile terminal managed by a user, an authentication apparatus and an electronic value issuance server, wherein:
   said mobile terminal stores an electronic value received from said electronic value issuance server,
   said electronic value includes an encrypted value authentication information (F(VPW)) wherein authentication information (VPW) corresponding to said electronic value specified by said user is encoded by a first irreversible calculation process (F),
   in a process for authenticating said user to be the rightful owner of said electronic value,
   said authentication apparatus generates a random number (R) and transmits said random number to said mobile terminal,
   said mobile terminal generates value authentication information (F(VPW')) from authentication information (VPW') corresponding to said electronic value specified by said user,
   further generates authentication information (G(R,F(VPW'))) wherein said value authentication information (F(VPW')) and said random number (R) are concatenated and encoded by a second irreversible calculation process (G), and transmits said electronic value and said authentication information (G(R,F(VPW'))) to said authentication apparatus,
   said authentication apparatus decrypts code of received electronic said value, extracts value authentication information (F(VPW)) from said electronic value, generates authentication information (G(R,F(VPW))) wherein said value authentication information (F(VPW)) and said random number (R) are concatenated and encoded by said second irreversible calculation process (G), collates said received authentication information (G(R,F(VPW'))) with said generated authentication information (G(R,F(VPW))), verifies that they are identical, and authenticates said user.

18. The authentication system of claim 17 wherein:
   a decryption key from an encrypted part of said electronic value is generated from data (H(F(VPW))) wherein said value authentication information (F(VPW)) is encoded by a third irreversible calculation process (H) and a master key,
   in said process for authenticating said user as the right owner of said electronic value, said user side further generates data (H(F(VPW'))) wherein said value authentication information (F(VPW')) is encoded by said third irreversible calculation process (H), transmits data (H(F(VPW'))) with said electronic value and said authentication information (G(R,F(VPW'))) to said authentication apparatus,
   said authentication apparatus generates said decryption key from received data (H(F(VPW'))) and said master key, decrypts code of said received electronic value.

19. A lock apparatus wherein:
   in issuance of an electronic key, an issuance function of said electronic key extracting value authentication information (F(VPW)) corresponding to said electronic key specified by a user, wherein authentication information (VPW) is encoded by a first irreversible calculation process (F), from an electronic key issuance request message received from a mobile terminal,
   generating an encryption key from data (H(F(VPW))) wherein said value authentication information (F(VPW)) is encoded by a second irreversible calculation process (H) and a master key, generating said electronic key with the use of said value authentication information (F(VPW)) and said generated encryption key, and transmits said encryption key to said mobile terminal,
   in authentication of said electronic key, an authentication function of said electronic key generating a random number (R) and transmitting said random number to said mobile terminal, receiving authentication information (G(R,F(VPW'))) and said electronic key from said mobile terminal, decrypting code of an encrypted part of said electronic key, and validating said electronic key, further extracting said value authentication information (F(VPW)) from said electronic key, generating authentication information (G(R,F(VPW))) wherein said value authentication information (F(VPW)) and said random number (R) are concatenated and encoded by a third irreversible calculation process (G), and collating said received authentication information (G(R,F(VPW'))) with said generated authentication information (G(R,F(VPW))), verifying that they are identical, thereby authenticating said user.

20. The lock apparatus of claim 19 wherein:
   in issuance of said electronic key, generating a second random number (R0), transmitting said second random number to said mobile terminal, extracting user identification information (J(LN',R0)) wherein lock number (LN') input to a mobile phone by said user and said second random number (R0) are concatenated and encoded by a fourth irreversible calculation process (J) from said electronic key issuance request message received from said mobile terminal, generating user identification information (J(LN,R0)) wherein lock number (LN) and said second random number (R0) are concatenated and encoded by said fourth irreversible calculation process (J), collating said received user identification information (J(LN',R0)) with said generated user identification information (J(LN,R0)), verifying that they are identical, and authenticating said user, thereby issuing said electronic key.

21. The lock apparatus of claim 19 or 20 wherein:

having storage means storing key ID of said issued electronic key, in authentication of said electronic key, collating received key ID of said electronic key with said key ID stored in said storage means, executing said authentication process based on said authentication information (G(R,F(VPW'))) received from said mobile terminal and said electronic key.

* * * * *